(12) United States Patent
Chen et al.

(10) Patent No.: US 12,543,638 B2
(45) Date of Patent: Feb. 10, 2026

(54) METHOD FOR DETERMINING INFORMATION, REMOTE TERMINAL, AND MOWER

(71) Applicant: Willand (Beijing) Technology Co., LTD., Beijing (CN)

(72) Inventors: Zichong Chen, Beijing (CN); Degan Lin, Beijing (CN); Lv Zhuo, Beijing (CN); You Wang, Beijing (CN); Yue Hu, Beijing (CN); Tianning Yu, Beijing (CN); Chunhong Li, Beijing (CN); Shuai Li, Beijing (CN); Weijie Tang, Beijing (CN)

(73) Assignee: Willand (Beijing) Technology Co., Ltd. (CN)

( * ) Notice: Subject to any disclaimer, the term of this patent is extended or adjusted under 35 U.S.C. 154(b) by 190 days.

(21) Appl. No.: 18/188,834

(22) Filed: Mar. 23, 2023

(65) Prior Publication Data
US 2023/0320263 A1 Oct. 12, 2023

(30) Foreign Application Priority Data

Mar. 24, 2022 (CN) .......................... 202210303714.4
Jun. 17, 2022 (CN) .......................... 202210689378.1
(Continued)

(51) Int. Cl.
*A01D 34/00* (2006.01)
*G06T 7/12* (2017.01)
(Continued)

(52) U.S. Cl.
CPC .............. *A01D 34/008* (2013.01); *G06T 7/12* (2017.01); *G06T 7/13* (2017.01); *G06V 10/25* (2022.01); *G06V 10/761* (2022.01)

(58) Field of Classification Search
None
See application file for complete search history.

(56) References Cited

U.S. PATENT DOCUMENTS 9,137,943 B2   9/2015 Einecke et al.
11,269,349 B2 * 3/2022 Shao .................... G05D 1/0274
(Continued)

FOREIGN PATENT DOCUMENTS

CN   105785986 A   7/2016
CN   109491397 A   3/2019
(Continued)

OTHER PUBLICATIONS

Office action of EP 23163810.7 issued by EPO on Apr. 24, 2024.
First office action of Chinese application No. 202310179526.X issued by CNIPA on Nov. 5, 2025.

*Primary Examiner* — Arslan Azhar
(74) *Attorney, Agent, or Firm* — Emerson, Thomson & Bennett, LLC; Roger D. Emerson; Peter R. Detorre

(57) ABSTRACT

A method for determining information, a remote terminal, and a mower are provided. The method includes: collecting a to-be-processed image for a to-be-recognized region through an image collector of a to-be-controlled device, where the to-be-recognized region at least includes a to-be-processed region and an obstacle region; processing the to-be-processed image, and determining information of a partial boundary of a to-be-processed region where the to-be-controlled device is currently located; and controlling the to-be-controlled device to switch between an autonomous movement mode and a remotely controlled movement mode based on the information of the partial boundary to determine a boundary of the to-be-processed region, where the boundary of the to-be-processed region is used for distinguishing the to-be-processed region from the obstacle region. The method can solve the problems of cumbersome (Continued)

operations and low efficiency existing in existing methods for determining a regional boundary.

18 Claims, 11 Drawing Sheets

(30) Foreign Application Priority Data

Feb. 28, 2023 (CN) .......................... 202310179526.X
Feb. 28, 2023 (CN) .......................... 202310193827.8

(51) Int. Cl.
*G06T 7/13* (2017.01)
*G06V 10/25* (2022.01)
*G06V 10/74* (2022.01)

(56) References Cited

U.S. PATENT DOCUMENTS

2014/0032033 A1 1/2014 Einecke et al.
2018/0341264 A1 11/2018 Knych

FOREIGN PATENT DOCUMENTS

| | | | |
|---|---|---|---|
| CN | 110168465 | A | 8/2019 |
| CN | 110727270 | A | 1/2020 |
| CN | 111273648 | A | 6/2020 |
| CN | 111399502 | A | 7/2020 |
| CN | 212009387 | U * | 11/2020 |
| CN | 11218347 | A | 1/2021 |
| CN | 112584697 | A | 3/2021 |
| CN | 111273648 | B | 11/2021 |
| CN | 113885495 | A | 1/2022 |
| CN | 114089731 | A | 2/2022 |
| CN | 110168465 | B | 7/2022 |
| CN | 114898205 | A | 8/2022 |
| CN | 114945882 | A | 8/2022 |
| CN | 115328112 | A | 11/2022 |
| EP | 3018548 | A1 | 5/2016 |
| EP | 3018548 | B1 | 3/2020 |
| WO | 2021037116 | A1 | 3/2021 |
| WO | 2021073587 | A1 | 4/2021 |
| WO | 2021110311 | A1 | 6/2021 |
| WO | WO2022120713 | A1 | 6/2022 |

* cited by examiner

METHOD FOR DETERMINING INFORMATION, REMOTE TERMINAL, AND MOWER

CROSS-REFERENCE

The present application claims the priority of Chinese patent application 202210303714.4 filed on Mar. 24, 2022 and entitled "METHOD FOR DETERMINING INFORMATION, DEVICE FOR DETERMINING INFORMATION, AND COMPUTER-READABLE STORAGE MEDIUM", Chinese patent application 202210689378.1 filed on Jun. 17, 2022 and entitled "METHOD FOR GENERATING VIRTUAL WORK BOUNDARY, DEVICE FOR GENERATING VIRTUAL WORK BOUNDARY, REMOTE TERMINAL, AND STORAGE MEDIUM", Chinese patent application 202310193827.8 filed on Feb. 28, 2023 and entitled "METHOD FOR DETERMINING INFORMATION, REMOTE TERMINAL, DEVICE, MOWER AND STORAGE MEDIUM", and Chinese patent application 202310179526.X filed on Feb. 28, 2023 and entitled "METHOD FOR DETERMINING INFORMATION, APPARATUS, DEVICE, AUTONOMOUS MOWING DEVICE AND USER TERMINAL", the complete disclosure of which are expressly incorporated by reference herein.

TECHNICAL FIELD

The present disclosure relates to positioning technologies in the field of communication, and in particular to, a method for determining information, a remote terminal, a device for determining information, a mower, and a storage medium.

BACKGROUND

With the continuous development of computer technologies, robots are increasingly widely used. A gardening robot, such as an automatic mower, can work only after determining a boundary of a work region (including an outer boundary and an inner obstacle).

At present, a conventional automatic mower determines a passable region mostly using a cable laid under a lawn, or a non-visual autonomously positioning mower determines a boundary of a passable region through a remotely controlled path.

However, the above method for determining a regional boundary has the problems of cumbersome operations and low efficiency.

SUMMARY

In view of this, embodiments of the present disclosure provide a method for determining information, a remote terminal, a device for determining information, a mower, and a storage medium, to at least partially solve the above problems.

According to a first aspect of embodiments of the present disclosure, a method for determining information is provided, including: collecting a to-be-processed image for a to-be-recognized region through an image collector of a to-be-controlled device, where the to-be-recognized region at least includes a to-be-processed region and an obstacle region; processing the to-be-processed image, and determining information of a partial boundary of a to-be-processed region where the to-be-controlled device is currently located; and controlling the to-be-controlled device to switch between an autonomous movement mode and a remotely controlled movement mode based on the information of the partial boundary to determine a boundary of the to-be-processed region, where the boundary of the to-be-processed region is used for distinguishing the to-be-processed region from the obstacle region.

In one possible implementation, the collecting the to-be-processed image for the to-be-recognized region through the image collector of the to-be-controlled device includes: collecting a plurality of the to-be-processed images for the to-be-recognized region through the image collector when the to-be-controlled device moves; and accordingly, the processing the to-be-processed image, and determining the information of the partial boundary of the to-be-processed region where the to-be-controlled device is currently located includes: semantically segmenting and processing the plurality of the to-be-processed images, and determining the information of the partial boundary based on the semantic segmentation result and the processing result.

In one possible implementation, the semantically segmenting and processing the plurality of the to-be-processed images, and determining the information of the partial boundary based on the semantic segmentation result and the processing result includes: semantically segmenting each of the to-be-processed images, and matching each to-be-processed image based on the semantic segmentation result and a target map to obtain a mismatching region; where the target map is a map of a target region in the to-be-recognized region; semantically segmenting each to-be-processed image, and mapping each semantically segmented to-be-processed image into the target map based on grids of the target map; performing, for each to-be-processed image, outline recognition on the mapped image to obtain a to-be-processed boundary; and determining the information of the partial boundary based on smoothness of the to-be-processed boundary, the mismatching region, and the target region.

According to a second aspect of embodiments of the present disclosure, a method for determining information is provided, the method is applied to a remote terminal, and the remote control is configured to control a to-be-controlled device to move. The method for determining information includes: receiving information of a partial boundary sent from the to-be-controlled device, where the information of the partial boundary is used for indicating a partial boundary of a to-be-processed region where the to-be-controlled device is currently located, the information of the partial boundary is obtained by the to-be-controlled device from processing of a to-be-processed image, the to-be-processed image is obtained by an image collector of the to-be-controlled device from image collection of a to-be-recognized region, and the to-be-recognized region at least includes a to-be-processed region and an obstacle region; sending control information to the to-be-controlled device based on the information of the partial boundary, such that the to-be-controlled device switches between an autonomous movement mode and a remotely controlled movement mode according to the control information, and determines a boundary of the to-be-processed region, where the boundary of the to-be-processed region is used for distinguishing the to-be-processed region from the obstacle region.

In one possible implementation, the to-be-controlled device includes a mowing apparatus; and the sending the control information to the to-be-controlled device based on the information of the partial boundary, such that the to-be-controlled device switches between the autonomous movement mode and the remotely controlled movement mode according to the control information, and determines the boundary of the to-be-processed region includes: sending a first control message if a boundary of a working range of the mowing apparatus is determined based on the information of the partial boundary, to control the mowing apparatus to switch to the autonomous movement mode to autonomously move, and recording position information of the mowing apparatus during the autonomous movement; sending a second control message if the boundary of the working range of the mowing apparatus fails to be determined based on the information of the partial boundary, to control the mowing apparatus to switch to the remotely controlled movement mode to move according to a received first user instruction, and recording position information of the mowing apparatus during the movement according to the first user instruction; and controlling the mowing apparatus to generate a virtual work boundary according to the recorded position information, where the virtual work boundary includes the boundary of the to-be-processed region.

In one possible implementation, if the boundary of the working range of the mowing apparatus is determined based on the information of the partial boundary, at least one of the following operations is executed: displaying the recognized boundary of the working range to a user; and prompting the user that he can enter an autonomous movement mode of autonomously generating the virtual work boundary.

In one possible implementation, the method further includes: reminding the user that he can enter the autonomous movement mode of autonomously generating the virtual work boundary when the boundary of the working range of the mowing apparatus is determined based on the information of the partial boundary; or reminding the user that he can enter the remotely controlled movement mode of manually generating the virtual work boundary when the boundary of the working range of the mowing apparatus fails to be determined based on the information of the partial boundary.

In one possible implementation, the method further includes: displaying a third movement control widget through a display interface in response to triggering of an exit control widget when the to-be-controlled device is in the autonomous movement mode, where the exit control widget is displayed on the display interface; and sending a fifth control message to the to-be-controlled device in response to triggering of the third movement control widget, such that the to-be-controlled device moves according to the fifth control message, and records position information of the to-be-controlled device during the movement according to the fifth control message.

According to a third aspect of embodiments of the present disclosure, a method for generating a virtual work boundary is provided. The method is applied to a mowing apparatus, and includes: autonomously moving, if a boundary of a working range of the mowing apparatus is recognized according to environmental information of the mowing apparatus during movement, the mowing apparatus, and recording position information of the mowing apparatus during the autonomous movement; moving, if the boundary of the working range of the mowing apparatus fails to be recognized based on the environmental information of the mowing apparatus during movement, the mowing apparatus according to a received first user instruction, and recording position information of the mowing apparatus during the movement according to the first user instruction; and generating the virtual work boundary according to the recorded position information.

In one possible implementation, the autonomously moving, if the boundary of the working range of the mowing apparatus is recognized based on the environmental information of the mowing apparatus during movement, the mowing apparatus, and recording the position information of the mowing apparatus during the autonomous movement includes: obtaining a movement path of the mowing apparatus according to the recognized boundary of the working range; and autonomously moving the mowing apparatus along the movement path.

In one possible implementation, the autonomously moving, when the boundary of the working range of the mowing apparatus is recognized based on the environmental information of the mowing apparatus during movement, the mowing apparatus, and recording the position information of the mowing apparatus during the autonomous movement includes: moving, if the boundary of the working range of the mowing apparatus is recognized based on the environmental information of the mowing apparatus during movement and the first user instruction is received, the mowing apparatus according to the received first user instruction, and recording the position information of the mowing apparatus during the movement according to the first user instruction.

In one possible implementation, the received first user instruction includes a user-defined target movement position, and the moving the mowing apparatus according to the received first user instruction includes autonomously moving the mowing apparatus to the target movement position along a straight line.

In one possible implementation, the mowing apparatus includes an image collection unit, and the method further includes: obtaining information of an environmental image of the mowing apparatus during movement; and recognizing whether the environmental image includes the boundary of the working range of the mowing apparatus according to the information of the environmental image through a predetermined neural network model.

According to a fourth aspect of embodiments of the present disclosure, a method for generating a virtual work boundary is provided. The method is applied to a remote terminal, and includes: obtaining environmental information of a mowing apparatus during movement, and recognizing a boundary of a working range of the mowing apparatus based on the environmental information; autonomously moving the mowing apparatus when the boundary of the working range of the mowing apparatus is recognized based on the environmental information of the mowing apparatus during movement, and recording position information of the mowing apparatus during the autonomous movement, such that the mowing apparatus generates the virtual work boundary according to the recorded position information; and moving, when the boundary of the working range of the mowing apparatus fails to be recognized based on the environmental information of the mowing apparatus during movement, the mowing apparatus according to a received first user instruction, and recording position information of the mowing apparatus during the movement according to the first user instruction, such that the mowing apparatus generates the virtual work boundary according to the recorded position information during the movement according to the first user instruction.

In one possible implementation, the method further includes: acquiring information of an environmental image of the mowing apparatus during movement; and recognizing the boundary of the working range of the mowing apparatus according to the information of the environmental image through a predetermined neural network model.

In one possible implementation, when the boundary of the working range of the mowing apparatus is recognized, at least one of the following operations is executed: displaying the recognized boundary of the working range to a user; and prompting the user that he can enter an automatic mode of autonomously generating the virtual work boundary.

In one possible implementation, the method further includes: reminding the user that he can enter the automatic mode of autonomously generating the virtual work boundary when the boundary of the working range of the mowing apparatus is recognized based on the environmental information of the mowing apparatus during movement; or reminding the user that he can enter a manual mode of manually generating the virtual work boundary when the boundary of the working range of the mowing apparatus fails to be recognized based on the environmental information of the mowing apparatus during movement.

According to a fifth aspect of embodiments of the present disclosure, an apparatus for generating a virtual work boundary is provided, including: an autonomous module configured to autonomously move, if, according to environmental information of a mowing apparatus during movement, a boundary of a working range of the mowing apparatus is recognized, the mowing apparatus, and record position information of the mowing apparatus during the autonomous movement; a manual module configured to move, if the boundary of the working range of the mowing apparatus fails to be recognized based on the environmental information of the mowing apparatus during movement, the mowing apparatus according to a received first user instruction, and record position information of the mowing apparatus during the movement according to the first user instruction; and a mapping module configured to generate the virtual work boundary according to the recorded position information.

According to a sixth aspect of embodiments of the present disclosure, a device for determining information is provided, including: a processor, a memory, and a communication bus; where the communication bus is configured to implement a communication connection between the processor and the memory; and the processor is configured to execute an information determination program in the memory to implement steps of the method for determining information according to the first aspect of the embodiments of the present disclosure.

According to a seventh aspect of embodiments of the present disclosure, a mower is provided, including the device for determining information according to the sixth aspect of the embodiments of the present disclosure.

According to an eighth aspect of embodiments of the present disclosure, a remote terminal is provided. The remote terminal includes a memory and a controller, where the memory is used for storing instructions, and the controller is used for executing the instructions to implement the method according to the second aspect or the fourth aspect of the embodiments of the present disclosure.

According to a ninth aspect of embodiments of the present disclosure, a computer storage medium is provided. The computer storage medium stores a computer program thereon, where the program, when executed by a processor, implements the method according to the first aspect, the second aspect, the third aspect, and the fourth aspect.

According to a tenth aspect of embodiments of the present disclosure, another method for determining information is provided, including: collecting a to-be-processed image for a to-be-recognized region through an image collector of a to-be-controlled device; where the to-be-recognized region at least includes a to-be-processed region and an obstacle region; processing the to-be-processed image, and determining information of a partial boundary of a to-be-processed region where the to-be-controlled device is currently located; controlling the to-be-controlled device to switch between an autonomous movement mode and a remotely controlled movement mode based on the information of the partial boundary to determine a boundary of the to-be-processed region; where the boundary of the to-be-processed region is used for distinguishing the to-be-processed region from the obstacle region; determining a visual feature map for the to-be-processed region; determining, for a partial region satisfying a target signal condition in the to-be-processed region, a boundary of the partial region based on the visual feature map and a semantic segmentation technology; obtaining a target boundary of the to-be-processed region based on the boundary of the partial region and the boundary of the to-be-processed region; and performing visual positioning based on the visual feature map to obtain a position of the to-be-controlled device.

In one possible implementation, the method further includes: recognizing each of the to-be-processed images to obtain a target obstacle in the to-be-processed region; determining a region where the target obstacle is located in the to-be-processed region based on a position of the target obstacle in the to-be-processed image and a map of the to-be-processed region; or determining an obstacle avoiding trajectory of the to-be-controlled device, and determining the region where the target obstacle is located in the to-be-processed region based on the obstacle avoiding trajectory; where the obstacle avoiding trajectory represents a trajectory formed by bypassing the target obstacle during the movement of the to-be-controlled device.

In one possible implementation, the method further includes: updating a position of an obstacle in a map of the to-be-recognized region based on the target map or updating the region where the target obstacle is located based on an updated obstacle avoiding trajectory, when the target obstacle is determined to have a change; and updating a boundary of the to-be-recognized region in the map based on the target map or updating the boundary of the to-be-processed region based on the updated obstacle avoiding trajectory when the boundary of the to-be-processed region is determined to have a change.

In one possible implementation, the method further includes: determining and displaying a to-be-updated update content in the map of the to-be-recognized region when the target obstacle or the boundary of the to-be-processed region is determined to have a change; and updating the boundary and an obstacle position in the map of the to-be-recognized region based on a selection operation of an operation object.

In one possible implementation, the controlling the to-be-controlled device to switch between the autonomous movement mode and the remotely controlled movement mode based on the information of the partial boundary includes: semantically segmenting each to-be-processed image, and mapping each semantically segmented to-be-processed image into the target map based on grids of the target map to obtain a mismatching region, where the target map is a map of a target region in the to-be-recognized region, and the mismatching region is determined by matching each to-be-processed image according to the semantic segmentation result and the target map; performing, for each to-be-processed image, outline recognition on the mapped image to obtain a to-be-processed boundary, and determining a tortuosity of the to-be-processed boundary; determining the number of reference trajectories based on the information of the partial boundary, where the reference trajectories are determined according to connection lines of boundary reference points, and the boundary reference points are points on the partial boundary indicated by the information of the partial boundary; controlling the to-be-controlled device to enter the autonomous movement mode when the information of the partial boundary satisfies a preset autonomous movement condition, where the autonomous movement condition is determined based on the mismatching region, the target region, the tortuosity of the to-be-processed boundary, and the number of the reference trajectories; and controlling the to-be-controlled device to enter the remotely controlled movement mode when the information of the partial boundary fails to satisfy the autonomous movement condition.

In one possible implementation, the autonomous movement condition includes: (i) a ratio of an area of the mismatching region to an area of the target region is less than or equal to a preset first threshold; (ii) the number of reference trajectories is less than or equal to a preset second threshold; and (iii) the tortuosity of the to-be-processed boundary is less than or equal to a preset third threshold, where a tortuosity of the partial boundary is determined by a difference between gray values of regions divided by the partial boundary.

According to an eleventh aspect of embodiments of the present disclosure, an apparatus for determining information is provided, including: a collection module configured to collect a to-be-processed image for a to-be-recognized region through an image collector of a to-be-controlled device; where the to-be-recognized region at least includes a to-be-processed region and an obstacle region; a first processing module configured to process the to-be-processed image, and determine information of a partial boundary of a to-be-processed region where the to-be-controlled device is currently located; a first determination module configured to control the to-be-controlled device to switch between an autonomous movement mode and a remotely controlled movement mode based on the information of the partial boundary to determine a boundary of the to-be-processed region; where the boundary of the to-be-processed region is used for distinguishing the to-be-processed region from the obstacle region; a second determination module configured to determine a visual feature map for the to-be-processed region; a second processing module configured to determine, for a partial region satisfying a target signal condition in the to-be-processed region, a boundary of the partial region based on the visual feature map and a semantic segmentation technology; a generation module configured to obtain a target boundary of the to-be-processed region based on the boundary of the partial region and the boundary of the to-be-processed region; and a positioning module configured to perform visual positioning based on the visual feature map to obtain a position of the to-be-controlled device.

According to a twelfth aspect of embodiments of the present disclosure, an autonomous mobile mowing apparatus is provided, including the apparatus for determining information according to the eleventh aspect of the embodiments of the present disclosure.

According to a thirteenth aspect of embodiments of the present disclosure, a method for controlling an autonomous mobile mowing apparatus is provided, including: controlling a sensor on the autonomous mobile mowing apparatus to sense sensing information of a first entity boundary segment; and controlling the autonomous mobile mowing apparatus to automatically run along the first entity boundary segment when the sensing information satisfies an autonomous movement condition, where the first entity boundary segment is a partial entity boundary of a first region, and the first region is a to-be-worked region.

In one possible implementation, the method further includes: semantically segmenting each to-be-processed image, and mapping each semantically segmented to-be-processed image into the target map based on grids of the target map to obtain a mismatching region, where the target map is a map of a target region in the to-be-recognized region, and the mismatching region is determined by matching each to-be-processed image according to the semantic segmentation result and the target map; performing, for each to-be-processed image, outline recognition on the mapped image to obtain a to-be-processed boundary, and determining a tortuosity of the to-be-processed boundary; determining the number of reference trajectories based on the information of the partial boundary, where the reference trajectories are determined according to connection lines of boundary reference points, and the boundary reference points are points on the partial boundary indicated by the information of the partial boundary; controlling the autonomous mobile mowing apparatus to enter the autonomous movement mode when the information of the partial boundary satisfies a preset autonomous movement condition, where the autonomous movement condition is determined based on the mismatching region, the target region, the tortuosity of the to-be-processed boundary, and the number of the reference trajectories; and controlling the autonomous mobile mowing apparatus to enter the remotely controlled movement mode when the information of the partial boundary fails to satisfy the autonomous movement condition.

In one possible implementation, the controlling the autonomous mobile mowing apparatus to enter the remotely controlled movement mode includes: receiving an operation instruction for operating an operation object of the autonomous mobile mowing apparatus; and controlling the autonomous mobile mowing apparatus to switch to work in the remotely controlled movement mode based on the operation instruction, to determine the boundary of the to-be-processed region.

In one possible implementation, the autonomous movement condition includes: (i) a ratio of an area of the mismatching region to an area of the target region is less than or equal to a preset first threshold; (ii) the number of reference trajectories is less than or equal to a preset second threshold; and (iii) the tortuosity of the to-be-processed boundary is less than or equal to a preset third threshold, where a tortuosity of the partial boundary is determined by a difference between gray values of regions divided by the partial boundary.

In one possible implementation, the method further includes: when there is a boundaryless segment between the first entity boundary segment and a second entity boundary segment, and a length of the boundaryless segment is less than or equal to a first preset distance, the autonomous mobile mowing apparatus crosses over the boundaryless segment and continues to move along the second entity boundary segment, where the second entity boundary segment is a partial entity boundary of the first region.

In one possible implementation, the first preset distance is less than a sum of a vehicle body width and a safety distance of the autonomous mobile mowing apparatus.

In one possible implementation, the safety distance is greater than or equal to positioning accuracy of the autonomous mobile mowing apparatus.

The method for determining information provided according to embodiments of the present disclosure collects a to-be-processed image for a to-be-recognized region through an image collector of a to-be-controlled device, the to-be-recognized region at least including a to-be-processed region and an obstacle region, processes the to-be-processed image to determine information of a partial boundary of a to-be-processed region where the to-be-controlled device is currently located, and then controls the to-be-controlled device to switch between an autonomous movement mode and a remotely controlled movement mode based on the information of the partial boundary to determine a boundary of the to-be-processed region, the boundary of the to-be-processed region being used for distinguishing the to-be-processed region from the obstacle region, thereby processing the to-be-processed image collected by the image collector of the to-be-controlled device for the to-be-recognized region including the to-be-processed region and the obstacle region, to obtain the information of the partial boundary of the to-be-processed region where the to-be-controlled device is currently located, determine the boundary of the to-be-processed region by combining the autonomous movement mode and the remotely controlled movement mode based on the information of the partial boundary, instead of determining the regional boundary separately using a constant mode, and determine the regional boundary without burying wires in the region, and solving the problems of cumbersome operations and low efficiency existing in solutions of determining a regional boundary in associated technologies.

BRIEF DESCRIPTION OF THE DRAWINGS

To more clearly describe the technical solutions in embodiments of the present disclosure or the prior art, the accompany drawings to be used in the description of the embodiments or the prior art will be briefly introduced below. Apparently, the drawings in the description below are merely some embodiments disclosed in the embodiments of the present disclosure. For those of ordinary skills in the art, other drawings may also be obtained based on these drawings.

DETAILED DESCRIPTION OF EMBODIMENTS

To enable those skilled in the art to better understand the technical solutions in embodiments of the present disclosure, the technical solutions in the embodiments of the present disclosure will be clearly and completely described below with reference to the accompanying drawings in the embodiments of the present disclosure. Apparently, the described embodiments are merely a part, instead of all, of the embodiments of the present disclosure. All other embodiments obtained by those of ordinary skills in the art based on embodiments among the embodiments of the present disclosure shall be encompassed within the scope of protection of the embodiments of the present disclosure.

The terms used in the present disclosure are intended merely to describe particular embodiments, and are not intended to limit the present disclosure. The singular forms of "a" and "the" used in the present disclosure and the appended claims are also intended to include plural forms, unless the context clearly indicates other meanings. It should be further understood that the term "and/or" used herein refers to and includes any or all possible combinations of one or more associated listed items.

It shall be understood that various kinds of information may be described by using the terms, such as first, second, and third, in the present disclosure, but the information should not be limited to these terms. These terms are merely used to distinguish between information of a same type. For example, the first piece of information may also be called the second piece of information, and similarly, the second piece of information may also be called the first piece of information, without departing from the scope of the present disclosure. Depending on the context, as used herein, the word "if" may be interpreted as "at the time of . . . " or "when . . . " or "in response to determining."

Figure 1:
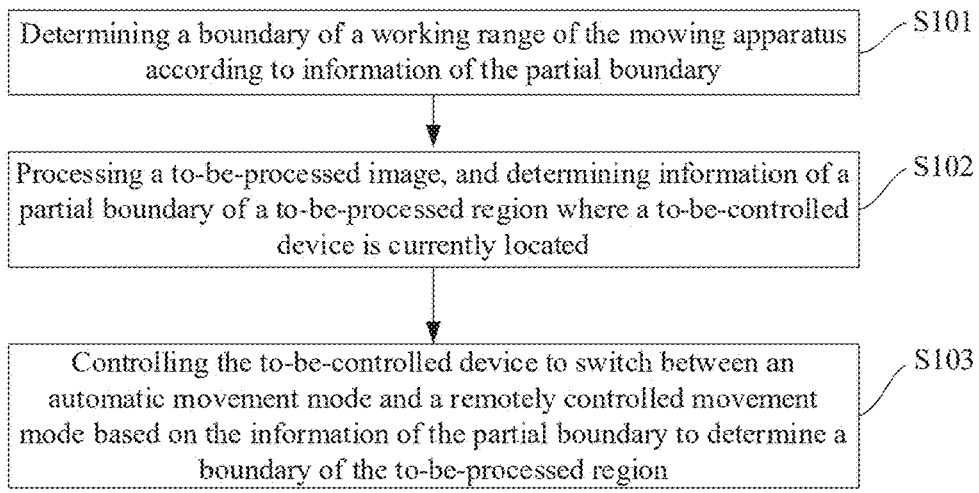
FIG. 1 is a flowchart of a method for determining information provided in an embodiment of the present disclosure.

An embodiment of the present disclosure provides a method for determining information. This method may be applied to a device for determining information. As shown in FIG. 1, this method includes the following steps:

S101: collecting a to-be-processed image for a to-be-recognized region through an image collector of a to-be-controlled device.

The to-be-recognized region at least includes a to-be-processed region and an obstacle region.

In embodiments of the present disclosure, the to-be-controlled device may be a device for certain processing of the to-be-processed region; and, the to-be-controlled device may be a smart device with certain data processing function and image collection function. In one possible implementation, the to-be-controlled device may refer to a mobile machine device (or a mobile robot); and preferably, the to-be-controlled device may include a gardening robot, or may refer to a mower.

It should be noted that the image collector may refer to a camera on the mower; the to-be-processed image may be obtained by continuously photographing the to-be-recognized region at least including the to-be-processed region and the obstacle region using the camera of the mower; i.e., the to-be-processed image may include a plurality of images. In addition, the to-be-processed image may include an image of a boundary of the to-be-processed region. The to-be-processed region may refer to a region where an object therein is to be processed; and the obstacle region may refer to a region except for the to-be-processed region.

S102: processing the to-be-processed image, and determining information of a partial boundary of a to-be-processed region where the to-be-controlled device is currently located.

In embodiments of the present disclosure, the device for determining information may refer to the to-be-controlled device; and the information of the partial boundary may refer to a status of the partial boundary. That is, the to-be-controlled device may semantically segment and process the plurality of collected to-be-processed images, and determine status of a partial boundary of a region where the to-be-controlled device is currently located in the to-be-processed region based on the semantic segmentation result and the processing result.

S103: controlling the to-be-controlled device to switch between an autonomous movement mode and a remotely controlled movement mode based on the information of the partial boundary to determine a boundary of the to-be-processed region.

The boundary of the to-be-processed region is used for distinguishing the to-be-processed region from the obstacle region.

In embodiments of the present disclosure, the to-be-controlled device can control the to-be-controlled device itself to switch back and forth between the autonomous movement mode and the remotely controlled movement mode based on the status of the partial boundary indicated by the information of the partial boundary, thereby determining the boundary of the to-be-processed region; i.e., the to-be-controlled device may determine the boundary of the to-be-processed region by combining the autonomous movement mode and the remotely controlled movement mode, thereby greatly reducing manual operations, improving work efficiency, and reducing labor costs, compared with the boundary of the to-be-processed region determined under a single mode. In one possible implementation, when the to-be-controlled device is a mower, the to-be-processed region may refer to a to-be-trimmed lawn.

The method for determining information provided in embodiments of the present disclosure collects a to-be-processed image for a to-be-recognized region through an image collector of a to-be-controlled device, the to-be-recognized region at least including a to-be-processed region and an obstacle region, processes the to-be-processed image to determine information of a partial boundary of a to-be-processed region where the to-be-controlled device is currently located, and then controls the to-be-controlled device to switch between an autonomous movement mode and a remotely controlled movement mode based on the information of the partial boundary to determine a boundary of the to-be-processed region, the boundary of the to-be-processed region being used for distinguishing the to-be-processed region from the obstacle region, thereby processing the to-be-processed image collected by the image collector of the to-be-controlled device for the to-be-recognized region including the to-be-processed region and the obstacle region, to obtain the information of the partial boundary of the to-be-processed region where the to-be-controlled device is currently located, determine the boundary of the to-be-processed region by combining the autonomous movement mode and the remotely controlled movement mode based on the information of the partial boundary, instead of determining the regional boundary separately using a constant mode, and determine the regional boundary without burying wires in the region, and solving the problems of cumbersome operations and low efficiency existing in solutions of determining a regional boundary in associated technologies.

Figure 2:
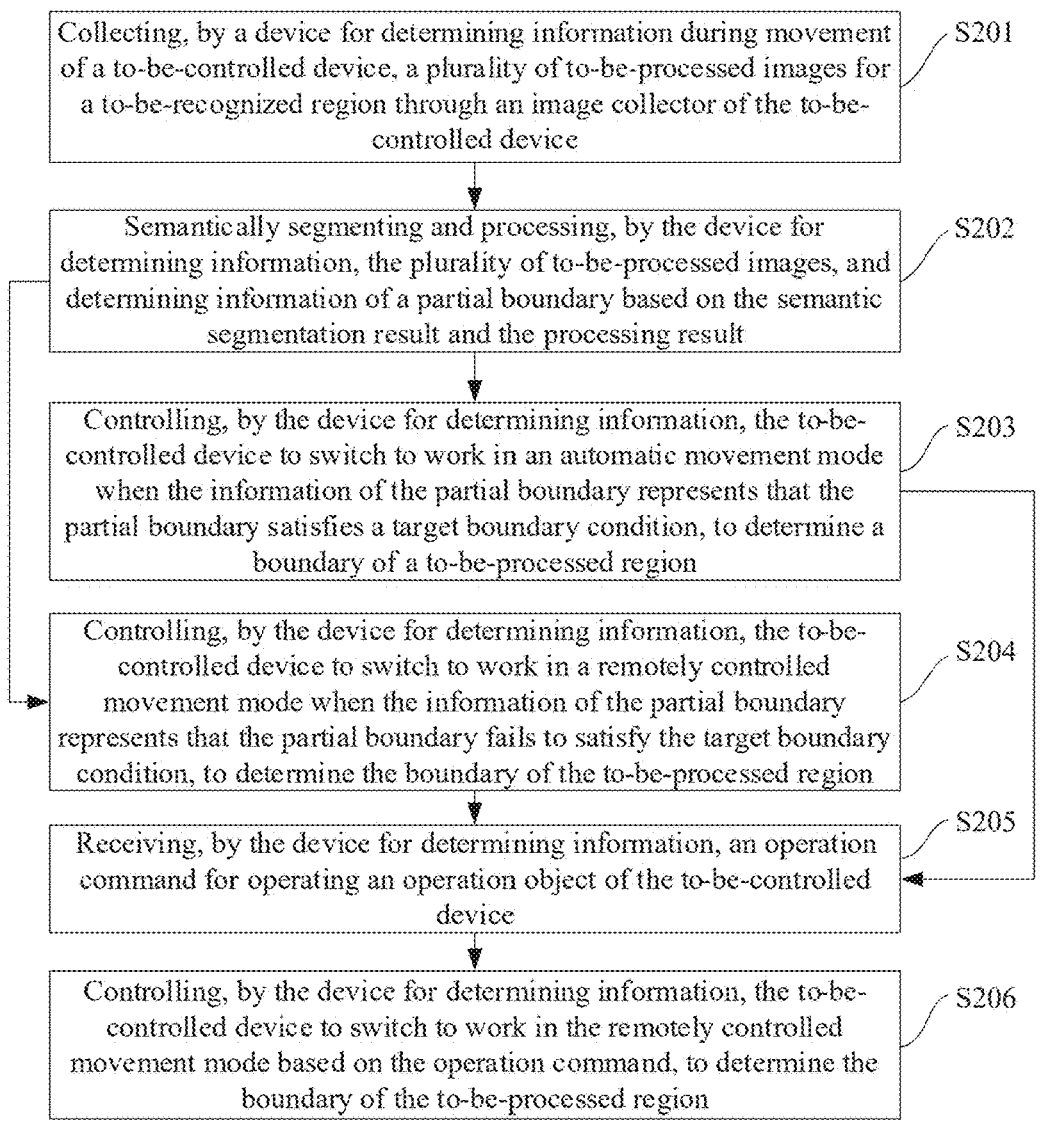
FIG. 2 is a flowchart of another method for determining information provided in an embodiment of the present disclosure.

Based on the above embodiments, an embodiment of the present disclosure provides a method for determining information. Referring to FIG. 2, this method includes the following steps:

S201: collecting, by a device for determining information during movement of a to-be-controlled device, a plurality of to-be-processed images for a to-be-recognized region through an image collector of the to-be-controlled device.

The to-be-recognized region at least includes a to-be-processed region and an obstacle region.

In embodiments of the present disclosure, an operation object can remotely control or place a mower at any boundary of a to-be-trimmed lawn; and when the mower starts to work and moves along a boundary, the plurality of to-be-processed images is obtained by photographing in real time using a camera of the mower. It should be noted that the to-be-recognized region may be a preset region with a certain area centered on the mower. In one possible implementation, the to-be-recognized region may be a square region centered on the mower. It should be noted that because the mower is placed at a boundary of the to-be-trimmed lawn, the to-be-recognized region not only includes the lawn, but also includes other regions outside the lawn, and will also include a boundary of the lawn.

It should be noted that a shooting angle of the camera may be set in a direction a bit lower right ahead of the mower during photographing, i.e., the obtained to-be-processed image must be an image for a partial region of the to-be-recognized region.

S202: semantically segmenting and processing, by the device for determining information, the plurality of to-be-processed images, and determining information of a partial boundary based on the semantic segmentation result and the processing result.

In embodiments of the present disclosure, each to-be-processed image may be semantically segmented to determine an object included in the to-be-processed image, and then the plurality of to-be-processed images may be processed based on the semantic segmentation result to determine status of a partial boundary of a to-be-processed region where the mower is currently located.

Step 203 or step 204 may be selectively executed after step 202.

S203: controlling, by the device for determining information, the to-be-controlled device to switch to work in an autonomous movement mode when the information of the partial boundary indicates that the partial boundary satisfies a target boundary condition, to determine a boundary of a to-be-processed region.

In embodiments of the present disclosure, the target boundary condition may be a preset condition that is used for determining whether to switch the work mode of the mower, and is associated with the boundary status; and in one possible implementation, the target boundary condition may include that the boundary is clear and simple. That is, if the information of the partial boundary thus obtained is determined to represent that the partial boundary is clear and simple, the mower may be considered to adapt to the autonomous movement mode at this time, and then the work mode of the mower will be switched to the autonomous movement mode, such that the mower works in the autonomous movement mode to determine the boundary of the to-be-trimmed lawn.

S204: controlling, by the device for determining information, the to-be-controlled device to switch to work in a remotely controlled movement mode when the information of the partial boundary indicates that the partial boundary fails to satisfy the target boundary condition, to determine the boundary of the to-be-processed region.

In other embodiments of the present disclosure, if the information of the partial boundary thus obtained is determined to represent that the partial boundary is not clear or not simple, the mower may be considered to adapt to the remotely controlled movement mode at this time, and then the work mode of the mower will be switched to the remotely controlled movement mode, such that the mower works in the remotely controlled movement mode to determine the boundary of the to-be-trimmed lawn. The remotely controlled movement mode means that the operation object remotely controls the mower to move along an edge to determine the boundary.

It should be noted that in the remotely controlled movement mode or the autonomous movement mode, the mower may determine the boundary of the to-be-trimmed lawn based on a movement trajectory; or, in the autonomous movement mode, the mower may recognize a region of the to-be-trimmed lawn and the obstacle region in the to-be-recognized region based on the movement trajectory or using a semantic segmentation technology, thereby determining the boundary of the to-be-trimmed lawn.

Steps 205-206 may be executed after step 203 and step 204.

S205: receiving, by the device for determining information, an operation instruction for operating an operation object of the to-be-controlled device.

In embodiments of the present disclosure, the operation object may refer to a user who controls movement of the mower when the mower is in the remotely controlled movement mode. It should be noted that the operation instruction may be an instruction for controlling the mower to switch to the remotely controlled movement mode; and the operation instruction may be received by the mower in the process of switching back and forth between the remotely controlled movement mode and the autonomous movement mode determined in steps 201-204.

S206: controlling, by the device for determining information, the to-be-controlled device to switch to work in the remotely controlled movement mode based on the operation instruction, to determine the boundary of the to-be-processed region.

In embodiments of the present disclosure, in the process of switching back and forth between the remotely controlled movement mode and the autonomous movement mode of the mower to determine the boundary of the to-be-trimmed lawn, the user can take over the mower by force, and control the mower to work in the remotely controlled movement mode. After taking over the mower by force, the user can delete a part of boundary of the to-be-trimmed lawn determined in the autonomous movement mode, and control the mower to work in the remotely controlled movement mode to redetermine the deleted part of boundary to ensure the accuracy of the obtained boundary.

It should be noted that the description in other embodiments may be referred to for the description of same steps and same contents in the present embodiment as those in the other embodiments, which will not be repeated here.

The method for determining information provided in embodiments of the present disclosure can process a to-be-processed image collected by an image collector of a to-be-controlled device for a to-be-recognized region including a to-be-processed region and an obstacle region, to obtain information of a partial boundary of a to-be-processed region where the to-be-controlled device is currently located, determine a boundary of the to-be-processed region by combining an autonomous movement mode and a remotely controlled movement mode based on the information of the partial boundary, instead of determining the regional boundary separately using a constant mode, and determine the regional boundary without burying wires in the region, thereby solving the problems of cumbersome operations and low efficiency existing in solutions of determining a regional boundary in associated technologies.

Figure 3:
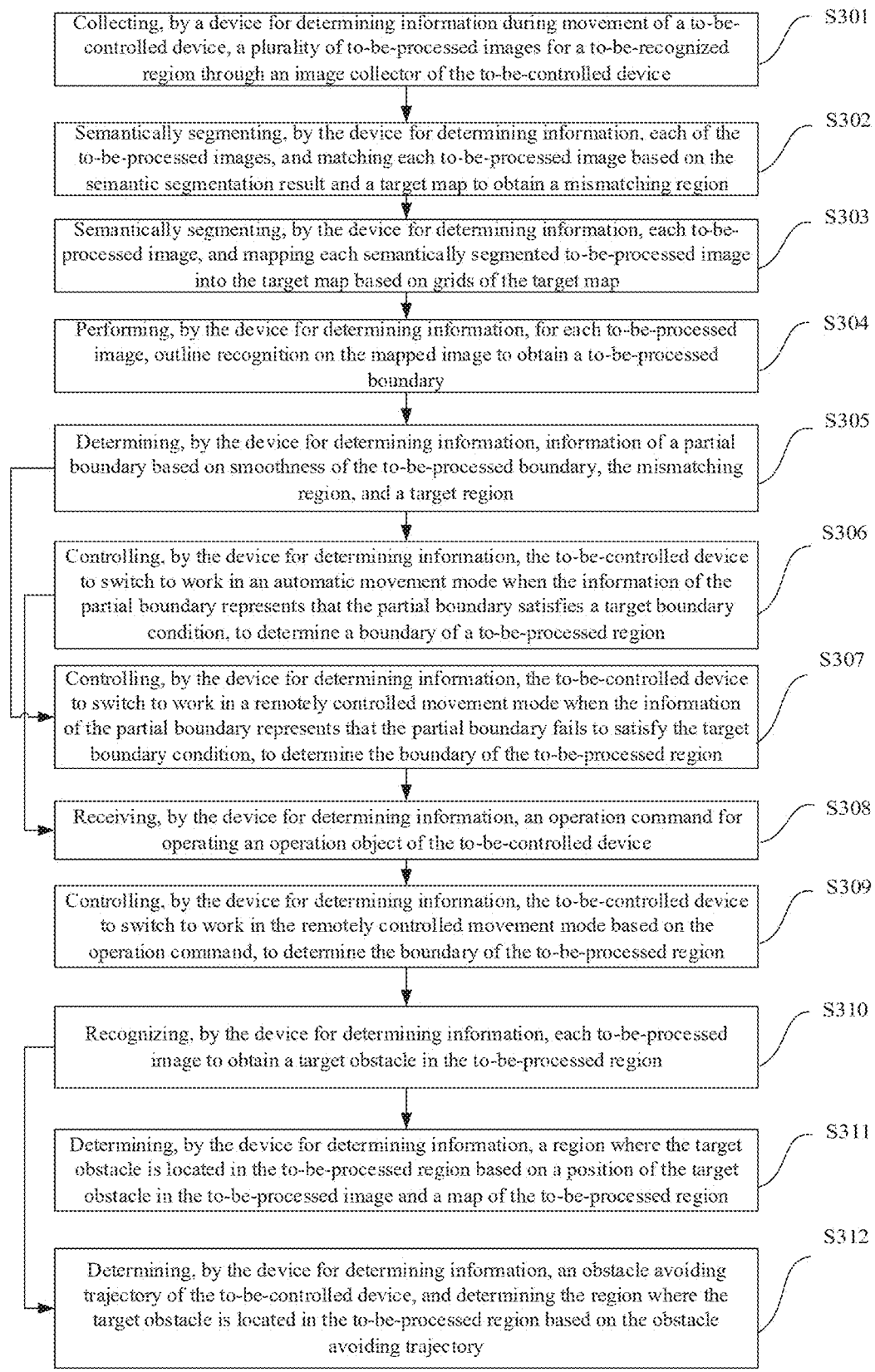
FIG. 3 is a flowchart of still another method for determining information provided in an embodiment of the present disclosure.

Based on the above embodiments, an embodiment of the present disclosure provides a method for determining information. Referring to FIG. 3, this method includes the following steps:

S301: collecting, by a device for determining information during movement of a to-be-controlled device, a plurality of to-be-processed images for a to-be-recognized region through an image collector of the to-be-controlled device.

The to-be-recognized region at least includes a to-be-processed region and an obstacle region.

S302: semantically segmenting, by the device for determining information, each of the to-be-processed images, and matching each to-be-processed image based on the semantic segmentation result and a target map to obtain a mismatching region.

The target map is a map of a target region in the to-be-recognized region.

In embodiments of the present disclosure, each to-be-processed image can be semantically segmented to determine different objects in the to-be-processed image, and map the semantically segmented to-be-processed image into the target map; and then, the plurality of mapped to-be-processed images is superimposed to determine a region where a same position corresponds to different objects in the target map based on the superimposition result (i.e., obtaining a region with a blurred image after superimposition of the same position in the target map), and obtain the mismatching region.

Figure 20:
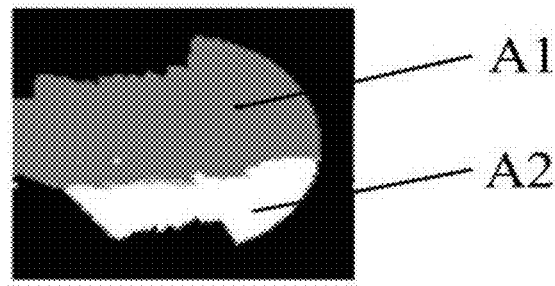
FIG. 20 is a schematic diagram of a target map determined using a method for determining information provided in an embodiment of the present disclosure.

In one possible implementation, the determined target map may be as shown in FIG. 20, where a region A1 in FIG. 20 represents a grass area, a region A2 represents the obstacle region, and a region except for A1 and A2 in FIG. 20 is an unknown region.

S303: semantically segmenting, by the device for determining information, each to-be-processed image, and mapping each semantically segmented to-be-processed image into the target map based on grids of the target map.

In embodiments of the present disclosure, the target map may have grid lines; each to-be-processed image may be semantically segmented to obtain an object in the to-be-processed image, and then the semantically segmented to-be-processed image may be mapped into the target map according to a corresponding relationship between pixel points of the semantically segmented to-be-processed image and the grids in the target map.

It should be noted that the semantic segmentation may refer to visual semantic segmentation, and may refer to segmentation of the to-be-processed image into interpretable categories with different semantics. Each pixel will have a certain category (such as a vehicle, a building, a plant, or a road surface). A common semantic segmentation method is semantic segmentation based on deep learning.

S304: performing, by the device for determining information, for each to-be-processed image, outline recognition on the mapped image to obtain a to-be-processed boundary.

In embodiments of the present disclosure, for each to-be-processed image, the device for determining information may perform outline recognition on the mapped image, and determine the to-be-processed boundary based on the outline recognition result.

It should be noted that the execution sequence between S302 and S303-304 is not sequential; i.e., S302 and S303-304 may be executed simultaneously, or S303-304 may be executed after execution of S302 is completed, or S302 may be executed after execution of S303-304 is completed. Further, an operation of determining smoothness of the to-be-processed boundary may be executed after S304 (i.e., before S305); i.e., the execution sequence of S302, that of S303-304, and that of the operation of determining the smoothness of the to-be-processed boundary may not be sequential.

S305: determining, by the device for determining information, information of a partial boundary based on smoothness of the to-be-processed boundary, the mismatching region, and a target region.

In embodiments of the present disclosure, the smoothness of the to-be-processed boundary may be determined by smoothing the to-be-processed boundary to obtain a smooth boundary, computing a ratio of a total length of the smooth boundary to a total length of the to-be-processed boundary, and then determination based on a relationship between the resulting ratio and a target ratio; if the resulting ratio is not within a target ratio range, the to-be-processed boundary is considered not to be smooth enough, and in this case, the information of the partial boundary may be considered to represent that the partial boundary is not simple; and if the resulting ratio is within the target ratio range, the information of the partial boundary is considered to represent that the partial boundary is smooth, and in this case, the to-be-processed boundary may be considered simple. It should be noted that the target ratio may be a ratio value predetermined based on historical data information.

In other embodiments of the present disclosure, all mismatching regions are added and summed. If a ratio of the sum value to the target region is greater than the target ratio, the information of the partial boundary is considered to represent that the partial boundary is not clear; and if the ratio of the sum value to the target region is less than or equal to the target ratio, the information of the partial boundary is considered to represent that the partial boundary is clear.

S306: controlling, by the device for determining information, the to-be-controlled device to switch to work in an autonomous movement mode when the information of the partial boundary indicates that the partial boundary satisfies a target boundary condition, to determine a boundary of a to-be-processed region.

S307: controlling, by the device for determining information, the to-be-controlled device to switch to work in a remotely controlled movement mode when the information of the partial boundary indicates that the partial boundary fails to satisfy the target boundary condition, to determine the boundary of the to-be-processed region.

S308: receiving, by the device for determining information, an operation instruction for operating an operation object of the to-be-controlled device.

S309: controlling, by the device for determining information, the to-be-controlled device to switch to work in the remotely controlled movement mode based on the operation instruction, to determine the boundary of the to-be-processed region.

In other embodiments of the present disclosure, if there is a plurality of to-be-trimmed grass areas, a user remotely controls a mower to cross over different to-be-trimmed grass areas to generate corresponding movement trajectories; and then can generate paths between the plurality of to-be-trimmed grass areas according to the movement trajectories.

Based on the above embodiments, in other embodiments of the present disclosure, the method for determining information may further include the following steps:

Step S310: recognizing, by the device for determining information, each to-be-processed image to obtain a target obstacle in the to-be-processed region.

In embodiments of the present disclosure, each to-be-processed image may be semantically segmented to determine the target obstacle in the to-be-processed region.

It should be noted that step S311 or step S312 may be selectively executed after step S310.

Step S311: determining, by the device for determining information, a region where the target obstacle is located in the to-be-processed region based on a position of the target obstacle in the to-be-processed image and a map of the to-be-processed region.

In embodiments of the present disclosure, after determining the target obstacle, the mower can determine the position of the target obstacle in the to-be-processed image, and compare the to-be-processed image with the map of the to-be-processed region, thereby determining the region where the target obstacle is located in the to-be-processed region based on the position of the target obstacle in the to-be-processed image and the comparison result.

Step S312: determining, by the device for determining information, an obstacle avoiding trajectory of the to-be-controlled device, and determining the region where the target obstacle is located in the to-be-processed region based on the obstacle avoiding trajectory.

The obstacle avoiding trajectory represents a trajectory formed by bypassing the target obstacle during movement of the to-be-controlled device.

In embodiments of the present disclosure, the obstacle avoiding trajectory is analyzed, and a boundary of the target obstacle is determined based on the analysis result, thereby obtaining the region where the target obstacle is located in the to-be-processed region. It should be noted that the user can switch the mower to the remotely controlled movement mode, erase, in the remotely controlled movement mode, paths previously passed in the autonomous movement mode, and re-determine an obstacle avoiding trajectory from an initial position in the remotely controlled movement mode, thereby determining the region where the target obstacle is located in the to-be-processed region.

FIG. 3 is only shown by, e.g., executing steps S310-S312 after step S309. However, steps S310-S312 may also be executed after step S306 or step S307.

Based on the above embodiments, in other embodiments of the present disclosure, the method may further include the following steps:

Step S313: determining, by the device for determining information, a visual feature map for the to-be-processed region.

In embodiments of the present disclosure, the visual feature map may be obtained by visual mapping; where visual positioning and mapping may mean that a mobile robot computes its own current position in real time through a pre-built map during autonomous movement. The visual positioning and mapping include a visual mapping process and a visual positioning process. The visual mapping process means to reorganize environmental data collected by a sensor into a specific data structure through an algorithm, where the employed sensor is mainly a Global Positioning System (GPS), a laser radar, a camera, a wheel speedometer, an inertial measurement unit (IMU), etc. The visual mapping is a camera-based mapping method, and may also be combined with other sensors. After mapping is completed by the visual positioning, the robot can obtain current position information by computation based on comparison between current sensor data with the visual feature map.

It should be noted that, in embodiments of the present disclosure, an image may be recorded using a camera during interactive mapping, and then optimized visual three-dimensional reconstruction may be performed by integrated navigation to obtain the visual feature map; or, visual three-dimensional reconstruction may be first performed, and then a mower trajectory after the visual three-dimensional reconstruction may be aligned with a real-time kinematic (RTK) trajectory to obtain the visual feature map; where the mower trajectory is aligned with the RTK trajectory, such that a coordinate system of the visual feature map is consistent with a coordinate system for the integrated navigation, to ensure the accuracy of subsequent positioning. In addition, in embodiments of the present disclosure, the visual feature map may be determined based on an integrated navigation technology, visual positioning, and mapping, and the specific determination process may include any possible implementation in associated technologies.

Step S314: determining, by the device for determining information, for a partial region satisfying a target signal condition in the to-be-processed region, a boundary of the partial region based on the visual feature map and a semantic segmentation technology.

In embodiments of the present disclosure, the target signal condition may mean that the RTK signal strength is less than the target signal strength, i.e., the RTK signal is poor; i.e., the partial region may refer to a region with poor RTK signal during visual mapping. For the region with poor RTK signal, the boundary of the partial region may be determined using the visual feature map and the semantic segmentation technology.

Step S315: obtaining, by the device for determining information, a target boundary of the to-be-processed region based on the boundary of the partial region and the boundary of the to-be-processed region.

In embodiments of the present disclosure, the boundary of the partial region may be compared with a boundary of the region with poor RTK signal among the boundary of the to-be-processed region, and a boundary farther from an obstacle among the above two boundaries may be selected for use as a final boundary of the partial region; or, if the boundary of the partial region is determined in the autonomous movement mode, the boundary of the partial region is selected for use as the final boundary of the partial region; or, a prompt message is generated to prompt the user that the RTK signal in this partial region is poor, and information of the above two boundaries is displayed, such that the user can choose the final boundary; and then, the target boundary of the to-be-processed region is obtained based on update of the final boundary of the partial region.

Step S316: performing, by the device for determining information, visual positioning based on the visual feature map to obtain a position of the to-be-controlled device.

In embodiments of the present disclosure, when the poor RTK signal is detected during operation of the mower, a pose of the mower is acquired through visual positioning, so as to be involved in subsequent computation of the integrated navigation; thereby reducing pose drift errors. Of course, the visual positioning based on the visual feature map may also be involved in the whole process of the computation of the integrated navigation.

It should be noted that, after step S313, steps S314-S315 may be executed or step S316 may be executed.

Based on the above embodiments, in other embodiments of the present disclosure, the method may further include the following steps:

Step S317: updating, by the device for determining information, a position of an obstacle in a map of the to-be-recognized region based on the target map or updating the region where the target obstacle is located based on an updated obstacle avoiding trajectory, when the target obstacle is determined to have a change.

Figure 21:
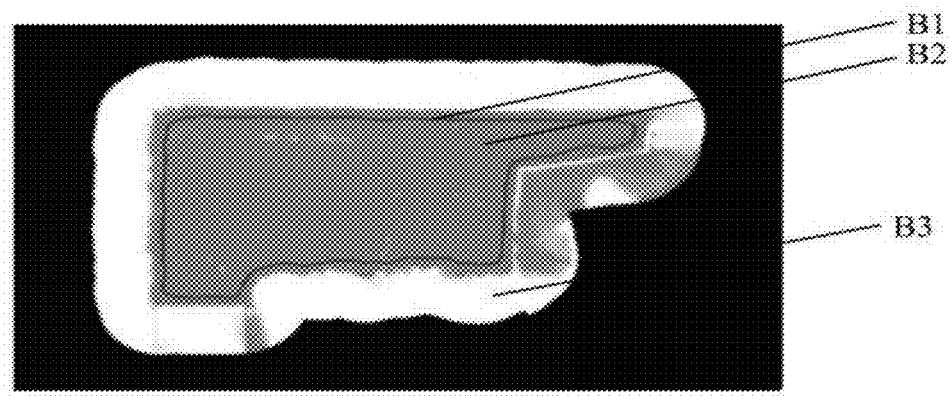
FIG. 21 is a schematic diagram of a map of a to-be-recognized region determined using a method for determining information provided in an embodiment of the present disclosure.

In one possible implementation, the determined map of the to-be-recognized region may be as shown in FIG. 21; where a trajectory B1 in FIG. 21 refers to an edging trajectory, a region B2 represents a grass area, a region B3 represents the obstacle region, and a region except for B2 and B3 in FIG. 21 is an unknown region. A junction between the region B2 and the region B3 is a grass boundary. The edging trajectory is also the grass boundary. The two boundaries may not overlap. When the mower moves along the edge in the autonomous movement mode, a difference between the edging trajectory and a trajectory at the junction between the region B2 and the region B3 is a vehicle body radius and a safety distance of the mower; and when the mower moves along the edge in the remotely controlled movement mode, the difference between the above two trajectories is larger. It should be noted that, when the boundary of the partial region or a boundary determined by the trajectory is selected at different positions for use as an actual grass boundary, the boundary of partial region needs to be inwardly contracted with a safe distance of the vehicle body radius.

Step S318: updating, by the device for determining information, a boundary of the to-be-recognized region in the map based on the target map or updating the boundary of the to-be-processed region based on the updated obstacle avoiding trajectory when the boundary of the to-be-processed region is determined to have a change.

It should be noted that, when a target obstacle of the to-be-trimmed grass area (i.e., an inner obstacle of the grass) or the boundary of the to-be-processed region is determined to have a change, an obstacle position in the map of the to-be-recognized region may be updated based on the target map, or the boundary in the map of the to-be-recognized region may be updated based on the target map. Alternatively, when the target obstacle of the to-be-trimmed grass area (i.e., the inner obstacle of the grass) or the boundary of the to-be-processed region is determined to have a change, the obstacle avoiding trajectory may be first updated, and the updated obstacle avoiding trajectory may be analyzed to update the region where the target obstacle is located or the boundary of the to-be-processed region. In this way, when the boundary changes, a map of a passable region and a boundary of the grass can be automatically updated with segmentation and positioning data during the operation of the mower, thereby greatly reducing manual operations, and improving work efficiency.

In other embodiments of the present disclosure, the method may further include the following steps:

Step S319: determining and displaying, by the device for determining information, a to-be-updated update content in the map of the to-be-recognized region when the target obstacle or the boundary of the to-be-processed region is determined to have a change.

Step S320: updating, by the device for determining information, the boundary and an obstacle position in the map of the to-be-recognized region based on a selection operation of an operation object.

In embodiments of the present disclosure, when the target obstacle of the to-be-trimmed grass area (i.e., the inner obstacle of the grass) or the boundary of the to-be-processed region is determined to have a change, the to-be-updated update content in the map of the to-be-recognized region may be displayed, such that the user selects whether to update and which part of the region includes to-be-updated information.

Steps S317-S318 and steps S319-S320 may be executed in parallel, or only steps S317-S318 may be executed, or only steps S319-S320 may be executed.

In other embodiments of the present disclosure, the mower can carry a satellite positioning apparatus (RTK), an environmental sensor (camera), and a motion sensor (IMU and wheel speedometer). The satellite positioning apparatus and an autonomous motion sensor compute the pose and the movement trajectory of the mower using an integrated navigation algorithm. An image collected by the camera may be used for obstacle detection (distinguishing the grass from the obstacle region by, e.g., semantic segmentation, and projecting a segmentation result of a multiframe image onto assumed ground to generate local obstacle maps in real time), or may be used for visual mapping and visual positioning. The method of ascertaining the boundary between the grass and the obstacle based on a camera image includes conventional image processing, machine learning, semantic segmentation based on deep learning, etc. The environmental sensor not only includes a camera, but also includes a depth camera, a laser radar, or a combination thereof.

It should be noted that the description in other embodiments may be referred to for the description of same steps and same contents in the present embodiment as those in the other embodiments, which will not be repeated here.

The method for determining information provided in embodiments of the present disclosure can process a to-be-processed image collected by an image collector of a to-be-controlled device for a to-be-recognized region including a to-be-processed region and an obstacle region, to obtain information of a partial boundary of a to-be-processed region where the to-be-controlled device is currently located, determine a boundary of the to-be-processed region by combining an autonomous movement mode and a remotely controlled movement mode based on the information of the partial boundary, instead of determining the regional boundary separately using a constant mode, and determine the regional boundary without burying wires in the region, thereby solving the problems of cumbersome operations and low efficiency existing in solutions of determining a regional boundary in associated technologies.

For example, the to-be-controlled device is a mowing apparatus. The method for determining information provided in the present disclosure is specifically described below.

Figure 4:
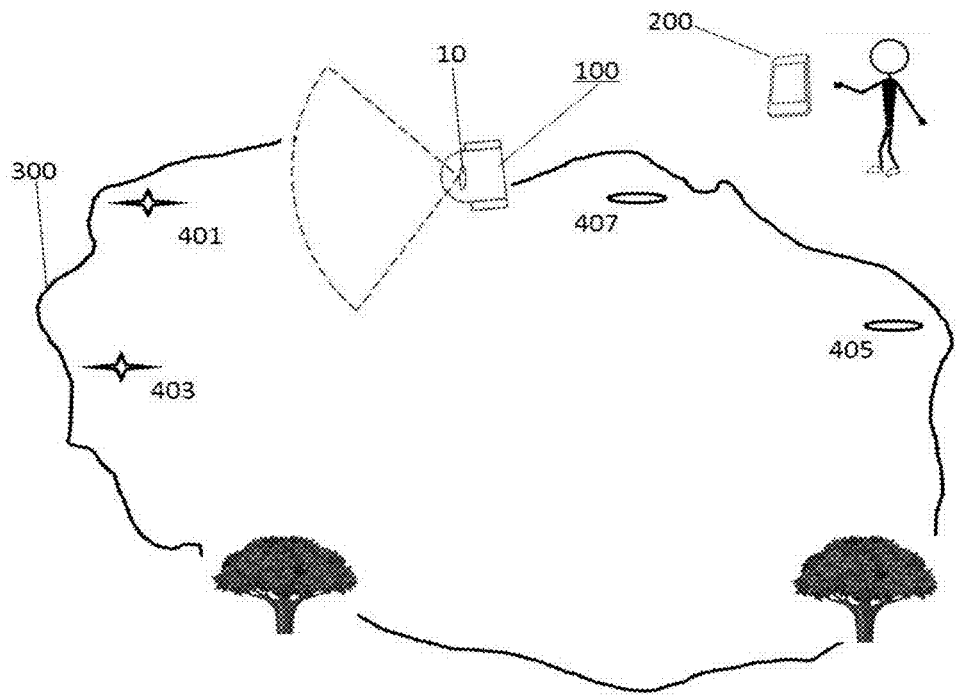
FIG. 4 is a schematic diagram of a mowing apparatus provided in an embodiment of the present disclosure.

For the convenience of description and understanding, before the description of the method, a structure and a working scenario of the mowing apparatus are briefly described as follows. As shown in FIG. 4, the mowing apparatus 100 mainly includes a mowing knife assembly, a driving wheel, a controller, a communication port, a positioning unit (not shown in the figure), and an environmental information collection unit 10. A driving wheel set can drive the mowing apparatus to move. The mowing knife assembly is configured to cut grass near the mowing apparatus. The controller can control the mowing apparatus to move within a continuous boundary mark (such as a boundary line). The boundary line mark is intended to limit the apparatus into the lawn or other appropriate regions, thereby avoiding damaging non-grassing areas such as fountains outside the appropriate regions or avoiding invading neighboring territories. This boundary mark is usually a continuous loop around a to-be-cut region. The controller is connected with electric signals, such as the driving wheel set, the mowing knife assembly, the communication port, and the positioning unit, to control and position the mowing apparatus. The communication port enables the mowing apparatus to communicate with a remote terminal 200 (such as a mobile phone or other remote terminals and a special remote controller for the mowing apparatus). It should be noted that the so-called "remote terminal" here refers to a terminal that is not integrated with the mowing apparatus, but is provided outside the mowing apparatus body, such as a special remote controller of the mowing apparatus, or a mobile phone, or an iPad installed with a relevant application. A user can interact with the mowing apparatus through the application on the remote terminal 200.

The communication port may be a near-field communication port, such as Bluetooth or WiFi. The near-field communication port causes low communication delay between the mowing apparatus and the remote terminal 200, thereby further improving the efficiency of generating the virtual work boundary, and saving user time. Of course, a network port may also be used as the above communication port.

The positioning unit may be, for example, a global positioning system (GPS) receiver provided on the mowing apparatus 100, an Ultra-Wide Band (UWB) positioning tag, or a position sensor capable of providing position information of the mowing apparatus 100. Taking GPS as an example, the GPS receiver can estimate the position information of the mowing apparatus 100 during movement, and can provide the position information to a controller of the mowing apparatus 100 (the controller of the mowing apparatus 100 will be described in detail below). A differential GPS, i.e., a global positioning system with a differential correction signal added to a normal GPS, may be used, thereby further improving the positioning accuracy. Taking the ultra-wide band positioning as an example, when the mowing apparatus moves, the ultra-wide band positioning tag on the mowing apparatus 100 can transmit an ultra-wide band signal to a cloud server installed with a positioning algorithm. The cloud server performs position computation using the positioning algorithm, and displays a global tag position. It should be understood that technologies capable of acquiring the position information of the mowing apparatus 100 during movement can be used in embodiments of the present disclosure.

The environmental information collection unit 10 is configured to collect environmental information of the mowing apparatus. It should be understood that the so-called "environment" here is relative to the mowing apparatus, and the "environmental information" refers to information about an object around the mowing apparatus, including information about a lawn area (actual boundary of the lawn area shown by a curve 300 in FIG. 1) and an obstacle (such as a tree, a fence, a road, and a cement floor shown in FIG. 1) around the mowing apparatus. The environmental information collection unit 10 may be any sensor capable of acquiring the environmental information of the mowing apparatus 100, such as an image sensor (e.g., a camera), a laser radar, a sonar, or a radio frequency identification (RFID) apparatus. As shown in FIG. 1, the image sensor provided on the mowing apparatus 100 can acquire an image of an environment in front of the mowing apparatus 100. The dashed sector area in FIG. 1 shows a range of an environmental image that can be captured by the image sensor at a current position of the mowing apparatus. Because the mowing apparatus 100 constantly moves, in one or more embodiments of the present disclosure, the environmental information collection unit 10 can acquire images in real time at set intervals (for example, every 0.1 sec). A boundary of a working range of the mowing apparatus 100 in an environment is recognized using an image recognition algorithm, such as a boundary line between grass and non-grass in the image.

In addition, the mowing apparatus 100 can acquire the environmental information of the mowing apparatus 100 from other information sources without being provided with the environmental information collection unit 10. For example, the mowing apparatus 100 can acquire a top view image of the environment of the mowing apparatus 100 from Google Maps, Baidu Maps, or a satellite through the communication port.

When the to-be-controlled device is the above mowing apparatus, an implementation process of the method for determining information provided in the present disclosure is described in detail below.

Figure 5:
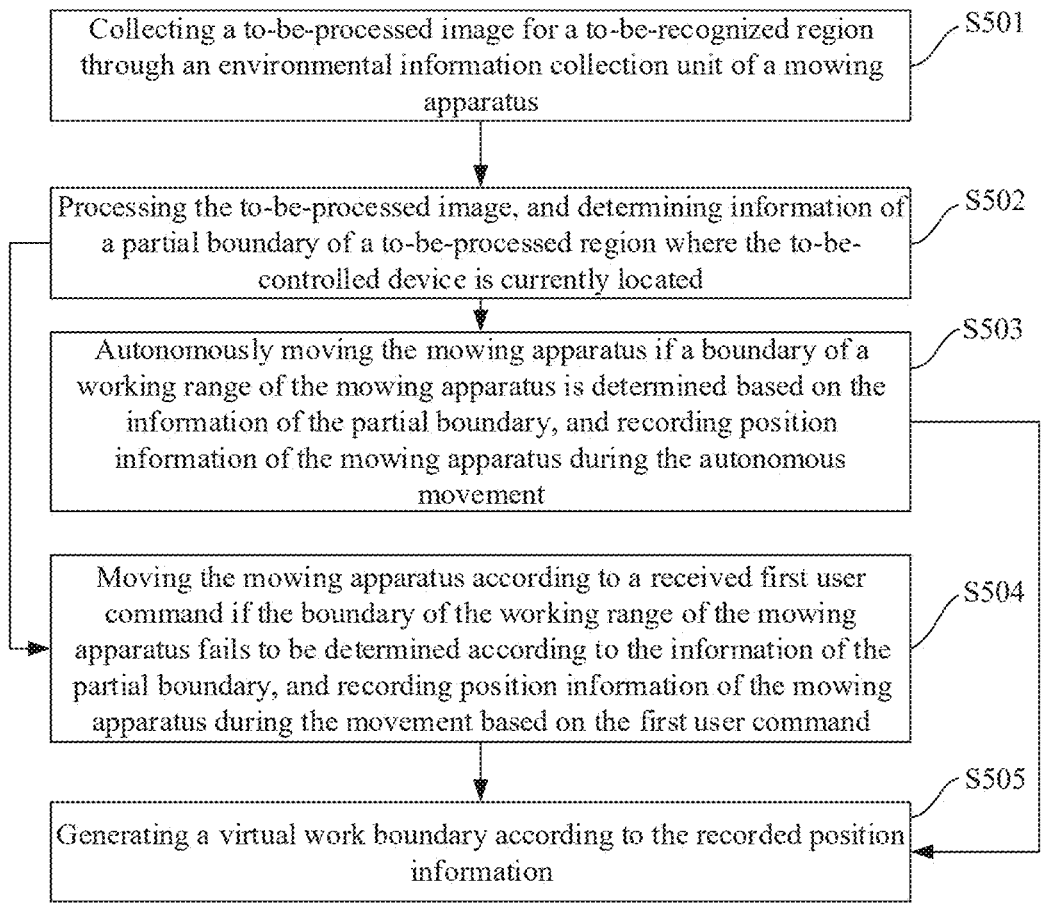
FIG. 5 is a flowchart of a method for determining information applied to a mowing apparatus provided in an embodiment of the present disclosure.

As shown in FIG. 5, a flow chart of steps of a method for determining information is shown. The method for determining information can be applied to a to-be-controlled device, where the to-be-controlled device includes a mowing apparatus. The method includes:

S501: collecting a to-be-processed image for a to-be-recognized region through an environmental information collection unit of a mowing apparatus.

S502: processing the to-be-processed image, and determining information of a partial boundary of a to-be-processed region where the to-be-controlled device is currently located.

S503: autonomously moving the mowing apparatus if a boundary of a working range of the mowing apparatus is determined based on the information of the partial boundary, and recording position information of the mowing apparatus during the autonomous movement.

S504: moving the mowing apparatus according to a received first user instruction if the boundary of the working range of the mowing apparatus fails to be determined based on the information of the partial boundary, and recording position information of the mowing apparatus during the movement according to the first user instruction.

S505: generating a virtual work boundary according to the recorded position information.

It should be noted that the to-be-processed image of the to-be-recognized region includes environmental information, i.e., the environmental information is an image of an environment collected through an environment collection unit during movement of the mowing apparatus, and on this basis, information of a partial boundary of a to-be-processed region where the mowing apparatus is currently located can be determined, where the information of the partial boundary is a boundary line between the to-be-recognized region and the obstacle region, for example, a boundary line between lawn and non-lawn. The boundary of the working range of the mowing apparatus is a boundary that can satisfy the autonomous movement mode (autonomous movement) of the mowing apparatus, such as the clear or simple boundary in the above embodiments.

In embodiments of the present disclosure, the environmental information during movement of the mowing apparatus can be collected using the environmental information collection unit 10 on the mowing apparatus shown in FIG. 4 for use as the to-be-processed image of the to-be-recognized region. For example, when the mowing apparatus 100 starts to move on a mowing area to generate the virtual work boundary, the environmental information collection unit 10 can be started to collect the environmental information of the mowing apparatus during movement. The environmental information collection unit 10 shown in FIG. 1 may be a built-in image sensor of the mowing apparatus 100. The image sensor may be arranged in the front of the mowing apparatus 100, and its number may be one or more. For example, an image sensor may be provided on the head, left side, and right side of the mowing apparatus, respectively. The image sensor constantly acquires image information of the environment around the mowing apparatus 100 as the mowing apparatus 100 moves (the dashed sector area in FIG. 4 shows a range of the environment where the image sensor can capture an image at a current position of the mowing apparatus, i.e., a visual field or visible region of the image sensor). Since the mowing apparatus 100 constantly moves, the environmental information collection unit 10 can acquire environmental images at set intervals (for example, every 0.1 sec). It can be understood that the mowing apparatus 100 can also receive environmental information of the mowing apparatus 100 from Google Maps, Baidu Maps or a satellite through its communication port. In addition, a plurality of types of environmental information collection units 10 may also be provided in combination. For example, a plurality of types of sensors, such as an image sensor, a collision sensor, and a depth sensor, may be provided on the mowing apparatus to fuse detection results of the plurality of sensors, and further improve detection accuracy of the environmental information.

According to embodiments of the present disclosure, whether the environmental information includes the boundary of the working range of the mowing apparatus 100 can be recognized based on the information of the partial boundary included in the acquired environmental information. For example, the mowing apparatus 100 (including the mowing apparatus itself or a server (such as a cloud server) that generates a communication connection with the mowing apparatus) may be equipped with a recognition algorithm of the boundary of the working range to recognize whether the environmental information includes the boundary of the working range of the mowing apparatus 100 through the recognition algorithm.

Specifically, a neural network model may be used as the recognition algorithm of the boundary of the working range of the mowing apparatus. For example, a plurality of neural network models, such as FCN (fully convolutional neural network), U-Net network structure, or DeepLab, may be used. Sample data may be pre-collected to train an initial neural network model, to generate the neural network model. For example, images of a plurality of lawns may be collected, boundaries between grass and non-grass are manually annotated in the images, the initial neural network model is trained with the annotated image data, and the trained neural network model may be used as the recognition algorithm for recognizing the boundary of the working range of the mowing apparatus. In addition, an existing neural network model in a mowing apparatus may be updated, to further improve recognition accuracy. For example, as the mowing apparatus is used by increasing American households, and increasing lawn data is collected, the neural network model can be constantly optimized, and then be updated in the mowing apparatus, to improve the recognition accuracy. A confidence threshold of the recognition algorithm may be set. That is, if a computing result of the trained neural network model on the image data is less than the set confidence threshold, it is determined that the boundary of the working range of the mowing apparatus fails to be recognized. Otherwise, if a computing result of the trained neural network model on the image data is greater than the set confidence threshold, it is determined that the boundary of the working range of the mowing apparatus can be recognized.

In S503, if the boundary of the working range of the mowing apparatus is determined, the mowing apparatus can autonomously move and enter an autonomous mode of autonomously generating the virtual work boundary, i.e., the autonomous movement mode, without the need of manually remotely controlling the mowing apparatus by a user. For example, the controller of the mowing apparatus may store instructions. When the environmental information including the boundary of the working range of the mowing apparatus is recognized according to the acquired environmental information, i.e., when the boundary of the working range of the mowing apparatus is determined based on the information of the partial boundary, the controller can control the mowing apparatus to autonomously move by executing these instructions. Further, the mowing apparatus will record the position information during the autonomous movement. For example, a global positioning system or ultra-wide band system can send geographical position coordinates of the mowing apparatus during autonomous movement to a positioning unit of the mowing apparatus. For example, stars 401 and 403 in FIG. 4 represent two geographical positions where the mowing apparatus passes during the autonomous movement. A GPS receiver of the mowing apparatus 100 can receive position information of the two geographical positions (such as longitude and latitude coordinates of each position, or position coordinates of the mowing area in a local position coordinate system) represented by the stars 401 and 403 sent from the GPS system where the mowing apparatus 100 passes during the autonomous movement of the mowing apparatus. The mowing apparatus 100 can record the position information of the two geographical positions in its memory. In one or more embodiments of the present disclosure, the environmental information can be acquired at predetermined intervals and whether the environmental information includes the boundary of the working range of the mowing apparatus 100 can be recognized. When the boundary of the working range of the mowing apparatus can be recognized from the environmental information, the mowing apparatus can enter an automatic mode of autonomously generating the virtual work boundary.

In S504, when the boundary of the working range of the mowing apparatus fails to be determined based on the information of the partial boundary, i.e., when the boundary of the working range of the mowing apparatus fails to be recognized based on the environmental information of the mowing apparatus during movement, the mowing apparatus can enter a manual mode of manually generating the virtual work boundary, and moves according to the received first user instruction. Specifically, when whether the acquired environmental information includes the boundary of the working range of the mowing apparatus fails to be recognized using the recognition algorithm on the mowing apparatus or the server having the communication connection with the mowing apparatus, the user can intervene and input the first user instruction, for example, the user can input a instruction for making the mowing apparatus move forward, or move backward, or turn forward, or turn left by 30 degrees through a display interface of a remote terminal 200. In order to facilitate inputting the first user instruction by the user, a virtual joystick for remotely controlling a direction can be displayed in the display interface of the remote terminal 200, so that the user can control a movement direction and a movement distance of the mowing apparatus by clicking and dragging the virtual joystick. The mowing apparatus moves according to the received first user instruction, and records the position information during the movement according to the first user instruction. For example, ellipses 405 and 407 in FIG. 4 represent two geographical positions where the mowing apparatus passes during the movement according to the received first user instruction. The positioning unit can acquire position coordinates of these geographical positions. For example, the GPS receiver of the mowing apparatus 100 can receive longitude and latitude coordinates of the mowing apparatus 100 at the two geographical positions shown by the ellipses 405 and 407 sent from the GPS system. The mowing apparatus can record the position information of the two geographical positions in its memory.

In S505, the mowing apparatus can generate the virtual work boundary based on the recorded position information. In one or more embodiments of the present disclosure, the virtual work boundary of the lawn can be built after the mowing apparatus moves around the to-be-cut lawn by one circle and records position information of a plurality of movement positions. For example, the mowing apparatus can map each piece of the recorded position information to a local coordinate system of the mowing apparatus to obtain the virtual work boundary.

In the above embodiments of the present disclosure, entering an autonomous mapping mode or entering a manual mapping mode is selected according to a recognition result of the environmental information. The autonomous mapping mode is introduced, and the autonomous mapping mode and the manual mapping mode are combined, thereby saving user time, improving user work efficiency, and improving user experience, without affecting accuracy of the built virtual work boundary.

Figure 6:
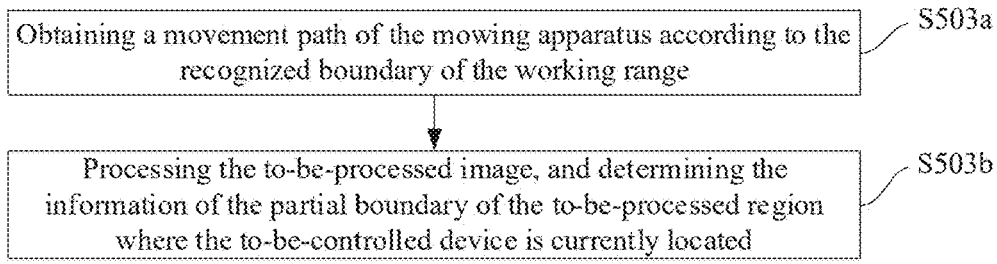
FIG. 6 is a schematic flowchart of an autonomous mapping mode provided in an embodiment of the present disclosure.
Figure 7:
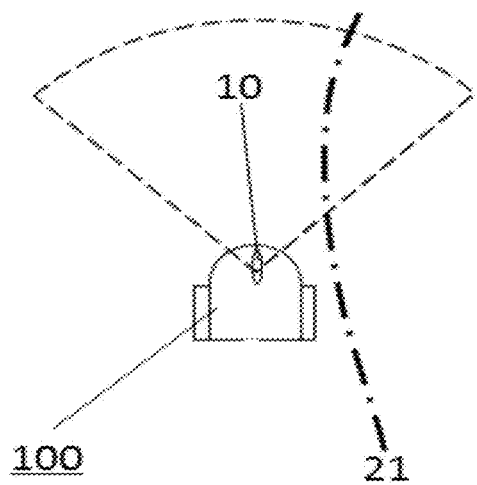
FIG. 7 is a schematic diagram of a movement path in an autonomous mapping mode provided in an embodiment of the present disclosure.

FIG. 6 is a schematic flowchart of an autonomous mapping mode provided in an embodiment of the present disclosure, and FIG. 7 is a schematic diagram of a movement path in an autonomous mapping mode provided in an embodiment of the present disclosure. According to one or more embodiments of the present disclosure, S503: autonomously moving, if the boundary of the working range of the mowing apparatus is determined based on the information of the partial boundary, i.e., the boundary of the working range of the mowing apparatus is recognized based on the environmental information of the mowing apparatus during movement, the mowing apparatus, and recording the position information of the mowing apparatus during the autonomous movement, may include S503*a*: obtaining a movement path of the mowing apparatus according to the recognized boundary of the working range; and S503*b*: autonomously moving the mowing apparatus along the movement path. For example, the mowing apparatus 100 includes the environmental information collection unit 10 that collects environmental image information, and when a boundary 21 of a working range is recognized from an image at a position shown in FIG. 7 according to the image information collected by the environmental information collection unit 10, the movement path of the mowing apparatus can be obtained according to the recognized boundary 21 of the working range. For example, the mowing apparatus 100 can plan its autonomous movement path with reference to the recognized boundary 21 of the working range. The autonomous movement path of the mowing apparatus 100 may be parallel to the boundary line 21 of the working range, is located within the boundary line 21 of the working range, and is always distanced from the boundary line 21 of the working range by half a width of the mowing apparatus 100 (i.e., a distance between the center of the mowing apparatus and its left or right side), thereby preventing outer sides (i.e., left side and right side) of the mowing apparatus from exceeding the boundary line 21 of the working range during movement.

In the above embodiments of the present disclosure, the autonomous movement path of the mowing apparatus is planned with reference to the boundary of the working range of the mowing apparatus recognized from the environmental information, thereby simplifying the movement path planning of the mowing apparatus, and ensuring that the mowing apparatus will not walk out of the lawn or collide with an obstacle during autonomous movement.

According to one or more embodiments of the present disclosure, when the boundary of the working range of the mowing apparatus is determined based on the information of the partial boundary, i.e., when the boundary of the working range of the mowing apparatus is recognized based on the environmental information of the mowing apparatus during movement and the first user instruction is received, the mowing apparatus moves according to the received first user instruction, and records the position information of the mowing apparatus during the movement according to the first user instruction. In the embodiment, even if the boundary of the working range of the mowing apparatus can be recognized from the environmental information, but if the user inputs his instruction through the remote terminal, for example, the user inputs his desired target movement position through a blank area in a touch screen, in this case, the mowing apparatus may move not according to the recognized boundary of the working range, but moves from the current position to the user-defined target movement position along a predefined path (for example, a straight line). For example, when the user ascertains according to the recognized boundary of the working range displayed on the remote terminal that: the mowing apparatus will fall when moving along a path that is distanced from the boundary of the working range by half a width of the mowing apparatus, for example, if the path runs through a steep slope, the user can guide the mowing apparatus to bypass the steep slope by inputting the first user instruction.

In one or more embodiments of the present disclosure, the first user instruction may include the user-defined target movement position, and a control program of the mowing apparatus may be set to move from the current position of the mowing apparatus to the target movement position along a straight line. The above embodiments make it possible to generate a more accurate virtual work boundary, receive the user-defined target position at any time, generate a virtual work boundary that is more consistent with user expectations, and improve the user experience.

In one possible implementation, when the to-be-controlled device, e.g., the mowing apparatus, satisfies at least one of the following conditions, the to-be-controlled device will be controlled to exit the autonomous movement mode:

(i) the to-be-controlled device is disconnected from the remote terminal, where the remote terminal is used for controlling the to-be-controlled device to move; and (ii) the to-be-controlled device moves to a preset target position.

When the to-be-controlled device is disconnected from the remote terminal, the to-be-controlled device is controlled to exit the autonomous movement mode. For example, when the to-be-controlled device is a mowing apparatus, and when the mowing apparatus fails to be connected with the remote terminal (such as a mobile phone or other remote control devices), the mowing apparatus exits the autonomous movement mode.

It should be understood that when the to-be-controlled device is switched off manually, which can also be understood as that the to-be-controlled device is disconnected from the remote terminal, and because the to-be-controlled device is switched off, the to-be-controlled device will also exit the autonomous movement mode.

When moving to the preset target position, the to-be-controlled device will exit the autonomous movement mode. For example, when moving to the vicinity of the starting point, the to-be-controlled device will exit the autonomous movement mode because of moving to the starting point, thereby switching to the remotely controlled movement mode, i.e., receiving the first user instruction and moving accordingly.

In embodiments of the present disclosure, the to-be-controlled device, such as the mowing apparatus, will exit the autonomous movement mode after satisfying a specific condition, switch to the remotely controlled movement mode, thereby preventing disconnection of the to-be-controlled device in the autonomous movement mode from causing failure to record the position information, and will also switch to the remotely controlled movement mode when reaching the preset target position, such that the to-be-controlled device can autonomously close the boundary, thereby preventing repeated recording of path information from affecting the determined virtual work boundary, and solving the problems of cumbersome operations and low efficiency.

In one possible implementation, if the boundary of the working range of the to-be-controlled device is determined based on the information of the partial boundary when the to-be-controlled device is in the remotely controlled movement mode, a first instruction message is sent to the remote terminal, such that the remote terminal displays a first mode switching control widget through the display interface according to the first instruction message; and if a first control message sent from the remote terminal in response to triggering of the first mode switching control widget is received, the autonomous movement mode is switched to for autonomous movement, position information of the to-be-controlled device during the autonomous movement is recorded, and a boundary of the to-be-processed region is built according to the recorded position information.

If the boundary of the working range of the to-be-controlled device, for example, the simple and/or smooth partial boundary satisfying the condition for switching to the autonomous movement mode in the above embodiments, such as the boundary line 21 of the working range in FIG. 7, can be recognized based on the information of the partial boundary (e.g., a boundary line between grass and non-grass) from the environmental information when the to-be-controlled device is in the remotely controlled movement mode, the first instruction message is sent to the remote terminal, where the first instruction message can serve to inform the remote terminal that the to-be-controlled device recognizes the boundary of the working range, such that the remote terminal can display the first mode switching control widget through the display interface according to the first instruction message. If the switching control is triggered at this time, the remote terminal sends the first control message to the to-be-controlled device, such that the to-be-controlled device switches to the autonomous movement mode.

It should be understood that if the first mode switching control widget is not triggered after the remote terminal receives the first instruction message, the remote terminal will not send the first control message to the to-be-controlled device, i.e., the to-be-controlled device will keep moving in the remotely controlled movement mode.

After switching to the autonomous movement mode, the to-be-controlled device can autonomously move according to the recognized boundary of the working range, and will record position information during the movement. Specifically, the recording the position information includes, but is not limited to, recording the boundary using RTK (real-time kinematic) carrier phase difference technology. Therefore, information of the current position can be recorded at set intervals during the autonomous movement, and finally, the recorded position points can be connected to generate the boundary of the to-be-processed region according to the recorded position information.

It should be noted that the to-be-controlled device is initially in the remotely controlled movement mode, can receive a manual operation instruction, and moves accordingly. After the corresponding boundary of the working range is recognized, the above operations are executed. If the boundary of the working range of the to-be-controlled device is determined according to the information of partial boundary when the to-be-controlled device itself is in the autonomous movement mode, the to-be-controlled device will continue to autonomously move in the autonomous movement mode.

In embodiments of the present disclosure, when the to-be-controlled device is in the remotely controlled movement mode and after the corresponding boundary of the working range is determined, the first instruction message is sent to the remote terminal, and the first control message sent from the remote terminal based on the first instruction message is received, thereby switching from the remotely controlled movement mode to the autonomous movement mode. Because the user is required to trigger the first mode switching control widget during the switching, the user has the right to choose, i.e., when the user would not like to enter the autonomous movement mode, he can choose to keep moving in the remotely controlled movement mode, and can achieve the effect of prompting the user that he can enter the autonomous movement mode, such that the user can promptly control the to-be-controlled device to enter the autonomous movement mode to autonomously move, thereby solving the problems of cumbersome operations and low efficiency existing in solutions of determining a regional boundary in associated technologies.

In one possible implementation, if the boundary of the working range of the to-be-controlled device fails to be determined based on the information of the partial boundary when the to-be-controlled device is in the autonomous movement mode, a second instruction message is sent to the remote terminal, such that the remote terminal displays a first movement control widget through the display interface according to the second instruction message, then receives a second control message sent from the remote terminal in response to triggering of the first movement control widget, moves according to the second control message, records position information of the to-be-controlled device during the movement according to the second control message, and generates a boundary of the to-be-processed region according to the recorded position information.

If the boundary of the working range of the to-be-controlled device, for example, a discontinuous boundary or a curved boundary in the information of the partial boundary, fails to be determined based on the information of the partial boundary recognized from the environmental information when the to-be-controlled device is in the autonomous movement mode, the second instruction message is sent to the remote terminal, where the second instruction message can serve to inform the remote terminal that the to-be-controlled device fails to recognize the boundary of the working range, such that the remote terminal can display the first movement control widget according to the second instruction message, and send the second control message to the to-be-controlled device based on triggering of the first movement control widget.

When receiving the second control message, the to-be-controlled device switches from the autonomous movement mode to the remotely controlled movement mode, and moves according to the second control message. Specifically, the second control message includes a movement instruction generated by manually operating the first movement control widget, for example, the first movement control widget may be a virtual joystick, and the second control message may be a movement instruction generated by manually dragging the virtual joystick. At the same time, position information during the movement will be recorded. Specifically, the recording the position information includes, but is not limited to, recording the boundary using RTK (real-time kinematic) carrier phase difference technology. The information of the current position is recorded at set intervals, and finally, the recorded position points are connected to generate the boundary of the to-be-processed region according to the recorded position information.

It should be noted that since the to-be-controlled device includes the autonomous movement mode and/or the remotely controlled movement mode during movement, the boundary of the complete to-be-processed region can be determined according to the position information recorded in the autonomous movement mode and/or the position information recorded in the remotely controlled movement mode.

In embodiments of the present disclosure, if the corresponding boundary of the working range fails to be determined when the to-be-controlled device is in the autonomous movement mode, the second instruction message is sent to the remote terminal, and the second control message sent from the remote terminal based on the second instruction message is received, to switch from the autonomous movement mode to the remotely controlled movement mode, such that the to-be-controlled device can move according to the user operation instruction when the condition of the autonomous movement mode is not satisfied, thereby avoiding a phenomenon that the to-be-controlled device fails to autonomously move and then stays in situ because the condition of the autonomous movement mode is not satisfied, determining a more reliable boundary of the to-be-processed region, and solving the problems of cumbersome operations and low efficiency existing in solutions of determining a regional boundary in associated technologies.

In one possible implementation, if a third control message sent from the remote terminal in response to triggering of a second mode switching control widget is received when the to-be-controlled device is in the remotely controlled movement mode, the autonomous movement mode is switched to for autonomous movement, and position information of the to-be-controlled device during the autonomous movement is recorded, where the second mode switching control widget is displayed through the display interface after the remote terminal determines the boundary of the working range of the to-be-controlled device, and the boundary of the to-be-processed region is built according to the recorded position information.

In embodiments of the present disclosure, if the third control message sent from the remote terminal is received when the to-be-controlled device is in the remotely controlled movement mode, the autonomous movement mode is switched to, thereby switching from the remotely controlled movement mode to the autonomous movement mode. Because the third control message is sent in response to triggering of the second mode switching control widget after the remote terminal recognizes the boundary of the working range based on the information of the partial boundary, in this process, the boundary of the working range is recognized using the remote terminal without the need of using the to-be-controlled device, thereby reducing processor costs of the to-be-controlled device. Further, it is necessary to trigger the second mode switching control widget during the switching, the user has the right to choose, i.e., when the user would not like to enter the autonomous movement mode, he can choose to keep moving in the remotely controlled movement mode, and is prompted that currently, he can enter the autonomous movement mode, such that the user can promptly control the to-be-controlled device to enter the autonomous movement mode to autonomously move, thereby solving the problems of cumbersome operations and low efficiency existing in solutions of determining a regional boundary in associated technologies.

In one possible implementation, if a fourth control message sent from the remote terminal in response to triggering of a second movement control widget is received when the to-be-controlled device is in the autonomous movement mode, the to-be-controlled device moves according to the fourth control message, records position information of the to-be-controlled device during the movement according to the fourth control message, and generates the boundary of the to-be-processed region according to the recorded position information.

In embodiments of the present disclosure, if the fourth control message sent from the remote terminal is received when the to-be-controlled device is in the autonomous movement mode, the to-be-controlled device switches to the remotely controlled movement mode, thereby switching from the autonomous movement mode to the remotely controlled movement mode.

Because the fourth control message is sent when the remote terminal fails to recognize the boundary of the working range based on the information of the partial boundary and the second movement control widget is triggered, in this process, the boundary of the working range is recognized using the remote terminal without the need of using the to-be-controlled device, thereby reducing processor costs of the to-be-controlled device. Further, the to-be-controlled device may move according to the user operation instruction when the condition of the autonomous movement mode is not satisfied, thereby avoiding a phenomenon that the to-be-controlled device fails to autonomously move and then stays in situ because the condition of the autonomous movement mode is not satisfied, determining a more reliable boundary of the to-be-processed region, and solving the problems of cumbersome operations and low efficiency existing in solutions of determining a regional boundary in associated technologies.

Another aspect of the present disclosure provides a method for determining information for a remote terminal. The method includes: receiving information of a partial boundary sent from a to-be-controlled device, sending control information to the to-be-controlled device based on the information of the partial boundary, such that the to-be-controlled device switches between the autonomous movement mode and the remotely controlled movement mode according to the control information, and determining a boundary of a to-be-processed region, where the boundary of the to-be-processed region is used for distinguishing the to-be-processed region from an obstacle region.

In embodiments of the present disclosure, the information of the partial boundary is used for indicating a partial boundary of a to-be-processed region where the to-be-controlled device is currently located, the information of the partial boundary is obtained by the to-be-controlled device from processing of a to-be-processed image, the to-beprocessed image is obtained by an image collector of the to-be-controlled device from image collection of a to-be-recognized region, and the to-be-recognized region at least includes a to-be-processed region and an obstacle region.

The remote terminal in embodiments of the present disclosure includes, but is not limited to, a mobile phone, a touch remote controller, a remote control apparatus, etc.

In embodiments of the present disclosure, the remote terminal receives the information of the partial boundary sent from the to-be-controlled device, and sends a control signal to the to-be-controlled device based on the information of the partial boundary, thereby controlling the to-be-controlled device to switch between the autonomous movement mode and the remotely controlled movement mode, autonomously moving the to-be-controlled device when a condition is satisfied without manually controlling the to-be-controlled device in the whole process, reducing the manual labor intensity, and switching to the remotely controlled movement mode when the condition is not satisfied, so that the to-be-controlled device can receive a user instruction and move accordingly when being faced with a complex boundary, and so that the boundary of the to-be-processed region can be determined. Therefore, the operation is simple and efficient.

Figure 8:
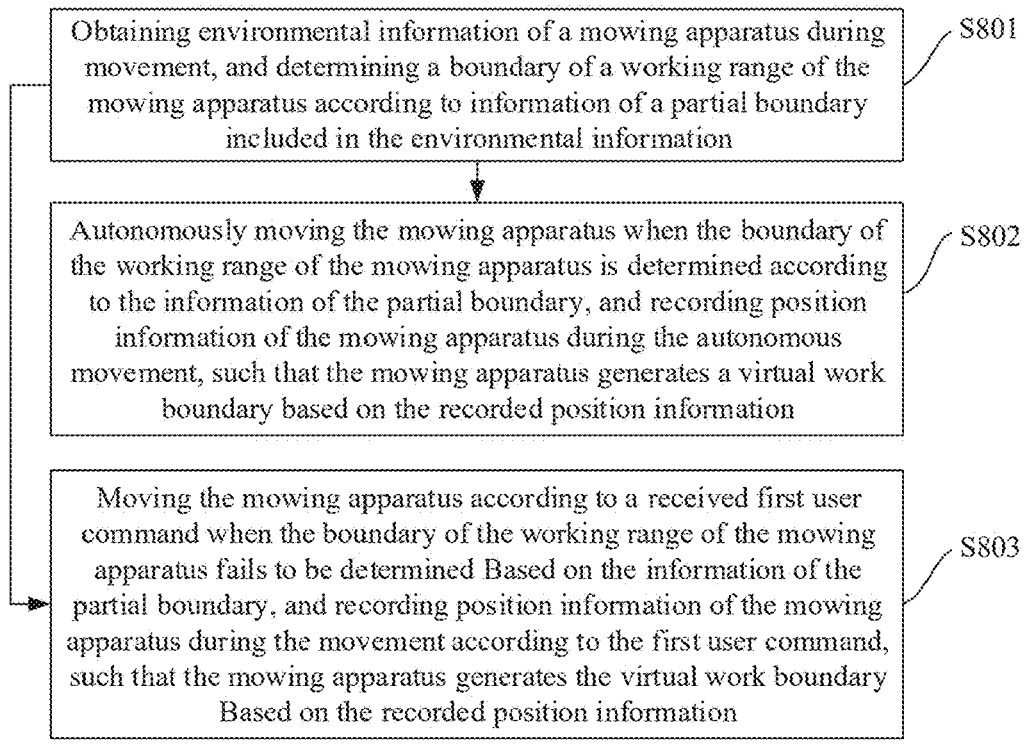
FIG. 8 is a flowchart of another method for determining information applied to a mowing apparatus provided in an embodiment of the present disclosure.

The to-be-controlled device is, for example, a mowing apparatus. Specifically, the method for determining information may be used for a remote terminal. This method can store an application on the remote terminal 200 as shown in FIG. 4, such that the remote terminal 200 executes the application to implement the method for generating a virtual boundary. As shown in FIG. 8, the method includes:

S801: obtaining environmental information of a mowing apparatus during movement, and determining a boundary of a working range of the mowing apparatus according to information of a partial boundary included in the environmental information;

S802: autonomously moving the mowing apparatus when the boundary of the working range of the mowing apparatus is determined based on the information of the partial boundary, and recording position information of the mowing apparatus during the autonomous movement, such that the mowing apparatus can generate a virtual work boundary according to the recorded position information, and complete the process; and S803: moving the mowing apparatus according to a received first user instruction when the boundary of the working range of the mowing apparatus fails to be determined based on the information of the partial boundary, and recording position information of the mowing apparatus during the movement according to the first user instruction, such that the mowing apparatus can generate the virtual work boundary according to the recorded position information.

The environmental information of the mowing apparatus during movement can be collected using a built-in environmental information collection unit 10 of the mowing apparatus (e.g., any sensor capable of acquiring the environmental information around the mowing apparatus 100, such as an image sensor, a sonar, or a RFID). Or, a sensor of a remote terminal 200 may be used, such as a camera on a mobile phone or a LiDAR (Light Identification Detection and Ranging) sensor. Or, the environmental information of the mowing apparatus 100 may be obtained from Google Maps, Baidu Maps, or a satellite. The remote terminal 200, such as the mobile phone or a remote controller of the mowing apparatus, may acquire the environmental information of the mowing apparatus 100 through its communication interface (such as a Bluetooth interface). According to one or more embodiments of the present disclosure, the environmental information of the mowing apparatus 100 can be obtained at predetermined intervals. For example, image information of an environment in front of the mowing apparatus 100 can be acquired through an image collection unit on the mowing apparatus 100. The image collection unit can acquire the image information of the environment in front of the mowing apparatus 100 at predetermined intervals (for example, every 0.1 sec), and the mowing apparatus 100 can send the image information to the remote terminal 200 through a near-field communication port, such as WiFi. The remote terminal 200 can recognize whether the environmental information includes the boundary of the working range of the mowing apparatus according to the acquired environmental information. The remote terminal 200 may be equipped with a recognition algorithm, through which whether the environmental information includes the boundary of the working range of the mowing apparatus is recognized. Specifically, a neural network model may be used as the recognition algorithm of the boundary of the working range of the mowing apparatus, and sample data may be pre-collected to train an initial neural network model, to generate the neural network model. For example, images of a plurality of lawns may be collected, boundaries between grass and non-grass are manually annotated in the images, the annotated image data is loaded onto a server to train the initial neural network model, and the trained neural network model can be used as the recognition algorithm for recognizing the boundary of the working range of the mowing apparatus. In S802, when the remote terminal 200 can recognize the boundary of the working range of the mowing apparatus 100 from the environmental information through the recognition algorithm, the remote terminal 200 can send an instruction to the mowing apparatus 100, such that the mowing apparatus 100 autonomously moves, and records the position information during the autonomous movement. For example, the mowing apparatus 100 moves along an autonomously planned path, and records its position coordinates during the autonomous movement, such that the mowing apparatus 100 can generate a virtual work boundary according to the recorded position information.

In S803, when the remote terminal 200 fails to recognize the boundary of the working range of the mowing apparatus from the environmental information through the recognition algorithm, the remote terminal 200 can send an instruction to the mowing apparatus, such that the mowing apparatus 100 enters a manual mode of manually generating the virtual work boundary, and moves according to the received first user instruction. Specifically, when the remote terminal 200 fails to recognize whether the acquired environmental information includes the boundary of the working range of the mowing apparatus using the recognition algorithm, the user can intervene and send the first user instruction to the mowing apparatus through the remote terminal 200, for example, the user can input an instruction for making the mowing apparatus move forward, or move backward, or go ahead, or go back through a display interface of the remote terminal 200. After receiving the first user instruction, the mowing apparatus moves according to the received first user instruction, and records position information during the movement according to the first user instruction, such that the mowing apparatus 100 can generate the virtual work boundary according to the recorded position information.

It can be understood that the virtual work boundary built by the mowing apparatus 100 in S802 and the virtual work boundary built by the mowing apparatus in S803 can be combined to form the complete virtual work boundary of the mowing apparatus 100.

Figure 9:
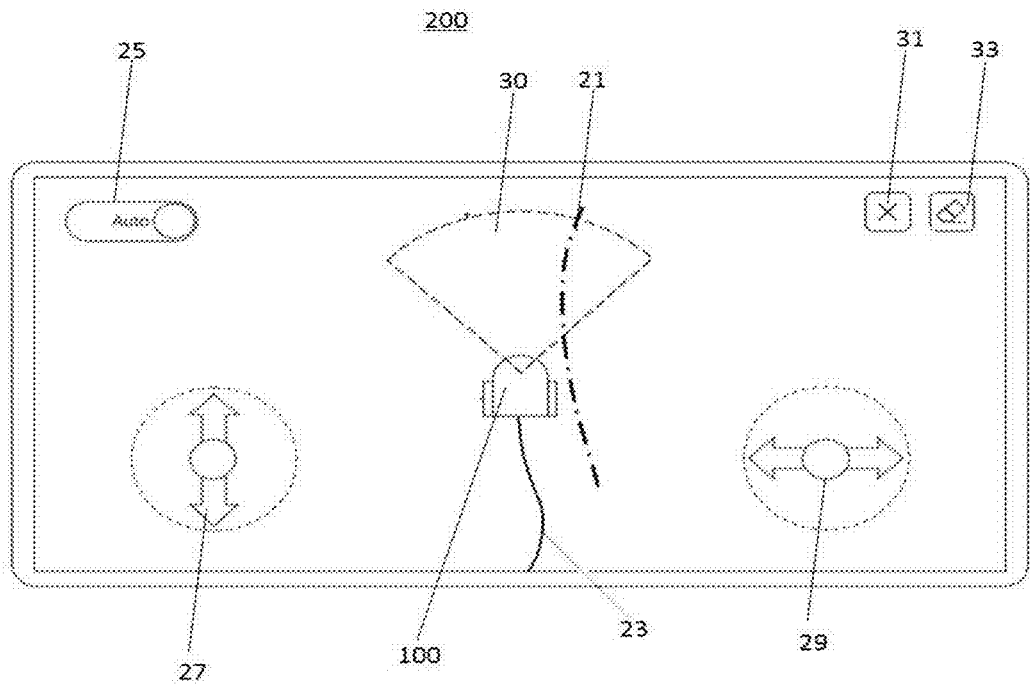
FIG. 9 is a schematic diagram of a display interface of a remote terminal provided in an embodiment of the present disclosure.

As shown in FIG. 9, when the above operations are executed, the display interface of the remote terminal 200 can display various kinds of interactive information between the mower and the user. The display interface can display not only the recognized boundary 21 of the working range, as shown in FIG. 7, but also a historical trajectory 23 of the mowing apparatus, to facilitate understanding the overall virtual work boundary of the mowing apparatus by the user. When the overall virtual work boundary fails to satisfy user expectations, the user can manually control the movement path of the mowing apparatus. The display interface may further include a virtual joystick 29 for remotely controlling a direction and a virtual joystick 27 for remotely controlling an accelerator. The user can set the first user instruction by clicking or dragging the virtual joystick 29 for remotely controlling the direction to make the mowing apparatus 100, e.g., move forward, move backward, turn forward or turn left by 30 degrees. The user can further set a speed of the mowing apparatus 100 by clicking or dragging the virtual joystick 27 for remotely controlling the accelerator. The display interface may further include an environmental range 30 that can be currently sensed by an environmental information collection unit, an exit button 31, a back button 33 for erasing a historical trajectory, and a start switch 25 for automatically recognizing the boundary of the working range. The display interface can enhance interaction between the user and the mowing apparatus, and provide the user with an option of making the mowing apparatus automatically enter an autonomous mapping mode, thereby minimizing user time for controlling the mowing apparatus to manually set a movement path of the mowing apparatus, improving user work efficiency, and improving the user experience.

Figure 10:
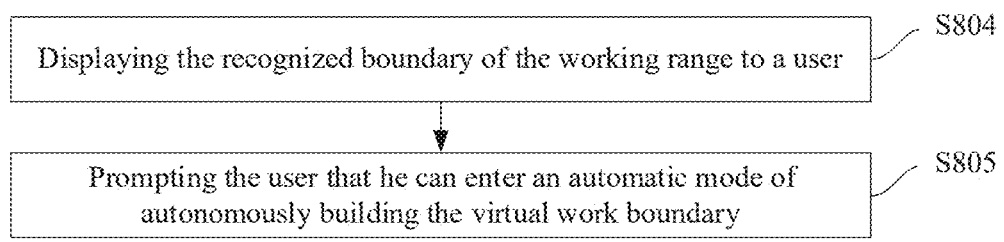
FIG. 10 is a schematic flowchart of another autonomous mapping mode provided in an embodiment of the present disclosure.

As shown in FIG. 10, according to one or more embodiments of the method, when the remote terminal recognizes the boundary of the working range of the mowing apparatus, the remote terminal can execute S804: displaying the recognized boundary of the working range to a user. The remote terminal can also execute S805: prompting the user that he can enter an automatic mode of autonomously generating the virtual work boundary.

As shown in FIG. 7, the remote terminal can display the recognized boundary 21 of the working range through its display screen. The mowing apparatus can plan its autonomous movement path with reference to the recognized boundary 21 of the working range. For example, the autonomous movement path of the mowing apparatus may be parallel to the boundary line of the working range, is located within the boundary line 21 of the working range, and is always distanced from the boundary of the working range by half a width of the mowing apparatus. The boundary 21 of the working range is displayed through the remote terminal, such that the user can know about the movement path of the mowing apparatus. Therefore, if the boundary line of the working range is inconsistent with the user expectations, i.e., the user would not like the mowing apparatus to move according to the boundary 21 of the working range. For example, when the boundary 21 of the working range is distanced from a fountain in a lawn by 1 m, and if the user would like to retain the grass within 1 meter from the fountain, the user can manually set a desired target movement position of the mowing apparatus. The mowing apparatus can move from a current position to a user-defined target movement position, e.g., along a straight line.

According to one or more embodiments of the present disclosure, in response to the target movement position of the mowing apparatus manually set by the user, a movement path from the mowing apparatus to the target movement position can be displayed to the user on a display interface of a mobile terminal, thereby facilitating checking whether the movement path satisfies user expectations by the user. If the movement path fails to satisfy the user expectations, the user can modify the movement path.

When the boundary of the working range of the mowing apparatus is recognized based on the environmental information of the mowing apparatus during movement, the remote terminal may further prompt the user through a display screen (e.g., through a dialog box of interaction with the user) that currently, he can enter the automatic mode of autonomously generating the virtual work boundary. Such a clear prompt can make it easier for the user to see or enter the automatic mode of autonomously generating the virtual work boundary, instead of manually controlling the mowing apparatus to move because the user does not see the displayed boundary of the working range or because the user does not know about the boundary of the working range displayed on the remote terminal, which does mean that the user can enter the automatic mode.

The prompting the user that he can enter the automatic mode of autonomously generating the virtual work boundary may further provide the user with an opportunity of selecting the automatic mode and the manual mode. When the remote terminal recognizes the boundary of the working range of the mowing apparatus, the mowing apparatus may autonomously move as a prior operational mode in order to save the user time, and generate the virtual work boundary according to position information of the mowing apparatus during the autonomous movement, but when the remote terminal prompts that the user can enter the automatic mode of autonomously generating the virtual work boundary, the user can choose whether to enter the automatic mode according to his own intention or wish. This gives the user more degree of freedom, can make the built virtual work boundary be more consistent with user needs or wish, and improves the user experience.

According to embodiments of the present disclosure, when the boundary of the working range of the mowing apparatus is determined based on the information of the partial boundary, i.e., when the boundary of the working range of the mowing apparatus is recognized based on the environmental information of the mowing apparatus during movement, the user is reminded to enter the automatic mode of autonomously generating the virtual work boundary. Similarly, when the boundary of the working range of the mowing apparatus fails to be determined based on the information of the partial boundary, i.e., when the boundary of the working range of the mowing apparatus fails to be recognized based on the environmental information of the mowing apparatus during movement, the user is reminded to enter the manual mode of manually generating the virtual work boundary. That is, before the mowing apparatus switches between the automatic mode and the manual mode, the user is reminded that he can enter the automatic mode or the manual mode. The remote terminal may include a user feedback unit that works using acoustic, optical, electrical signals, etc., to send a prompt or reminder to the user. For example, the user may be reminded by a visual signal generated through the display screen of the remote terminal, an auditory signal generated through a speaker on the remote terminal or the mower, or a tactile signal, such as a vibration generated through a vibration unit. This embodiment can enhance the interaction between the user and the mowing apparatus, and improve the user experience. Further, the user is explicitly reminded when the boundary of the working range of the mowing apparatus is recognized, such that the user can make the best use of the autonomous mapping mode, thereby saving the user time for controlling the mowing apparatus, and improving the user work efficiency.

In one possible implementation, the to-be-controlled device exits a control interface of the autonomous movement mode when the remote terminal detects that the to-be-controlled device satisfies at least one of the following conditions:
   (i) the remote terminal is disconnected from the to-be-controlled device; and
   (ii) the to-be-controlled device moves to a preset target position.

The remote terminal is disconnected from the to-be-controlled device, which includes, but is not limited to: the remote terminal is too far away from the to-be-controlled device, the signal terminal and the to-be-controlled device are switched off, etc. When any one of the above conditions is satisfied, the to-be-controlled device exits the autonomous movement mode, and at the same time, the remote terminal exits the control interface of the autonomous movement mode. For example, a dialog box is displayed on the display interface to prompt the user that the to-be-controlled device has exited the autonomous movement mode. In this case, a corresponding operation button can be displayed, such that the user controls the to-be-controlled device to move through the operation button.

In embodiments of the present disclosure, after the remote terminal detects that the to-be-controlled device, such as the mowing apparatus, satisfies a specific condition, the remote terminal exits the control interface of the autonomous movement mode, and switches to a control interface of the remotely controlled movement mode, thereby preventing disconnection of the to-be-controlled device in the autonomous movement mode from causing failure to record the position information, and will also switch to the remotely controlled movement mode when reaching the preset target position, such that the to-be-controlled device can autonomously close the boundary or continue to move according to a remote control instruction of the user, thereby preventing repeated recording of path information from affecting the determined virtual work boundary, promptly exiting the autonomous movement control interface, reminding the user that the to-be-controlled device is disconnected or reaches the preset position, and solving the problems of cumbersome operations and low efficiency.

In addition, the method for generating a virtual boundary in the above embodiments is applied to the remote terminal, to make use of a large computing power of the remote terminal (such as a computing power of a CPU of a mobile phone). In this way, the mowing apparatus can be equipped with a processor with a small computing power, thereby further reducing costs of the mowing apparatus.

In one possible implementation, a first mode switching control widget is displayed through the display interface if a first instruction message sent from the to-be-controlled device is received, where the first instruction message is sent from the to-be-controlled device when the following conditions are satisfied: the to-be-controlled device is in the remotely controlled movement mode, and the boundary of the working range of the to-be-controlled device is determined based on the information of the partial boundary, and then a first control message is sent to the to-be-controlled device in response to triggering of the first mode switching control widget, such that the to-be-controlled device switches from the remotely controlled movement mode to the autonomous movement mode according to the first control message to autonomously move, and records the position information of the to-be-controlled device during the autonomous movement.

After the remote terminal receives the first instruction message sent from the to-be-controlled device, the first mode switching control widget is displayed on the display interface. The first mode switching control widget may be a dialog box popped up above the display interface, or a prompt box popped up on a full screen of the display interface. The user triggers the first mode switching control widget, for example, the user clicks a confirmation button on the first mode switching control widget to send the first control message to the to-be-controlled device, so that the to-be-controlled device switches to the autonomous movement mode.

Alternatively, when the first mode switching control widget is triggered, the movement control widget for remotely controlling the to-be-controlled device will be hidden on the display interface of the remote terminal.

Figure 11:
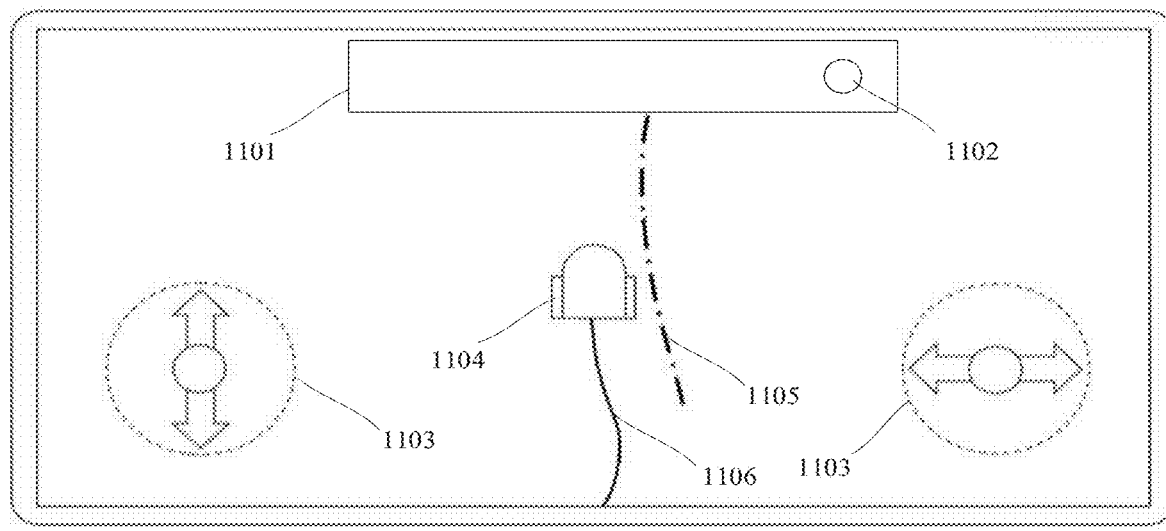
FIG. 11 is a schematic diagram of a display interface of a remote terminal provided in an embodiment of the present disclosure.
Figure 12:
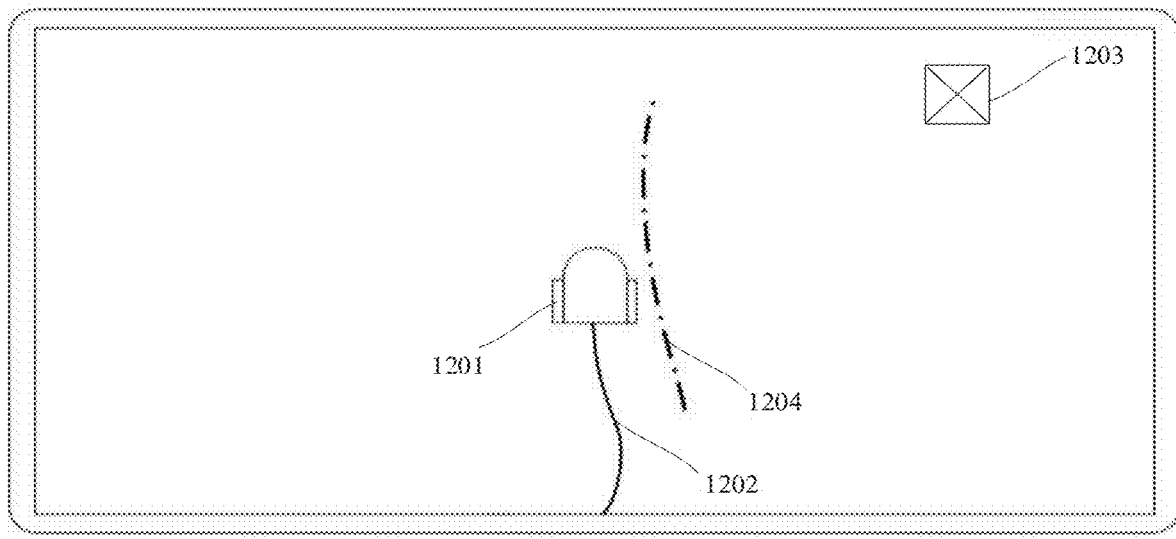
FIG. 12 is a schematic diagram of a display interface of another remote terminal provided in an embodiment of the present disclosure.

For example, as shown in FIG. 11 and FIG. 12, FIG. 11 shows contents displayed on the display interface after the remote terminal receives the first instruction message sent from the to-be-controlled device, including a first mode switching control widget 1101, where the first mode switching control widget 1101 includes a confirmation button 1102, a movement control widget 1103, a to-be-controlled device 1104, information 1105 of a partial boundary, and a movement trajectory 1106 of the to-be-controlled device; and FIG. 12 shows contents displayed on the remote terminal interface when entering the autonomous movement mode, including a to-be-controlled device 1201, a movement trajectory 1202 of the to-be-controlled device, an exit control widget 1203, and information 1204 of a partial boundary.

Alternatively, if the to-be-controlled device enters the autonomous movement mode for the first time, after the first mode switching control widget is triggered, precautions and operation guides of the autonomous movement mode can be popped up on the display interface, to facilitate quickly learning the control of the autonomous movement mode by the user.

In embodiments of the present disclosure, the first instruction message sent from the to-be-controlled device is received, the first mode switching control widget is displayed based on the first instruction message, and the first control message is sent to the to-controlled device according to triggering of the first mode switching control widget, thereby switching the to-be-controlled device from the remotely controlled movement mode to the autonomous movement mode. Because of the need for triggering the first mode switching control widget, the user has the right to choose, i.e., when the user would not like to enter the autonomous movement mode, he can choose to keep moving in the remotely controlled movement mode, and can be prompted through the first mode switching control widget that he can enter the autonomous movement mode, such that the user can promptly control the to-be-controlled device to enter the autonomous movement mode to autonomously move, thereby solving the problems of cumbersome operations and low efficiency existing in solutions of determining a regional boundary in associated technologies.

In one possible implementation, a first movement control widget is displayed through the display interface if a second instruction message sent from the to-be-controlled device is received, where the second instruction message is sent from the to-be-controlled device when the following conditions are satisfied: the to-be-controlled device is in the autonomous movement mode, and the boundary of the working range of the to-be-controlled device fails to be determined based on the information of the partial boundary, and then a second control message is sent to the to-be-controlled device in response to triggering of the first movement control widget, such that the to-be-controlled device moves according to the second control message, and records position information of the to-be-controlled device during the movement according the second control message.

After the remote terminal receives the second instruction message sent from the to-be-controlled device, the first movement control widget is displayed on the display interface. The first movement control widget is a control capable of remotely controlling the to-be-controlled device, such as a virtual joystick, or a direction control button. The user triggers the first movement control, for example, the user drags, e.g., the virtual joystick, to send the second control message to the to-be-controlled device, so that the to-be-controlled device switches from the autonomous movement mode to the remotely controlled movement mode, and moves according to a remote control operation of the user included in the second control message.

For example, as shown in FIG. 11, the interface shown in the figure is the display interface corresponding to the remotely controlled movement mode, and the movement control widget 1103 in the figure is the first movement control widget displayed on the display interface of the remote terminal in the remotely controlled movement mode.

In embodiments of the present disclosure, the second instruction message sent from the to-be-controlled device is received, and the second control message is sent to the to-be-controlled device based on the second instruction message, the first movement control widget displayed on the display interface, and triggering of the first movement control, such that the to-be-controlled device switches from the autonomous movement mode to the remotely controlled movement mode, and can move according to the user operation instruction when the condition of the autonomous movement mode is not satisfied, thereby avoiding a phenomenon that the to-be-controlled device fails to autonomously move and then stays in situ because the condition of the autonomous movement mode is not satisfied, determining a more reliable boundary of the to-be-processed region, and solving the problems of cumbersome operations and low efficiency existing in solutions of determining a regional boundary in associated technologies.

In one possible implementation, a second mode switching control widget is displayed through the display interface if the boundary of the working range of the to-be-controlled device is determined based on the information of the partial boundary when the to-be-controlled device is in the remotely controlled movement mode, and then a third control message is sent to the to-be-controlled device in response to triggering of the second mode switching control widget, such that the to-be-controlled device switches from the autonomous movement mode to autonomous movement according to the third control message, and records the position information of the to-be-controlled device during the autonomous movement.

The control process of switching from the remotely controlled movement mode to the autonomous movement mode in the embodiment of the present disclosure is similar to the control process of switching from the remotely controlled movement mode to the autonomous movement mode in the above embodiments, and will not be repeated here.

In embodiments of the present disclosure, when the remote terminal recognizes the boundary of the working range of the to-be-controlled device, and the second mode switching control widget is triggered, the third control message is sent to the to-be-controlled device, thereby controlling the to-be-controlled device to switch from the remotely controlled movement mode to the autonomous movement mode. Because the third control message is sent in response to triggering of the second mode switching control widget after the remote terminal recognizes the boundary of the working range based on the information of the partial boundary, in this process, the boundary of the working range is recognized using the remote terminal without the need of using the to-be-controlled device, thereby reducing processor costs of the to-be-controlled device. Further, it is necessary to trigger the second mode switching control widget during the switching, the user has the right to choose, i.e., when the user would not like to enter the autonomous movement mode, he can choose to keep moving in the remotely controlled movement mode, and is prompted through the second mode switching control widget that he can enter the autonomous movement mode, such that the user can promptly control the to-be-controlled device to enter the autonomous movement mode to autonomously move, thereby solving the problems of cumbersome operations and low efficiency existing in solutions of determining a regional boundary in associated technologies.

In one possible implementation, a second movement control widget is displayed through the display interface if the boundary of the working range of the to-be-controlled device fails to be determined based on the information of the partial boundary when the to-be-controlled device is in the autonomous movement mode, and then a fourth control message is sent to the to-be-controlled device in response to triggering of the second movement control, such that the to-be-controlled device moves according to the fourth control message, and records position information of the to-be-controlled device during the movement according to the fourth control message.

The control process of switching from the autonomous movement mode to the remotely controlled movement mode in the embodiment of the present disclosure is similar to the control process of switching from the autonomous movement mode to the remotely controlled movement mode in the above embodiments, and will not be repeated here.

In embodiments of the present disclosure, when the remote terminal fails to recognize the boundary of the working range of the to-be-controlled device, the second movement control widget is displayed, and the fourth control message is sent according to triggering of the second movement control, thereby controlling the to-be-controlled device to switch from the autonomous movement mode to the remotely controlled movement mode. Because the fourth control message is sent when the remote terminal fails to recognize the boundary of the working range based on the information of the partial boundary and the second movement control widget is triggered, in this process, the boundary of the working range is recognized using the remote terminal without the need of using the to-be-controlled device, thereby reducing processor costs of the to-be-controlled device. Further, the to-be-controlled device can be controlled to move according to the user operation instruction when the condition of the autonomous movement mode is not satisfied, thereby avoiding a phenomenon that the to-be-controlled device fails to autonomously move and then stays in situ because the condition of the autonomous movement mode is not satisfied, determining a more reliable boundary of the to-be-processed region, and solving the problems of cumbersome operations and low efficiency existing in solutions of determining a regional boundary in associated technologies.

In one possible implementation, a third movement control widget is displayed through the display interface in response to triggering of an exit control widget when the to-be-controlled device is in the autonomous movement mode, where the exit control widget is displayed on the display interface; and a fifth control message is sent to the to-be-controlled device in response to triggering of the third movement control widget, such that the to-be-controlled device moves according to the fifth control message, and records position information of the to-be-controlled device during the movement according to the fifth control message.

As shown in FIG. 12, when the to-be-controlled device is in the autonomous movement mode, the exit control widget1203 will be displayed on the display interface. In this case, if the exit control widget is triggered, the to-be-controlled device switches from the autonomous movement mode to the remotely controlled movement mode, the third movement control widget is displayed on the display interface, and the fifth control message is sent to the to-be-controlled device based on triggering of the third movement control widget. The fifth control message includes a remote control instruction for the user to remotely control the to-be-controlled device, so that the to-be-controlled device can move according to the fifth control message.

In embodiments of the present disclosure, after the exit control widget displayed on the display interface is triggered, the third movement control widget is displayed, and the fifth control message is sent according to triggering of the third movement control widget, thereby controlling the to-be-controlled device to switch from the autonomous movement mode to the remotely controlled movement mode. Because the exit control widget may be triggered to exit the autonomous movement mode, the user can take over the to-be-controlled device at any time, i.e., the user can exit the autonomous movement mode at any time, so that the user has a high degree of freedom, and so that the determined boundary of the to-be-processed region is more reliable, better satisfies the user needs, and improves the user experience.

Another embodiment of the present disclosure provides a method for generating a virtual work boundary. This method is applied to the mowing apparatus 100 in the above embodiments.

Figure 13:
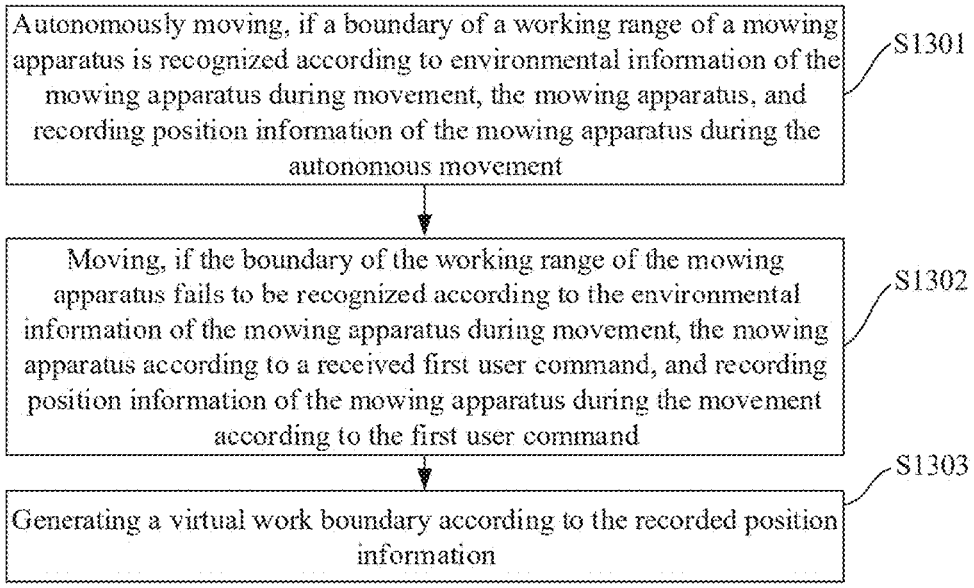
FIG. 13 is a schematic flowchart of a method for generating a virtual boundary provided in an embodiment of the present disclosure.

As shown in FIG. 13, a flow chart of steps of a method for generating a virtual boundary is shown. The method for generating a virtual boundary may be applied to the mowing apparatus. The method includes:

S1301: autonomously moving, if a boundary of a working range of the mowing apparatus is recognized according to environmental information of the mowing apparatus during movement, the mowing apparatus, and recording position information of the mowing apparatus during the autonomous movement;

S1302: moving, if the boundary of the working range of the mowing apparatus fails to be recognized based on the environmental information of the mowing apparatus during movement, the mowing apparatus according to a received first user instruction, and recording position information of the mowing apparatus during the movement according to the first user instruction; and S1303: generating a virtual work boundary according to the recorded position information.

In embodiments of the present disclosure, the environmental information during movement of the mowing apparatus can be collected using the environmental information collection unit 10 on the mowing apparatus shown in FIG. 4. For example, when the mowing apparatus 100 starts to move on a mowing area to generate the virtual work boundary, the environmental information collection unit 10 can be started to collect the environmental information of the mowing apparatus during movement. The environmental information collection unit 10 shown in FIG. 1 may be a built-in image sensor of the mowing apparatus 100. The image sensor may be arranged in the front of the mowing apparatus 100, and its number may be one or more. For example, an image sensor may be provided on the head, left side, and right side of the mowing apparatus, respectively. The image sensor constantly acquires image information of the environment around the mowing apparatus 100 as the mowing apparatus 100 moves (the dashed sector area in FIG. 4 shows a range of the environment where the image sensor can capture an image at a current position of the mowing apparatus, i.e., a visual field or visible region of the image sensor). Since the mowing apparatus 100 constantly moves, the environmental information collection unit 10 can acquire environmental images at set intervals (for example, every 0.1 sec). It can be understood that the mowing apparatus 100 can also receive environmental information of the mowing apparatus 100 from Google Maps, Baidu Maps or a satellite through its communication port. In addition, a plurality of types of environmental information collection units 10 may also be provided in combination. For example, a plurality of types of sensors, such as an image sensor, a collision sensor, and a depth sensor, may be provided on the mowing apparatus to fuse detection results of the plurality of sensors, and further improve detection accuracy of the environmental information.

According to embodiments of the present disclosure, whether the environmental information includes the boundary of the working range of the mowing apparatus 100 can be recognized according to the acquired environmental information. For example, the mowing apparatus 100 (including the mowing apparatus itself or a server (such as a cloud server) that builds a communication connection with the mowing apparatus) may be equipped with a recognition algorithm of the boundary of the working range to recognize whether the environmental information includes the boundary of the working range of the mowing apparatus 100 through the recognition algorithm. Specifically, a neural network model may be used as the recognition algorithm of the boundary of the working range of the mowing apparatus. For example, a plurality of neural network models, such as FCN (fully convolutional neural network), U-Net network structure, or DeepLab, may be used. Sample data may be pre-collected to train an initial neural network model, to generate the neural network model. For example, images of a plurality of lawns may be collected, boundaries between grass and non-grass are manually annotated in the images, the initial neural network model is trained with the annotated image data, and the trained neural network model may be used as the recognition algorithm for recognizing the boundary of the working range of the mowing apparatus. In addition, an existing neural network model in a mowing apparatus may be updated, to further improve recognition accuracy. For example, as the mowing apparatus is used by increasing American households, and increasing lawn data is collected, the neural network model can be constantly optimized, and then be updated in the mowing apparatus, to improve the recognition accuracy. A confidence threshold of the recognition algorithm may be set. That is, if a computing result of the trained neural network model on the image data is less than the set confidence threshold, it is determined that the boundary of the working range of the mowing apparatus fails to be recognized. Otherwise, if a computing result of the trained neural network model on the image data is greater than the set confidence threshold, it is determined that the boundary of the working range of the mowing apparatus can be recognized.

In S1301, if the boundary of the working range of the mowing apparatus is recognized, for example, there is a boundary line between grass and an obstacle in the environmental information, the mowing apparatus can autonomously move and enter an autonomous mode of autonomously generating the virtual work boundary without the need of manually remotely controlling the mowing apparatus by a user. For example, the controller of the mowing apparatus may store instructions. When the environmental information including the boundary of the working range of the mowing apparatus is recognized according to the acquired environmental information, the controller can control the mowing apparatus to autonomously move by executing these instructions. Further, the mowing apparatus will record the position information during the autonomous movement. For example, a global positioning system or ultra-wide band system can send geographical position coordinates of the mowing apparatus during autonomous movement to a positioning unit of the mowing apparatus. For example, stars 401 and 403 in FIG. 4 represent two geographical positions where the mowing apparatus passes during the autonomous movement. A GPS receiver of the mowing apparatus 100 can receive position information of the two geographical positions (such as longitude and latitude coordinates of each position, or position coordinates of the mowing area in a local position coordinate system) represented by the stars 401 and 403 sent from the GPS system where the mowing apparatus 100 passes during the autonomous movement of the mowing apparatus. The mowing apparatus 100 can record the position information of the two geographical positions in its memory. In one or more embodiments of the present disclosure, the environmental information can be acquired at predetermined intervals and whether the environmental information includes the boundary of the working range of the mowing apparatus 100 can be recognized. When the boundary of the working range of the mowing apparatus can be recognized from the environmental information, the mowing apparatus can enter an automatic mode of autonomously generating the virtual work boundary.

In S1302, if the boundary of the working range of the mowing apparatus fails to be recognized based on the environmental information of the mowing apparatus during movement, the mowing apparatus can enter a manual mode of manually generating the virtual work boundary, and moves according to the received first user instruction. Specifically, when whether the acquired environmental information includes the boundary of the working range of the mowing apparatus fails to be recognized using the recognition algorithm on the mowing apparatus or the server having the communication connection with the mowing apparatus, the user can intervene and input the first user instruction, for example, the user can input an instruction for making the mowing apparatus move forward, or move backward, or turn forward, or turn left by 30 degrees through a display interface of a remote terminal 200. In order to facilitate inputting the first user instruction by the user, a virtual joystick for remotely controlling a direction can be displayed in the display interface of the remote terminal 200, so that the user can control a movement direction and a movement distance of the mowing apparatus by clicking and dragging the virtual joystick. The mowing apparatus moves according to the received first user instruction, and records the position information during the movement according to the first user instruction. For example, ellipses 405 and 407 in FIG. 4 represent two geographical positions where the mowing apparatus passes during the movement according to the received first user instruction. The positioning unit can acquire position coordinates of these geographical positions. For example, the GPS receiver of the mowing apparatus 100 can receive longitude and latitude coordinates of the mowing apparatus 100 at the two geographical positions shown by the ellipses 405 and 407 sent from the GPS system. The mowing apparatus can record the position information of the two geographical positions in its memory.

In S1303, the mowing apparatus can generate the virtual work boundary based on the recorded position information. In one or more embodiments of the present disclosure, the virtual work boundary of the lawn can be built after the mowing apparatus moves around the to-be-cut lawn by one circle and records position information of a plurality of movement positions. For example, the mowing apparatus can map each piece of the recorded position information to a local coordinate system of the mower to obtain the virtual work boundary.

In the above embodiments of the present disclosure, entering an autonomous mapping mode or entering a manual mapping mode is selected according to a recognition result of the environmental information. The autonomous mapping mode is introduced, and the autonomous mapping mode and the manual mapping mode are combined, thereby saving user time, improving user work efficiency, and improving user experience, without affecting accuracy of the built virtual work boundary.

As shown in FIG. 6 and FIG. 7, according to one or more embodiments of the present disclosure, S1301: autonomously moving, if a boundary of a working range of the mowing apparatus is recognized according to environmental information of the mowing apparatus during movement, the mowing apparatus, and recording position information of the mowing apparatus during the autonomous movement, may include S503*a*: obtaining a movement path of the mowing apparatus according to the recognized boundary of the working range; and S503*b*: autonomously moving the mowing apparatus along the movement path. For example, the mowing apparatus 100 includes the environmental information collection unit 10 that collects environmental image information, and when a boundary 21 of a working range is recognized from an image at a position shown in FIG. 7 according to the image information collected by the environmental information collection unit 10, the movement path of the mowing apparatus can be obtained according to the recognized boundary 21 of the working range. For example, the mowing apparatus 100 can plan its autonomous movement path with reference to the recognized boundary 21 of the working range. The autonomous movement path of the mowing apparatus 100 may be parallel to the boundary line 21 of the working range, is located within the boundary line 21 of the working range, and is always distanced from the boundary line 21 of the working range by half a width of the mowing apparatus 100 (i.e., a distance between the center of the mowing apparatus and its left or right side), thereby preventing outer sides (i.e., left side and right side) of the mowing apparatus from exceeding the boundary line 21 of the working range during movement.

In the above embodiments of the present disclosure, the autonomous movement path of the mowing apparatus is planned with reference to the boundary of the working range of the mowing apparatus recognized from the environmental information, thereby simplifying the movement path planning of the mowing apparatus, and ensuring that the mowing apparatus will not walk out of the lawn or collide with an obstacle during autonomous movement.

According to one or more embodiments of the present disclosure, when the boundary of the working range of the mowing apparatus is recognized based on the environmental information of the mowing apparatus during movement and the first user instruction is received, the mowing apparatus moves according to the received first user instruction, and records the position information of the mowing apparatus during the movement according to the first user instruction. In the embodiment, even if the boundary of the working range of the mowing apparatus can be recognized from the environmental information, but if the user inputs his instruction through the remote terminal, for example, the user inputs his desired target movement position through a blank area in the touch screen, in this case, the mowing apparatus may move not according to the recognized boundary of the working range, but moves from the current position to the user-defined target movement position along a predefined path (for example, a straight line). For example, when the user ascertains according to the recognized boundary of the working range displayed on the remote terminal that: the mowing apparatus will fall when moving along a path that is distanced from the boundary of the working range by half a width of the mowing apparatus, for example, if the path runs through a steep slope, the user can guide the mowing apparatus to bypass the steep slope by inputting the first user instruction.

In one or more embodiments of the present disclosure, the first user instruction may include the user-defined target movement position, and a control program of the mowing apparatus may be set to move from the current position of the mowing apparatus to the target movement position along a straight line. The above embodiments make it possible to generate a more accurate virtual work boundary, receive the user-defined target position at any time, generate a virtual work boundary that is more consistent with user expectations, and improve the user experience.

Figure 14:
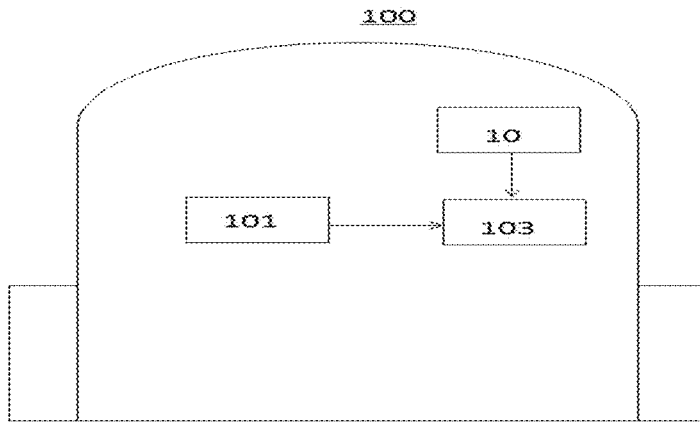
FIG. 14 is a schematic diagram of a mowing apparatus provided in an embodiment of the present disclosure.

The method for generating a virtual work boundary in the above embodiments is applied to the mowing apparatus, i.e., is executed by the mowing apparatus. As shown in FIG. 14, the mowing apparatus 100 may include a memory 101 and a processor 103. The memory 101 stores instructions for implementing the above method for generating a virtual work boundary. When the processor 103 executes these instructions, the mowing apparatus 100 can implement the method. Compared with the method for recognizing a boundary between grass and non-grass and generating a virtual work boundary based on recorded position information by a remote terminal, the method implemented by the mowing apparatus 100 has low delay, and neither needs to send a large amount of environmental information collected by the environmental information collection unit 10 to the remote terminal through the communication port, nor needs to receive the recognition result of the remote terminal through the communication interface to generate the virtual work boundary. In this way, the mowing apparatus 100 can recognize whether there is a boundary line between grass and non-grass based on the environmental information collected by the environmental information collection unit 10 in real time as the mowing apparatus moves, and can update the built virtual work boundary in real time according to the recognition result, thus further improving the mapping efficiency and accuracy.

Figure 15:
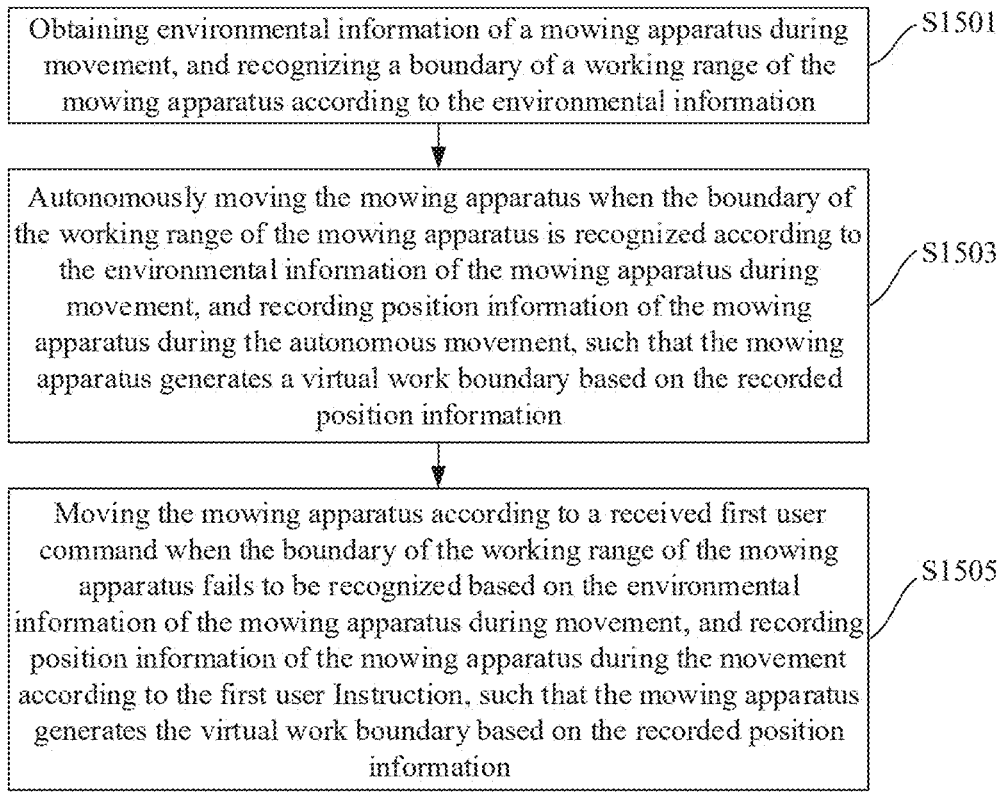
FIG. 15 is a method for generating a virtual boundary for a remote terminal provided in an embodiment of the present disclosure.

Another aspect of the present disclosure provides a method for generating a virtual work boundary for a remote terminal. An application may be stored on the remote terminal 200 as shown in FIG. 4, such that the remote terminal 200 executes the application to implement the method for generating a virtual boundary. As shown in FIG. 15, the method includes:

S1501: obtaining environmental information of a mowing apparatus during movement, and recognizing a boundary of a working range of the mowing apparatus based on the environmental information;

S1503: autonomously moving the mowing apparatus when the boundary of the working range of the mowing apparatus is recognized based on the environmental information of the mowing apparatus during movement, and recording position information of the mowing apparatus during the autonomous movement, such that the mowing apparatus can generate a virtual work boundary according to the recorded position information; and S1505: moving the mowing apparatus according to a received first user instruction when the boundary of the working range of the mowing apparatus fails to be recognized based on the environmental information of the mowing apparatus during movement, and recording position information of the mowing apparatus during the movement according to the first user instruction, such that the mowing apparatus can build the virtual work boundary according to the recorded position information.

The environmental information of the mowing apparatus during movement may be collected using a built-in environmental information collection unit 10 of the mowing apparatus (e.g., any sensor capable of acquiring the environmental information around the mowing apparatus 100, such as an image sensor, a sonar, or a RFID). Or, a sensor of a remote terminal 200 may be used, such as a camera on a mobile phone or a LiDAR (Light Identification Detection and Ranging) sensor. Or, the environmental information of the mowing apparatus 100 may be obtained from Google Maps, Baidu Maps, or a satellite. The remote terminal 200, such as the mobile phone or a remote controller of the mowing apparatus, may acquire the environmental information of the mowing apparatus 100 through its communication interface (such as a Bluetooth interface). According to one or more embodiments of the present disclosure, the environmental information of the mowing apparatus 100 can be obtained at predetermined intervals. For example, image information of an environment in front of the mowing apparatus 100 can be acquired through an image collection unit on the mowing apparatus 100. The image collection unit can acquire the image information of the environment in front of the mowing apparatus 100 at predetermined intervals (for example, every 0.1 sec), and the mowing apparatus 100 can send the image information to the remote terminal 200 through a near-field communication port, such as WiFi. The remote terminal 200 can recognize whether the environmental information includes the boundary of the working range of the mowing apparatus according to the acquired environmental information. The remote terminal 200 may be equipped with a recognition algorithm, through which whether the environmental information includes the boundary of the working range of the mowing apparatus is recognized. Specifically, a neural network model may be used as the recognition algorithm of the boundary of the working range of the mowing apparatus, and sample data may be pre-collected to train an initial neural network model, to generate the neural network model. For example, images of a plurality of lawns may be collected, boundaries between grass and non-grass are manually annotated in the images, the annotated image data is loaded onto a server to train the initial neural network model, and the trained neural network model can be used as the recognition algorithm for recognizing the boundary of the working range of the mowing apparatus. In S1503, when the remote terminal 200 can recognize the boundary of the working range of the mowing apparatus 100 from the environmental information through the recognition algorithm, the remote terminal 200 can send an instruction to the mowing apparatus 100, such that the mowing apparatus 100 autonomously moves, and records the position information during the autonomous movement. For example, the mowing apparatus 100 moves along an autonomously planned path, and records its position coordinates during the autonomous movement, such that the mowing apparatus 100 can generate a virtual work boundary according to the recorded position information.

In S1505, when the remote terminal 200 fails to recognize the boundary of the working range of the mowing apparatus from the environmental information through the recognition algorithm, the remote terminal 200 can send an instruction to the mowing apparatus, such that the mowing apparatus 100 enters a manual mode of manually generating the virtual work boundary, and moves according to the received first user instruction. Specifically, when the remote terminal 200 fails to recognize whether the acquired environmental information includes the boundary of the working range of the mowing apparatus using the recognition algorithm, the user can intervene and send the first user instruction to the mowing apparatus through the remote terminal 200, for example, the user can input an instruction for making the mowing apparatus move forward, or move backward, or go ahead, or go back through a display interface of the remote terminal 200. After receiving the first user instruction, the mowing apparatus moves according to the received first user instruction, and records position information during the movement according to the first user instruction, such that the mowing apparatus 100 can generate the virtual work boundary according to the recorded position information.

It can be understood that the virtual work boundary built by the mowing apparatus 100 in S1503 and the virtual work boundary built by the mowing apparatus in S1505 can be combined to form the complete virtual work boundary of the mowing apparatus 100.

As shown in FIG. 9, when the above operations are executed, the display interface of the remote terminal 200 can display various kinds of interactive information between the mower and the user. The display interface can display not only the recognized boundary 21 of the working range, as shown in FIG. 9, but also a historical trajectory 23 of the mowing apparatus, to facilitate understanding the overall virtual work boundary of the mowing apparatus by the user. When the overall virtual work boundary fails to satisfy user expectations, the user can manually control the movement path of the mowing apparatus. The display interface may further include a virtual joystick 29 for remotely controlling a direction and a virtual joystick 27 for remotely controlling an accelerator. The user can set the first user instruction by clicking or dragging the virtual joystick 29 for remotely controlling the direction to make the mowing apparatus 100, e.g., move forward, move backward, turn forward or turn left by 30 degrees. The user can further set a speed of the mowing apparatus 100 by clicking or dragging the virtual joystick 27 for remotely controlling the accelerator. The display interface may further include an environmental range 30 that can be currently sensed by an environmental information collection unit, an exit button 31, a back button 33 for erasing a historical trajectory, and a start switch 25 for automatically recognizing the boundary of the working range. The display interface can enhance interaction between the user and the mowing apparatus, and provide the user with an option of making the mowing apparatus automatically enter an autonomous mapping mode, thereby minimizing user time for controlling the mowing apparatus to manually set a movement path of the mowing apparatus, improving user work efficiency, and improving the user experience.

As shown in FIG. 10, according to one or more embodiments of the method, when the remote terminal recognizes the boundary of the working range of the mowing apparatus, the remote terminal can execute S804: displaying the recognized boundary of the working range to a user. The remote terminal can also execute S805: prompting the user that he can enter an automatic mode of autonomously generating the virtual work boundary.

As shown in FIG. 7, the remote terminal can display the recognized boundary 21 of the working range through its display screen. The mowing apparatus can plan its autonomous movement path with reference to the recognized boundary 21 of the working range. For example, the autonomous movement path of the mowing apparatus may be parallel to the boundary line of the working range, is located within the boundary line 21 of the working range, and is always distanced from the boundary of the working range by half a width of the mowing apparatus. The boundary 21 of the working range is displayed through the remote terminal, such that the user can know about the movement path of the mowing apparatus. Therefore, if the boundary line of the working range is inconsistent with the user expectations, i.e., the user would not like the mowing apparatus to move according to the boundary 21 of the working range. For example, when the boundary 21 of the working range is distanced from a fountain in a lawn by 1 m, and if the user would like to retain the grass within 1 meter from the fountain, the user can manually set a target desirable movement position of the mowing apparatus. The mowing apparatus can move from a current position to a user-defined target movement position, e.g., along a straight line.

According to one or more embodiments of the present disclosure, in response to the target movement position of the mowing apparatus manually set by the user, a movement path from the mowing apparatus to the target movement position can be displayed to the user on a display interface of a mobile terminal, thereby facilitating checking whether the movement path satisfies user expectations by the user. If the movement path fails to satisfy the user expectations, the user can modify the movement path.

When the boundary of the working range of the mowing apparatus is recognized based on the environmental information of the mowing apparatus during movement, the remote terminal may further prompt the user through a display screen (e.g., through a dialog box of interaction with the user) that currently, he can enter the automatic mode of autonomously generating the virtual work boundary. Such a clear prompt can make it easier for the user to see or enter the automatic mode of autonomously generating the virtual work boundary, instead of manually controlling the mowing apparatus to move because the user does not see the displayed boundary of the working range or because the user does not know about the boundary of the working range displayed on the remote terminal, which does mean that the user can enter the automatic mode.

The prompting the user that he can enter the automatic mode of autonomously generating the virtual work boundary may further provide the user with an opportunity of selecting the automatic mode and the manual mode. When the remote terminal recognizes the boundary of the working range of the mowing apparatus, the mowing apparatus may autonomously move as a prior operational mode in order to save the user time, and generate the virtual work boundary according to position information of the mowing apparatus during the autonomous movement, but when the remote terminal prompts that the user can enter the automatic mode of autonomously generating the virtual work boundary, the user can choose whether to enter the automatic mode according to his own intention or wish. This gives the user more degree of freedom, can make the built virtual work boundary be more consistent with user needs or wish, and improves the user experience.

According to embodiments of the present disclosure, the user is reminded to enter the automatic mode of autonomously generating the virtual work boundary when the boundary of the working range of the mowing apparatus is recognized based on the environmental information of the mowing apparatus during movement. Similarly, the user is reminded to enter a manual mode of manually generating the virtual work boundary when the boundary of the working range of the mowing apparatus fails to be recognized based on the environmental information of the mowing apparatus during movement. That is, before the mowing apparatus switches between the automatic mode and the manual mode, the user is reminded that he can enter the automatic mode or the manual mode. The remote terminal may include a user feedback unit that works using acoustic, optical, electrical signals, etc., to send a prompt or reminder to the user. For example, the user may be reminded by a visual signal generated through the display screen of the remote terminal, an auditory signal generated through a speaker on the remote terminal or the mower, or a tactile signal, such as a vibration generated through a vibration unit. This embodiment can enhance the interaction between the user and the mowing apparatus, and improve the user experience. Further, the user is explicitly reminded when the boundary of the working range of the mowing apparatus is recognized, such that the user can make the best use of the autonomous mapping mode, thereby saving the user time for controlling the mowing apparatus, and improving the user work efficiency.

In addition, the method for generating a virtual boundary in the above embodiments is applied to the remote terminal, to make use of a large computing power of the remote terminal (such as a computing power of a CPU of a mobile phone). In this way, the mowing apparatus can be equipped with a processor with a small computing power, thereby further reducing costs of the mowing apparatus.

Figure 16:
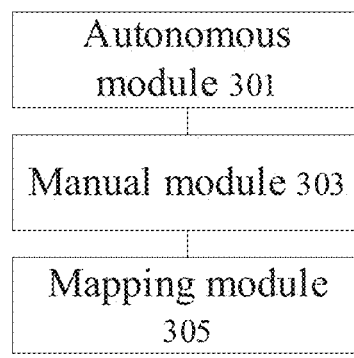
FIG. 16 is a schematic structural diagram of an apparatus for generating a virtual work boundary provided in an embodiment of the present disclosure.

Another aspect of the present disclosure relates to an apparatus 300 for generating a virtual work boundary. As shown in FIG. 16, the apparatus 300 includes an autonomous module 301, a manual module 303, and a mapping module 305. The autonomous module 301, the manual module 303, and the mapping module 305 may be functional modules that enable the controller of the mowing apparatus to implement execution instructions, or may be functional modules that enable the controller of the remote terminal to implement execution instructions. Specific functions of each module are as follows. The autonomous module 301 is configured to autonomously move, when, according to environmental information of a mowing apparatus during movement, a boundary of a working range of the mowing apparatus recognized, the mowing apparatus, and record position information of the mowing apparatus during the autonomous movement. The manual module 303 is configured to move, when the boundary of the working range of the mowing apparatus fails to be recognized based on the environmental information of the mowing apparatus during movement, the mowing apparatus according to a received first user instruction, and record position information of the mowing apparatus during the movement according to the first user instruction. The mapping module 305 is configured to generate the virtual work boundary according to the recorded position information.

Figure 17:
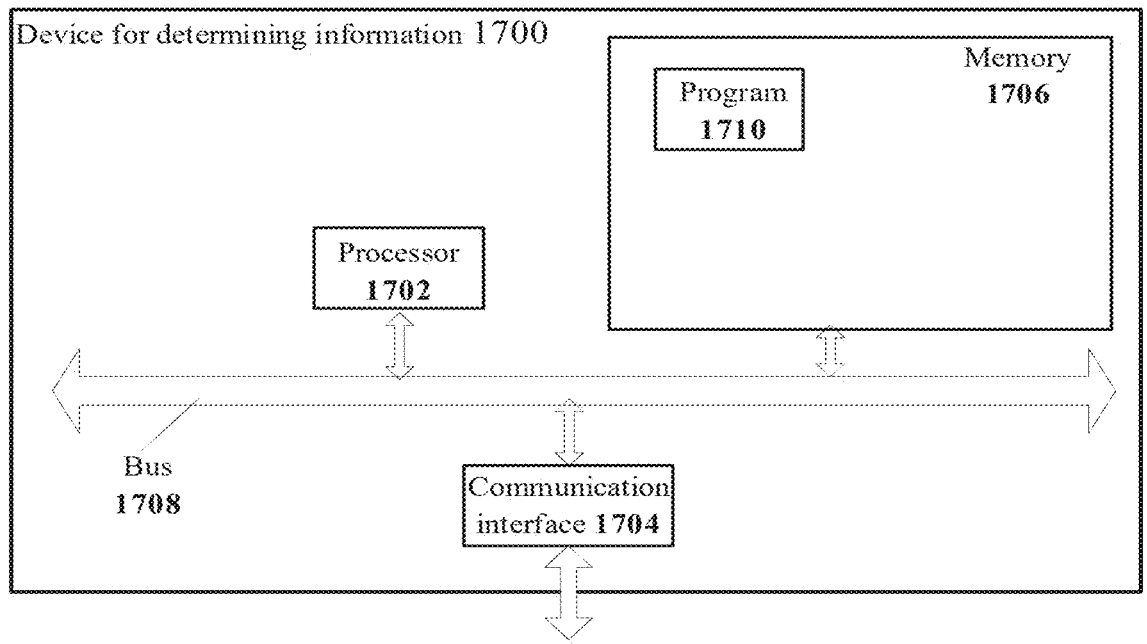
FIG. 17 is a schematic structural diagram of a device for determining information provided in an embodiment of the present disclosure.

Referring to FIG. 17, a schematic structural diagram of a device for determining information according to an embodiment of the present disclosure is shown. Specific embodiments of the present disclosure do not impose any limitation on specific implementations of the device for determining information.

As shown in FIG. 17, the device 1700 for determining information may include: a processor 1702, a communication interface 1704, a memory 1706, and a communication bus 1708.

The processor 1702, the communication interface 1704, and the memory 1706 communicate with each other through the communication bus 1708, the communication interface 1704 is configured to communicate with other electronic devices or servers; and the processor 1702 is configured to execute a program 1710, and specifically may execute relevant steps of the method for determining information in the above embodiments.

Specifically, the program 1710 may include a program code. The program code includes computer operation instructions.

The processor 1702 may be a central processing unit (CPU), or a graphics processing unit (GPU), or an Application Specific Integrated Circuit (ASIC), or one or more integrated circuits configured to implement embodiments of the present disclosure. One or more processors included in a smart device may be processors of a same type, e.g., one or more CPUs; or one or more GPUs; or may be processors of different types, e.g., one or more CPUs, one or more GPUs, and one or more ASICs.

The memory 1706 is configured to store the program 1710. The memory 1706 may include a high-speed RAM memory, and may further include a non-volatile memory, e.g., at least one disk memory.

The program 1710 may specifically be used for causing the processor 1702 to execute the method for determining information in any one of the above embodiments.

Corresponding description in the corresponding steps and units of the method for determining information in any one of the above embodiments may be referred to for specific implementations of each step in the program 1710, which will not be repeated here. Those skilled in the art can clearly understand that, for convenience and simplicity of description, the description of corresponding processes in the above method embodiments may be referred to for specific working processes of the above described device and modules. The description will not be repeated here.

In embodiments of the present disclosure, a to-be-processed image for a to-be-recognized region is collected through an image collector of a to-be-controlled device, the to-be-recognized region at least including a to-be-processed region and an obstacle region, the to-be-processed image is processed to determine information of a partial boundary of a to-be-processed region where the to-be-controlled device is currently located, and then the to-be-controlled device is controlled to switch between an autonomous movement mode and a remotely controlled movement mode based on the information of the partial boundary to determine a boundary of the to-be-processed region, the boundary of the to-be-processed region being used for distinguishing the to-be-processed region from the obstacle region, thereby processing the to-be-processed image collected by the image collector of the to-be-controlled device for the to-be-recognized region including the to-be-processed region and the obstacle region, to obtain the information of the partial boundary of the to-be-processed region where the to-be-controlled device is currently located, determine the boundary of the to-be-processed region by combining the autonomous movement mode and the remotely controlled movement mode based on the information of the partial boundary, instead of determining the regional boundary separately using a constant mode, and determine the regional boundary without burying wires in the region, and solving the problems of cumbersome operations and low efficiency existing in solutions of determining a regional boundary in associated technologies.

Figure 18:
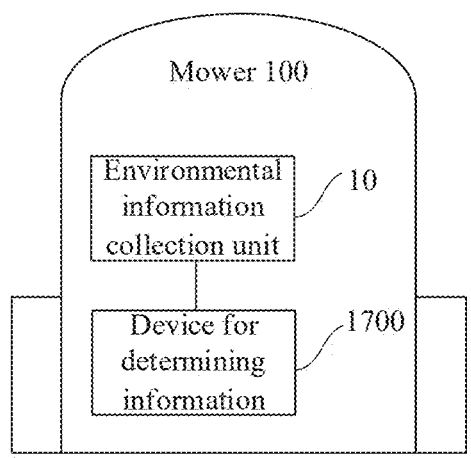
FIG. 18 is a schematic structural diagram of a mower provided in an embodiment of the present disclosure.

Another aspect of the present disclosure relates to a mower. As shown in FIG. 18, the mowing apparatus 100 may include the above device 1700 for determining information determination. The memory 1706 on the device 1700 for determining information stores instructions for implementing the above method for determining information. When the processor 1701 executes these instructions, the mowing apparatus 100 can implement the method. Compared with the method for recognizing a boundary between grass and non-grass and generating a virtual work boundary based on recorded position information by a remote terminal, the method implemented by the mowing apparatus 100 has low delay, and neither needs to send a large amount of environmental information collected by the environmental information collection unit 10 to the remote terminal through the communication port, nor needs to receive the recognition result of the remote terminal through the communication interface to generate the virtual work boundary. In this way, the mowing apparatus 100 can recognize whether there is a boundary line between grass and non-grass based on the environmental information collected by the environmental information collection unit 10 in real time as the mowing apparatus moves, can recognize whether the boundary of the working range is included according to the boundary line between grass and non-grass, and can update the built virtual work boundary in real time according to the recognition result, thus further improving the mapping efficiency and accuracy.

Figure 19:
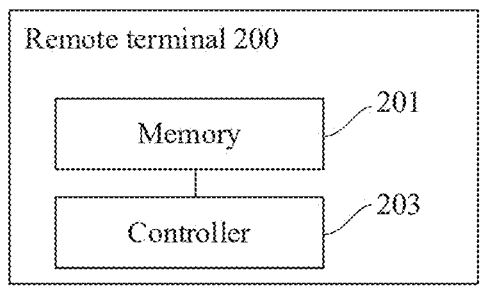
FIG. 19 is a schematic structural diagram of a remote terminal provided in an embodiment of the present disclosure.

Another aspect of the present disclosure relates to a remote terminal. As shown in FIG. 19, the remote terminal 200 includes a memory 201 and a controller 203. The memory 201 is used for storing instructions, and the controller 203 is used for executing the instructions, to implement the corresponding operations of the above method for generating a virtual work boundary.

Another aspect of the present disclosure relates to a computer storage medium. The computer storage medium stores a computer program therein, and the computer program, when executed by a processor, implements the corresponding operations of the above method for generating a virtual work boundary.

An embodiment of the present disclosure further provides a computer program product, including a computer instruction, the computer instruction instructing a computing device to execute the corresponding operations of any one method in the above method embodiments.

Figure 22:
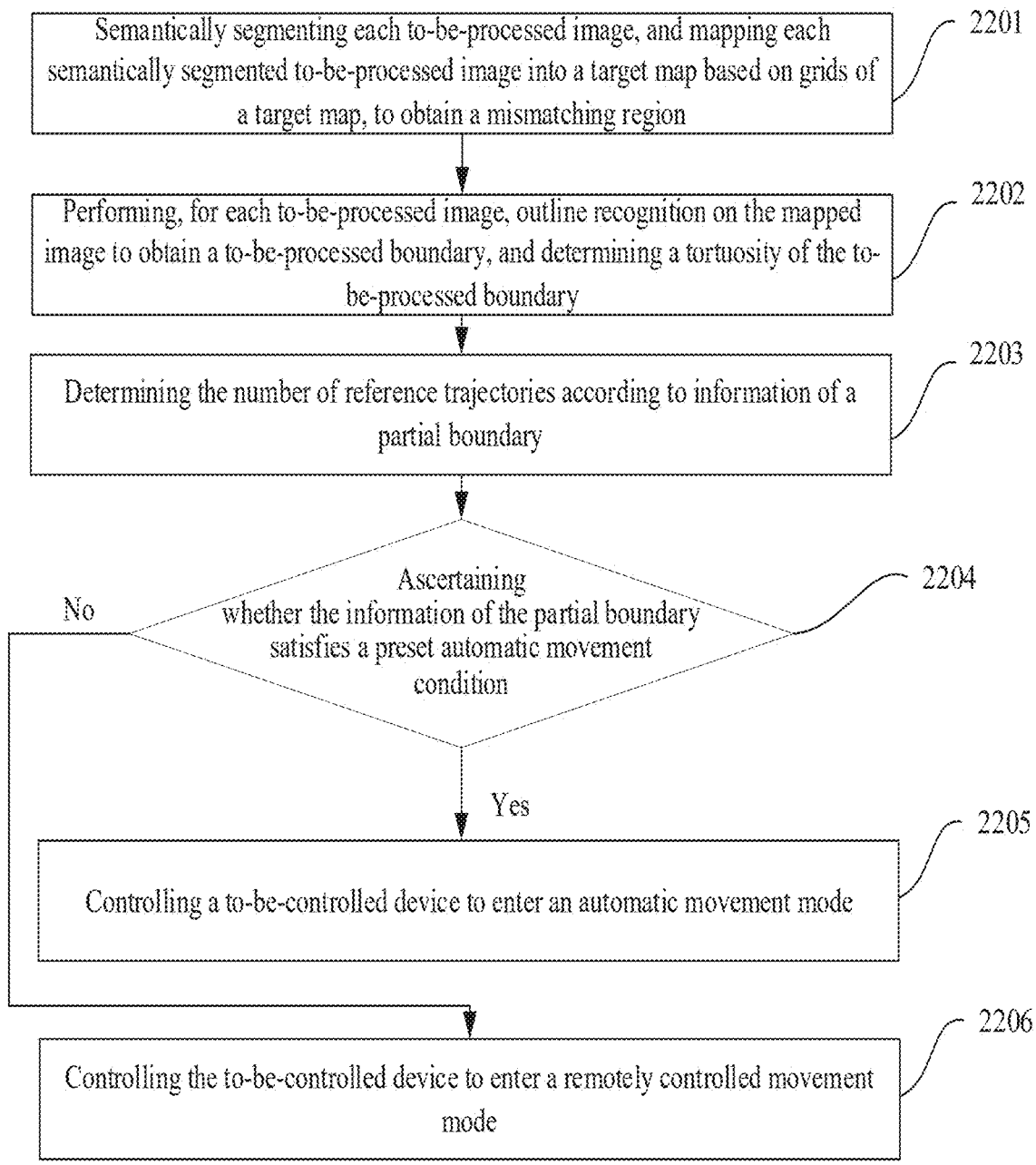
FIG. 22 is a schematic flowchart of a method for switching a movement mode of a to-be-controlled device provided in an embodiment of the present disclosure.

Based on the above embodiments, in other embodiments of the present disclosure, referring to FIG. 22, the method for determining information may further include the following steps:

Step 2201: semantically segmenting each to-be-processed image, and mapping each semantically segmented to-be-processed image into a target map based on grids of a target map, to obtain a mismatching region.

Each to-be-processed image is semantically segmented to determine different objects in the to-be-processed image, the target map is a map of a target region in a to-be-recognized region, then each semantically segmented to-be-processed image is mapped into the target map based on the grids of the target map, each to-be-processed image is matched according to the semantic segmentation result and the target map to determine a mismatching region, a plurality of mapped to-be-processed images is superimposed to determine a region where a same position corresponds to different objects in the target map based on the superimposition result, and the region is determined for use as the mismatching region.

Step 2202: performing, for each to-be-processed image, outline recognition on the mapped image to obtain a to-be-processed boundary, and determining a tortuosity of the to-be-processed boundary.

Outline recognition of the mapped image of each to-be-processed image is performed to obtain each to-be-processed boundary, and then a tortuosity can be computed for each to-be-processed boundary, and a mean tortuosity is taken as the tortuosity of the to-be-processed boundary.

Step 2203: determining the number of reference trajectories according to information of a partial boundary.

The reference trajectories are determined according to connection lines of boundary reference points. The boundary reference points are points on the partial boundary indicated by the information of the partial boundary.

Step 2204: ascertaining whether the information of the partial boundary satisfies a preset autonomous movement condition, executing step 2205 if the information of the partial boundary satisfies the preset autonomous movement condition, and executing step 2206 if the information of the partial boundary fails to satisfy the preset autonomous movement condition.

The autonomous movement condition is determined based on the mismatching region, the target region, the tortuosity of the to-be-processed boundary, and the number of reference trajectories.

Step 2205: controlling a to-be-controlled device to enter an autonomous movement mode.

When the information of the partial boundary satisfies the preset autonomous movement condition, the to-be-controlled device is controlled to enter the autonomous movement mode.

Step 2206: controlling the to-be-controlled device to enter a remotely controlled movement mode.

When the information of the partial boundary fails to satisfy the preset autonomous movement condition, the to-be-controlled device is controlled to enter the remotely controlled movement mode.

In embodiments of the present disclosure, the to-be-controlled device is controlled to perform different modes of movement under different conditions, thereby reducing manual operation intensity to a certain extent.

In one possible implementation, the autonomous movement condition may include:

(i) a ratio of an area of the mismatching region to an area of the target region is less than or equal to a preset first threshold.

The preset first threshold may be 40%. When the area of the mismatching region is less than or equal to 40% of the area of the target region, this condition is satisfied.

(ii) the number of reference trajectories is less than or equal to a preset second threshold.

The preset second threshold may be 3. Based on the information of the partial boundary, when the number of reference trajectories is determined to be less than or equal to 3, this condition is satisfied. A method for determining a reference trajectory may be as follows: first, expanding a region where an obstacle is located, where an expansion scale is determined according to a width and a length of the to-be-controlled device and a preset distance from a boundary of a to-be-processed region, then extracting an edge of the region where the expanded obstacle is located, and finally selecting a series of points from a nearest place to the to-be-controlled device, and determining the reference trajectory according to the series of points. If there is a plurality of obstacles, reference trajectories are extracted respectively.

(iii) the tortuosity of the to-be-processed boundary is less than or equal to a preset third threshold, where the tortuosity of the partial boundary is determined based on a difference between gray values of the regions divided by the partial boundary.

The preset third threshold may be 20%. When the tortuosity of the to-be-processed boundary is less than or equal to 20%, this condition is satisfied. The tortuosity of the to-be-processed boundary may be determined according to a ratio of a length of a curved part to a total length of the to-be-processed boundary.

In embodiments of the present disclosure, the ratio of the area of the mismatching region to the area of the target region is computed, to ascertain whether the partial boundary represented by the information of the partial boundary is clear, the number of extractable reference trajectories is computed to ascertain whether there are too many obstacles within a region of the partial boundary represented by the information of the partial boundary, the tortuosity of the to-be-processed boundary is computed to ascertain whether the to-be-processed boundary is easy for the to-be-controlled device to move, and after all conditions are satisfied, the to-be-controlled device enters the autonomous movement mode, thereby improving operation safety of the to-be-controlled device.

Figure 23:
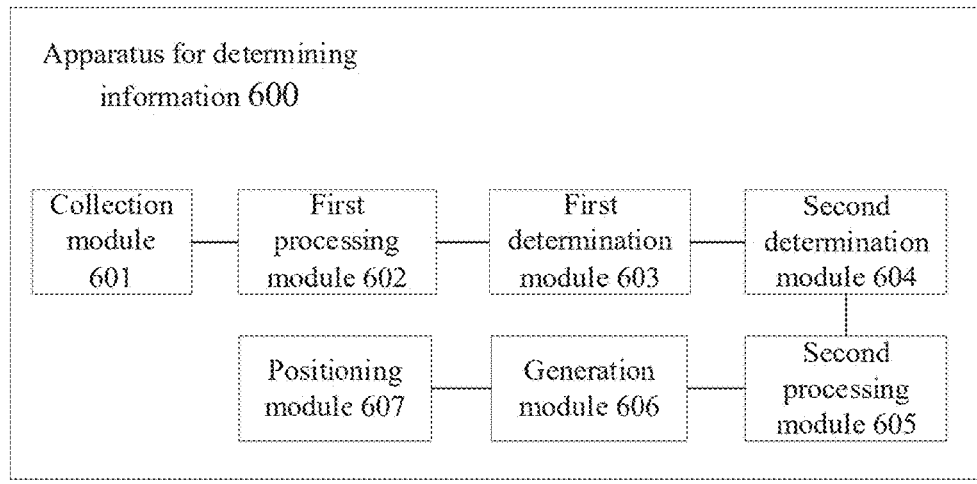
FIG. 23 is a schematic structural diagram of an apparatus for determining information provided in an embodiment of the present disclosure.

Based on the above embodiments, an embodiment of the present disclosure provides an apparatus for determining information, as shown in FIG. 23. The apparatus 600 for determining information includes: a collection module 601, a first processing module 602, a first determination module 603, a second determination module 604, a second processing module 605, a generation module 606, and a positioning module 607.

The collection module 601 is configured to collect a to-be-processed image for a to-be-recognized region through an image collector of a to-be-controlled device, where the to-be-recognized region at least includes a to-be-processed region and an obstacle region.

In embodiments of the present disclosure, the collection module 601 may be a device for certain processing of the to-be-processed region; and, the to-be-controlled device may be a smart device with certain data processing function and image collection function. In one possible implementation, the to-be-controlled device may refer to a mobile machine device (or a mobile robot); and preferably, the to-be-controlled device may include a gardening robot or may refer to a mower.

It should be noted that the image collector may refer to a camera on the mower; the to-be-processed image may be obtained by continuously photographing the to-be-recognized region at least including the to-be-processed region and the obstacle region using the camera of the mower; i.e., the to-be-processed image may include a plurality of images. In addition, the to-be-processed image may include an image of a boundary of the to-be-processed region. The to-be-processed region may refer to a region where an object therein is to be processed; and the obstacle region may refer to a region except for the to-be-processed region.

The first processing module 602 is configured to process the to-be-processed image, and determine information of a partial boundary of a to-be-processed region where the to-be-controlled device is currently located.

In embodiments of the present disclosure, the device for determining information may refer to the to-be-controlled device; and the information of the partial boundary may refer to a status of the partial boundary. That is, the to-be-controlled device may semantically segment and process the plurality of collected to-be-processed images, and determine status of a partial boundary of a region where the to-be-controlled device is currently located in the to-be-processed region based on the semantic segmentation result and the processing result.

The first determination module 603 is configured to control the to-be-controlled device to switch between an autonomous movement mode and a remotely controlled movement mode based on the information of the partial boundary to determine a boundary of the to-be-processed region, where the boundary of the to-be-processed region is used for distinguishing the to-be-processed region from the obstacle region.

In one possible implementation, when the to-be-controlled device is a mower, the to-be-processed region may refer to a to-be-trimmed lawn.

The second determination module 604 is configured to determine a visual feature map for the to-be-processed region.

In embodiments of the present disclosure, the visual feature map may be obtained by visual mapping; where visual positioning and mapping may mean that a mobile robot computes its own current position in real time through a pre-built map during autonomous movement. The visual positioning and mapping include a visual mapping process and a visual positioning process. The visual mapping process means to reorganize environmental data collected by a sensor into a specific data structure through an algorithm, where the employed sensor is mainly a Global Positioning System (GPS), a laser radar, a camera, a wheel speedometer, an inertial measurement unit (IMU), etc. The visual mapping is a camera-based mapping method, and may also be combined with other sensors. After mapping is completed by the visual positioning, the robot can obtain current position information by computation based on comparison between current sensor data with the visual feature map.

It should be noted that, in embodiments of the present disclosure, an image may be recorded using a camera during interactive mapping, and then optimized visual three-dimensional reconstruction may be performed by integrated navigation to obtain the visual feature map; or, visual three-dimensional reconstruction may be first performed, and then a mower trajectory after the visual three-dimensional reconstruction may be aligned with a real-time kinematic (RTK) trajectory to obtain the visual feature map; where the mower trajectory is aligned with the RTK trajectory, such that a coordinate system of the visual feature map is consistent with a coordinate system for the integrated navigation, to ensure the accuracy of subsequent positioning. In addition, in embodiments of the present disclosure, the visual feature map may be determined based on an integrated navigation technology, visual positioning, and mapping, and the specific determination process may include any possible implementation in associated technologies.

The second processing module 605 is configured to determine, for a partial region satisfying a target signal condition in the to-be-processed region, a boundary of the partial region based on the visual feature map and a semantic segmentation technology.

In embodiments of the present disclosure, the target signal condition may mean that the RTK signal strength is less than the target signal strength, i.e., the RTK signal is poor; i.e., the partial region may refer to a region with poor RTK signal during visual mapping. For the region with poor RTK signal, the boundary of the partial region may be determined using the visual feature map and the semantic segmentation technology.

The generation module 606 is configured to obtain a target boundary of the to-be-processed region based on the boundary of the partial region and the boundary of the to-be-processed region.

In embodiments of the present disclosure, the boundary of the partial region may be compared with a boundary of the region with poor RTK signal among the boundary of the to-be-processed region, and a boundary farther from an obstacle among the above two boundaries may be selected for use as a final boundary of the partial region; or, if the boundary of the partial region is determined in the autonomous movement mode, the boundary of the partial region is selected for use as the final boundary of the partial region; or, a prompt message is generated to prompt the user that the RTK signal in this partial region is poor, and information of the above two boundaries is displayed, such that the user can choose the final boundary; and then, the target boundary of the to-be-processed region is obtained based on update of the final boundary of the partial region.

The positioning module 607 is configured to perform visual positioning based on the visual feature map to obtain a position of the to-be-controlled device.

In embodiments of the present disclosure, when the poor RTK signal is detected during operation of the mower, a pose of the mower is acquired through visual positioning, so as to be involved in subsequent computation of the integrated navigation; thereby reducing pose drift errors. Of course, the visual positioning based on the visual feature map may also be involved in the whole process of the computation of the integrated navigation.

In embodiments of the present disclosure, the first determination module 603 can control the to-be-controlled device itself to switch back and forth between the autonomous movement mode and the remotely controlled movement mode according to the status of the partial boundary represented by the information of the partial boundary, thereby determining the boundary of the to-be-processed region; i.e., the to-be-controlled device may determine the boundary of the to-be-processed region by combining the autonomous movement mode and the remotely controlled movement mode, thereby greatly reducing manual operations, improving work efficiency, and reducing labor costs, compared with the boundary of the to-be-processed region determined under a single mode.

Figure 24:
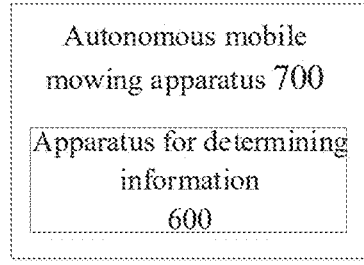
FIG. 24 is a schematic structural diagram of an autonomous mobile mowing apparatus provided in an embodiment of the present disclosure.

Based on the above embodiments, an embodiment of the present disclosure provides an autonomous mobile mowing apparatus, as shown in FIG. 24. The autonomous mobile mowing apparatus 700 may include the apparatus 600 for determining information provided in the above embodiments.

The autonomous mobile mowing apparatus 700 determines the boundary of the to-be-processed region through the apparatus 600 for determining information.

Accordingly, as shown in FIG. 17, the device may include: a processor 1702, a memory 1706, and a communication bus 1708.

The communication bus 1708 is configured to implement a communication connection between the processor 1702 and the memory 1706.

The processor 1702 is configured to execute an information determination program in the memory 1706 to implement the following steps:
  collecting a to-be-processed image for a to-be-recognized region through an image collector of a to-be-controlled device, where the to-be-recognized region at least includes a to-be-processed region and an obstacle region;
  processing the to-be-processed image, and determining information of a partial boundary of a to-be-processed region where the to-be-controlled device is currently located; and
  controlling the to-be-controlled device to switch between an autonomous movement mode and a remotely controlled movement mode based on the information of the partial boundary to determine a boundary of the to-be-processed region.

The boundary of the to-be-processed region is used for distinguishing the to-be-processed region from the obstacle region.

In other embodiments of the present disclosure, the processor 1702 is configured to collect the to-be-processed image for the to-be-recognized region through the image collector of the to-be-controlled device of the information determination program in the memory 1706 to implement the following steps:
  collecting a plurality of the to-be-processed images for the to-be-recognized region through the image collector when the to-be-controlled device moves; and
  accordingly, the processor 1702 is configured to process the to-be-processed image, and determine the information of the partial boundary of a to-be-processed region where the to-be-controlled device is currently located of the information determination program in the memory 1706 to implement the following steps:
  semantically segmenting and processing the plurality of the to-be-processed images, and determining the information of the partial boundary based on the semantic segmentation result and the processing result.

In other embodiments of the present disclosure, the processor 1702 is configured to semantically segment and process the plurality of to-be-processed images, and determine the information of the partial boundary based on the semantic segmentation result and the processing result of the information determination program in the memory 1706 to implement the following steps:
  semantically segmenting each of the to-be-processed images, and matching each to-be-processed image based on the semantic segmentation result and a target map to obtain a mismatching region; where the target map is a map of a target region in the to-be-recognized region;

semantically segmenting each to-be-processed image, and mapping each semantically segmented to-be-processed image into the target map based on grids of the target map;

performing, for each to-be-processed image, outline recognition on the mapped image to obtain a to-be-processed boundary; and determining the information of the partial boundary based on smoothness of the to-be-processed boundary, the mismatching region, and the target region.

In other embodiments of the present disclosure, the processor 1702 is configured to control the to-be-controlled device to switch between the autonomous movement mode and the remotely controlled movement mode based on the information of the partial boundary to determine the boundary of the to-be-processed region of the information determination program in the memory 1706 to implement the following steps:

controlling the to-be-controlled device to switch to work in the autonomous movement mode when the information of the partial boundary indicates that the partial boundary satisfies a target boundary condition, to determine the boundary of the to-be-processed region; and controlling the to-be-controlled device to switch to work in the remotely controlled movement mode when the information of the partial boundary indicates that the partial boundary fails to satisfy the target boundary condition, to determine the boundary of the to-be-processed region.

In other embodiments of the present disclosure, the processor 1702 is configured to execute the information determination program in the memory 1706, and can further implement the following steps:

receiving an operation instruction for operating an operation object of the to-be-controlled device; and controlling the to-be-controlled device to switch to work in the remotely controlled movement mode based on the operation instruction, to determine the boundary of the to-be-processed region.

In other embodiments of the present disclosure, the processor 1702 is configured to execute the information determination program in the memory 1706, and can further implement the following steps:

recognizing each to-be-processed image to obtain a target obstacle in the to-be-processed region;

determining a region where the target obstacle is located in the to-be-processed region based on a position of the target obstacle in the to-be-processed image and a map of the to-be-processed region;

or, determining an obstacle avoiding trajectory of the to-be-controlled device, and determining the region where the target obstacle is located in the to-be-processed region based on the obstacle avoiding trajectory; where the obstacle avoiding trajectory represents a trajectory formed by bypassing the target obstacle during movement of the to-be-controlled device.

In other embodiments of the present disclosure, the processor 1702 is configured to execute the information determination program in the memory 1706, and can further implement the following steps:

determining a visual feature map for the to-be-processed region;

determining, for a partial region satisfying a target signal condition in the to-be-processed region, a boundary of the partial region based on the visual feature map and a semantic segmentation technology;

obtaining a target boundary of the to-be-processed region based on the boundary of the partial region and the boundary of the to-be-processed region; and performing visual positioning based on the visual feature map to obtain a position of the to-be-controlled device.

In other embodiments of the present disclosure, the processor 1702 is configured to execute the information determination program in the memory 1706, and can further implement the following steps:

updating a position of an obstacle in a map of the to-be-recognized region based on the target map or updating the region where the target obstacle is located based on an updated obstacle avoiding trajectory, when the target obstacle is determined to have a change; and updating a boundary of the to-be-recognized region in the map based on the target map or updating the boundary of the to-be-processed region based on the updated obstacle avoiding trajectory when the boundary of the to-be-processed region is determined to have a change.

In other embodiments of the present disclosure, the processor is configured to execute the information determination program in the memory, and can further implement the following steps:

determining and displaying a to-be-updated update content in the map of the to-be-recognized region when the target obstacle or the boundary of the to-be-processed region is determined to have a change; and updating the boundary and an obstacle position in the map of the to-be-recognized region based on a selection operation of an operation object.

It should be noted that the implementation processes of the method for determining information provided in the corresponding embodiments of FIG. 1 to FIG. 3 may be referred to for the specific implementation processes of the steps executed by the processor in the present embodiment, which will not be repeated here.

The device for determining information provided in embodiments of the present disclosure can process a to-be-processed image collected by an image collector of a to-be-controlled device for a to-be-recognized region including a to-be-processed region and an obstacle region, to obtain information of a partial boundary of a to-be-processed region where the to-be-controlled device is currently located, determine a boundary of the to-be-processed region by combining an autonomous movement mode and a remotely controlled movement mode based on the information of the partial boundary, instead of determining the regional boundary separately using a constant mode, and determine the regional boundary without burying wires in the region, thereby solving the problems of cumbersome operations and low efficiency existing in solutions of determining a regional boundary in associated technologies.

Based on the above embodiments, an embodiment of the present disclosure provides a computer-readable storage medium, storing one or more programs, where the one or more programs can be executed by one or more processors, to implement the steps of the method for determining information provided in the corresponding embodiments of FIG. 1 to FIG. 3.

Those skilled in the art should understand that the embodiments of the present disclosure may be provided as a method, a system, or a computer program product. Accordingly, the present disclosure may take the form of a hardware embodiment, a software embodiment, or an embodiment combining software and hardware. Further, the present disclosure may take the form of a computer program product embodied in one or more computer-usable storage mediums (including, but not limited to, a disk memory, an optical memory, and the like) having computer-usable program code embodied thereon.

The present disclosure is described with reference to the flow chart and/or block diagram of the method, device (system), and computer program product according to embodiments of the present disclosure. It should be understood that each process and/or block in the flow charts and/or block diagrams as well as combinations of processes and/or blocks in the flow charts and/or block diagrams may be implemented by computer program instructions.

The computer program instructions may be provided to a processor of a general purpose computer, a special purpose computer, an embedded processor, or other programmable data processing devices to produce a machine, such that the instructions executed via the processor of the computer or other programmable data processing devices create an apparatus for implementing the functions specified in one or more processes in the flow charts and/or one or more blocks in the block diagrams.

These computer program instructions may also be stored in a computer-readable memory that can direct a computer or other programmable data processing devices to function in a particular manner, such that the instructions stored in the computer-readable memory produce an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be performed on the computer or other programmable devices, to produce a computer implemented process, such that the instructions executed on the computer or other programmable devices provide steps for implementing the functions specified in one or more processes in the flow charts and/or one or more blocks in the block diagrams.

The above description merely provides preferred embodiments of the present disclosure, and is not intended to limit the scope of protection of the present disclosure.

Figure 25:
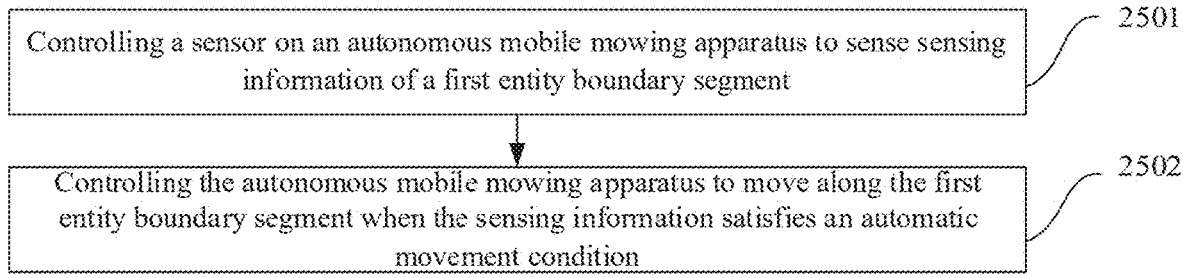
FIG. 25 is a schematic flowchart of a method for controlling an autonomous mobile mowing apparatus provided in an embodiment of the present disclosure.

An embodiment of the present disclosure further provides a method for controlling an autonomous mobile mowing apparatus. Referring to FIG. 25, this method includes the following steps:

Step 2501: controlling a sensor on an autonomous mobile mowing apparatus to sense sensing information of a first entity boundary segment.

Firstly, the sensor on the autonomous mobile mowing apparatus is controlled to sense the sensing information of the first entity boundary segment. The sensing method of the sensor may be RTK positioning, or may be other sensing method, which is not limited here. The first entity boundary segment is a partial entity boundary segment of a first region, where the first region is a to-be-worked region.

Step 2502: controlling the autonomous mobile mowing apparatus to move along the first entity boundary segment when the sensing information satisfies an autonomous movement condition.

After obtaining the sensing information, if the sensing information satisfies the autonomous movement condition, the autonomous mobile mowing apparatus is controlled to automatically run along the first entity boundary segment. A movement speed of the autonomous mobile mowing apparatus may be controlled according to a sent instruction, or may be autonomously controlled according to a preset speed threshold, which is not limited here.

In embodiments of the present disclosure, the autonomous movement condition is set to automatically control the autonomous mobile mowing apparatus to run along the first entity boundary segment when the autonomous movement condition is satisfied, thereby providing higher accuracy and saving labor costs, compared with manual control.

Based on the above embodiments, in other embodiments of the present disclosure, this method may further include:

semantically segmenting each to-be-processed image, and mapping each semantically segmented to-be-processed image into a target map based on grids of the target map, to obtain a mismatching region; then performing, for each to-be-processed image, outline recognition on the mapped image to obtain a to-be-processed boundary, and determining a tortuosity of the to-be-processed boundary; determining the number of reference trajectories according to information of a partial boundary; and ascertaining whether the information of the partial boundary satisfies a preset autonomous movement condition, controlling the to-be-controlled device to enter the autonomous movement mode if the information of the partial boundary satisfies the preset autonomous movement condition, and controlling the to-be-controlled device to enter the remotely controlled movement mode if the information of the partial boundary fails to satisfy the preset autonomous movement condition.

Each to-be-processed image is semantically segmented to determine different objects in the to-be-processed image, the target map is a map of a target region in a to-be-recognized region, then each semantically segmented to-be-processed image is mapped into the target map based on the grids of the target map, each to-be-processed image is matched according to the semantic segmentation result and the target map to determine a mismatching region, a plurality of mapped to-be-processed images is superimposed to determine a region where a same position corresponds to different objects in the target map based on the superimposition result, and the region is determined for use as the mismatching region. Outline recognition of the mapped image of each to-be-processed image is performed to obtain each to-be-processed boundary, and then a tortuosity can be computed for each to-be-processed boundary, and a mean tortuosity is taken as the tortuosity of the to-be-processed boundary.

The reference trajectories are determined according to connection lines of boundary reference points. The boundary reference points are points on the partial boundary indicated by the information of the partial boundary. The autonomous movement condition is determined based on the mismatching region, the target region, the tortuosity of the to-be-processed boundary, and the number of reference trajectories.

When the information of the partial boundary satisfies the preset autonomous movement condition, the to-be-controlled device is controlled to enter the autonomous movement mode. When the information of the partial boundary fails to satisfy the preset autonomous movement condition, the to-be-controlled device is controlled to enter the remotely controlled movement mode.

In embodiments of the present disclosure, the to-be-controlled device is controlled to perform different modes of movement under different conditions, thereby reducing manual operation intensity to a certain extent.

In one possible implementation, the autonomous movement condition may include:

(i) a ratio of an area of the mismatching region to an area of the target region is less than or equal to a preset first threshold.

The preset first threshold may be 40%. When the area of the mismatching region is less than or equal to 40% of the area of the target region, this condition is satisfied.

(ii) the number of reference trajectories is less than or equal to a preset second threshold.

The preset second threshold may be 3. Based on the information of the partial boundary, when the number of reference trajectories is determined to be less than or equal to 3, this condition is satisfied. A method for determining a reference trajectory may be as follows: first, expanding a region where an obstacle is located, where an expansion scale is determined according to a width and a length of the to-be-controlled device and a preset distance from a boundary of a to-be-processed region, then extracting an edge of the region where the expanded obstacle is located, and finally selecting a series of points from a nearest place to the to-be-controlled device, and determining the reference trajectory according to the series of points. If there is a plurality of obstacles, reference trajectories are extracted respectively.

(iii) the tortuosity of the to-be-processed boundary is less than or equal to a preset third threshold, where the tortuosity of the partial boundary is determined based on a difference between gray values of the regions divided by the partial boundary.

The preset third threshold may be 20%. When the tortuosity of the to-be-processed boundary is less than or equal to 20%, this condition is satisfied. The tortuosity of the to-be-processed boundary may be determined according to a ratio of a length of a curved part to a total length of the to-be-processed boundary.

In embodiments of the present disclosure, the ratio of the area of the mismatching region to the area of the target region is computed, to ascertain whether the partial boundary represented by the information of the partial boundary is clear, the number of extractable reference trajectories is computed to ascertain whether there are too many obstacles within a region of the partial boundary represented by the information of the partial boundary, the tortuosity of the to-be-processed boundary is computed to ascertain whether the to-be-processed boundary is easy for the to-be-controlled device to move, and after all conditions are satisfied, the to-be-controlled device enters the autonomous movement mode, thereby improving operation safety of the to-be-controlled device.

In one possible implementation, the method may further include: when there is a boundaryless segment between the first entity boundary segment and a second entity boundary segment, and a length of the boundaryless segment is less than or equal to a first preset distance, the autonomous mobile mowing apparatus crosses over the boundaryless segment and continues to move along the second entity boundary segment.

The second entity boundary segment is a partial entity boundary of the first region.

In embodiments of the present disclosure, when the length of the boundaryless segment is less than or equal to the first preset distance, the autonomous mobile mowing apparatus is set to cross over the boundaryless segment, thereby ensuring that the autonomous mobile mowing apparatus will not be interrupted due to some boundaryless segments that have no impact or little impact during the movement, and improving operation efficiency of the autonomous mobile mowing apparatus.

In one possible implementation, the first preset distance is less than a sum of a vehicle body width and a safety distance of the autonomous mobile mowing apparatus.

The safety distance can be any value between 20 cm and 50 cm. For example, the safety distance may be 20 cm, the vehicle body width of the autonomous mobile mowing apparatus may be 30 cm, and the first preset distance is less than 50 cm.

In embodiments of the present disclosure, a preset distance is set to be less than the sum of the vehicle body width and the safety distance of the autonomous mobile mowing apparatus, thereby preventing scratch of the physical portion of the end points of the first entity boundary segment and the second entity boundary segment when the autonomous mobile mowing apparatus moves through the boundaryless segment, which may damage the autonomous mobile mowing apparatus.

In one possible implementation, the safe distance is greater than or equal to positioning accuracy of the autonomous mobile mowing apparatus.

The positioning accuracy may be a value, such as 0.5 µm, and the safety distance should be greater than or equal to 0.5 m.

In embodiments of the present disclosure, the safe distance is set to be greater than or equal to the positioning accuracy of the autonomous mobile mowing apparatus, thereby avoiding the problem of failure to control the autonomous mobile mowing apparatus to ensure a sufficient safe distance during operation due to insufficient positioning accuracy of the autonomous mobile mowing apparatus, and improving the operation safety of the autonomous mobile mowing apparatus.

It should be noted that, depending on the implementation requirements, the components/steps described in the embodiments of the present disclosure may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or computer code storable in a recording medium (such as a CD ROM, RAM, floppy disk, hard disk, or magnetic disc), or be implemented as computer code that is downloaded from a network, is originally stored in a remote recording medium or a non-transitory machine-readable medium, and will be stored in a local recording medium, such that the method described herein may be processed by such software stored on a recording medium using a general purpose computer, a special purpose processor, or programmable or dedicated hardware (such as an ASIC or FPGA). It is understandable that a computer, a processor, a microprocessor controller, or programmable hardware includes a storage component (e.g., RAM, ROM, or flash memory) that can store or receive software or computer code. The method for determining information described herein is implemented when the software or computer code is accessed and executed by the computer, the processor, or the hardware. Further, when a general purpose computer accesses the code for implementing the method for determining information shown herein, the execution of the code converts the general purpose computer to a special purpose computer configured to execute the method for determining information shown herein.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The invention claimed is:

1. A method for determining information, comprising:
  collecting a to-be-processed image for a to-be-recognized region through an image collector of a to-be-controlled device, wherein the to-be-recognized region at least comprises a to-be-processed region and an obstacle region;
  processing the to-be-processed image, and determining information of a partial boundary of a to-be-processed region where the to-be-controlled device is currently located; and
  controlling the to-be-controlled device to switch between an autonomous movement mode and a remotely controlled movement mode based on the information of the partial boundary to determine a boundary of the to-be-processed region, wherein the boundary of the to-be-processed region is used for distinguishing the to-be-processed region from the obstacle region;
  wherein the controlling the to-be-controlled device to switch between the autonomous movement mode and the remotely controlled movement mode based on the information of the partial boundary to determine the boundary of the to-be-processed region comprises operations (a) and (b), or (c) and (d), wherein,
  the operation (a) includes:
    sending a first instruction message to a remote terminal when a boundary of a working range of the to-be-controlled device is determined based on the information of the partial boundary when the to-be-controlled device is in the remotely controlled movement mode, such that the remote terminal displays a first mode switching control widget through a display interface according to the first instruction message;
    switching to the autonomous movement mode to autonomously move when a first control message sent from the remote terminal in response to triggering of the first mode switching control widget is received, and recording position information of the to-be-controlled device during the autonomous movement; and
    generating the boundary of the to-be-processed region according to the recorded position information,
  the operation (b) includes:
    sending a second instruction message to the remote terminal when the boundary of the working range of the to-be-controlled device fails to be determined according to the information of the partial boundary when the to-be-controlled device is in the autonomous movement mode, such that the remote terminal displays a first movement control widget through the display interface according to the second instruction message;
    moving, when receiving a second control message sent from the remote terminal in response to triggering of the first movement control widget, according to the second control message, and recording position information of the to-be-controlled device during the movement according to the second control message; and
    generating the boundary of the to-be-processed region according to the recorded position information,
  the operation (c) includes:
    switching to the autonomous movement mode to autonomously move, when a third control message sent from a remote terminal in response to triggering of a second mode switching control widget is received when the to-be-controlled device is in the remotely controlled movement mode, and recording position information of the to-be-controlled device during the autonomous movement, wherein the second mode switching control widget is displayed through a display interface after the remote terminal determines a boundary of a working range of the to-be-controlled device; and
    generating the boundary of the to-be-processed region according to the recorded position information, and
  the operation (d) includes:
    moving, when a fourth control message sent from the remote terminal in response to triggering of a second movement control widget is received when the to-be-controlled device is in the autonomous movement mode, according to the fourth control message, and recording position information of the to-be-controlled device during the movement according to the fourth control message; and
    generating the boundary of the to-be-processed region according to the recorded position information.

2. The method according to claim 1, wherein the collecting the to-be-processed image for the to-be-recognized region through the image collector of the to-be-controlled device comprises:
  collecting a plurality of the to-be-processed images for the to-be-recognized region through the image collector when the to-be-controlled device moves; and
  accordingly, the processing the to-be-processed image, and determining the information of the partial boundary of the to-be-processed region where the to-be-controlled device is currently located comprises:
  semantically segmenting and processing the plurality of the to-be-processed images, and determining the information of the partial boundary based on the semantic segmentation result and the processing result.

3. The method according to claim 2, wherein the semantically segmenting and processing the plurality of the to-be-processed images, and determining the information of the partial boundary based on the semantic segmentation result and the processing result comprises:
  semantically segmenting each of the to-be-processed images and matching each to-be-processed image based on the semantic segmentation result and a target map to obtain a mismatching region; wherein the target map is a map of a target region in the to-be-recognized region;
  semantically segmenting each to-be-processed image and mapping each semantically segmented to-be-processed image to the target map based on grids of the target map;

performing, for each to-be-processed image, outline recognition on the mapped image to obtain a to-be-processed boundary; and
determining the information of the partial boundary based on smoothness of the to-be-processed boundary, the mismatching region, and the target region.

4. The method according to claim 1, wherein the controlling the to-be-controlled device to switch between the autonomous movement mode and the remotely controlled movement mode based on the information of the partial boundary to determine the boundary of the to-be-processed region comprises:
controlling the to-be-controlled device to switch to work in the autonomous movement mode when the information of the partial boundary indicates that the partial boundary satisfies a target boundary condition, to determine the boundary of the to-be-processed region; and
controlling the to-be-controlled device to switch to work in the remotely controlled movement mode when the information of the partial boundary indicates that the partial boundary fails to satisfy the target boundary condition, to determine the boundary of the to-be-processed region.

5. The method according to claim 1, wherein instruction the method further comprises:
receiving an operation instruction for operating an operation object of the to-be-controlled device; and
controlling the to-be-controlled device to switch to work in the remotely controlled movement mode based on the operation instruction, to determine the boundary of the to-be-processed region.

6. The method according to claim 1, wherein the to-be-controlled device includes a mowing apparatus; and
the controlling the to-be-controlled device to switch between the autonomous movement mode and the remotely controlled movement mode based on the information of the partial boundary to determine the boundary of the to-be-processed region comprises:
switching the mowing apparatus to the autonomous movement mode to autonomously move when a boundary of a working range of the mowing apparatus is determined based on the information of the partial boundary, and recording position information of the mowing apparatus during the autonomous movement;
switching the mowing apparatus to the remotely controlled movement mode to move according to a received first user instruction when the boundary of the working range of the mowing apparatus fails to be determined based on the information of the partial boundary, and recording position information of the mowing apparatus during the movement according to the first user instruction; and
generating a virtual work boundary according to the recorded position information, wherein the boundary of the to-be-processed region comprises the virtual work boundary, and
wherein the switching the mowing apparatus to the autonomous movement mode to autonomously move when the boundary of the working range of the mowing apparatus is determined based on the information of the partial boundary comprises:
obtaining a movement path of the mowing apparatus according to the determined boundary of the working range; and
autonomously moving the mowing apparatus along the movement path.

7. The method according to claim 6, wherein the switching the mowing apparatus to the autonomous movement mode to autonomously move when the boundary of the working range of the mowing apparatus is determined based on the information of the partial boundary, and recording the position information of the mowing apparatus during the autonomous movement comprises:
moving, when the boundary of the working range of the mowing apparatus is determined based on the information of the partial boundary and the first user instruction is received, the mowing apparatus according to the received first user instruction, and recording the position information of the mowing apparatus during the movement according to the first user instruction.

8. The method according to claim 6, wherein the received first user instruction comprises: a user-defined target movement position; and
the moving the mowing apparatus according to the received first user instruction comprises: autonomously moving the mowing apparatus to the target movement position along a straight line.

9. The method according to claim 1, wherein the method further comprises:
controlling the to-be-controlled device to exit the autonomous movement mode when the to-be-controlled device satisfies at least one of following conditions:
(i) the to-be-controlled device is disconnected from the remote terminal, where the remote terminal is used for controlling the to-be-controlled device to move; and
(ii) the to-be-controlled device moves to a preset target position.

10. A method for determining information, being applied to a remote terminal, wherein the remote control is configured to control a to-be-controlled device to move, the method comprising:
receiving information of a partial boundary sent from the to-be-controlled device, wherein the information of the partial boundary is used for indicating a partial boundary of a to-be-processed region where the to-be-controlled device is currently located, the information of the partial boundary is obtained by the to-be-controlled device from processing of a to-be-processed image, the to-be-processed image is obtained by an image collector of the to-be-controlled device from image collection of a to-be-recognized region, and the to-be-recognized region at least comprises a to-be-processed region and an obstacle region;
sending control information to the to-be-controlled device based on the information of the partial boundary, such that the to-be-controlled device switches between an autonomous movement mode and a remotely controlled movement mode according to the control information, and determines a boundary of the to-be-processed region, wherein the boundary of the to-be-processed region is used for distinguishing the to-be-processed region from the obstacle region;
wherein the sending the control information to the to-be-controlled device based on the information of the partial boundary comprises operation (h) that includes:
displaying a second movement control widget through the display interface when the boundary of the working range of the to-be-controlled device fails to be determined based on the information of the partial boundary when the to-be-controlled device is in the autonomous movement mode;
sending a fourth control message to the to-be-controlled device in response to triggering of the second movement control widget, such that the to-be-controlled device moves according to the fourth control message, and records position information of the to-be-controlled device during the movement according to the fourth control message, sending a first instruction message toa remote terminal when a boundary of a working range of the to-be-controlled device is determined based on the information of the partial boundary when the to-be-controlled device is in the remotely controlled movement mode, such that the remote terminal displays a first mode switching control widget through a display interface according to the first instruction message;

switching to the autonomous movement mode to autonomously move when a first control message sent from the remote terminal in response to triggering of the first mode switching control widget is received, and recording position information of the to-be-controlled device during the autonomous movement; and generating the boundary of the to-be-processed region according to the recorded position information.

11. The method according to claim 10, wherein the to-be-controlled device includes a mowing apparatus; and the sending the control information to the to-be-controlled device based on the information of the partial boundary, such that the to-be-controlled device switches between the autonomous movement mode and the remotely controlled movement mode according to the control information, and determines the boundary of the to-be-processed region comprises:

sending a first control message when a boundary of a working range of the mowing apparatus is determined based on the information of the partial boundary, to control the mowing apparatus to switch to the autonomous movement mode to autonomously move, and recording position information of the mowing apparatus during the autonomous movement;

sending the second control message when the boundary of the working range of the mowing apparatus fails to be determined based on the information of the partial boundary, to control the mowing apparatus to switch to the remotely controlled movement mode to move according to a received first user instruction, and recording position information of the mowing apparatus during the movement according to the first user instruction; and controlling the mowing apparatus to generate a virtual work boundary according to the recorded position information, wherein the virtual work boundary comprises the boundary of the to-be-processed region.

12. The method according to claim 11, wherein when the boundary of the working range of the mowing apparatus is determined based on the information of the partial boundary, at least one of following operations is executed:

displaying the recognized boundary of the working range to the user; and prompting the user that he can enter an autonomous movement mode of autonomously generating the virtual work boundary.

13. The method according to claim 10, wherein the method further comprises:

exiting a control interface of the autonomous movement mode when the remote terminal detects that the to-be-controlled device satisfies at least one of following conditions:

(i) the remote terminal is disconnected from the to-be-controlled device; and (ii) the to-be-controlled device moves to a preset target position.

14. The method according to claim 10, wherein the method further comprises operation (f), wherein, the operation (f) includes:

displaying, when a second instruction message sent from the to-be-controlled device is received, a first movement control widget through the display interface, wherein the second instruction message is sent from the to-be-controlled device when following conditions are satisfied: the to-be-controlled device is in the autonomous movement mode, and the boundary of the working range of the to-be-controlled device fails to be determined based on the information of the partial boundary; and sending the second control message to the to-be-controlled device in response to triggering of the first movement control widget, such that the to-be-controlled device moves according to the second control message, and records position information of the to-be-controlled device during the movement according to the second control message.

15. The method according to claim 10, wherein the sending the control information to the to-be-controlled device based on the information of the partial boundary comprises operation (g) that includes:

displaying a second mode switching control widget through a display interface when the boundary of the working range of the to-be-controlled device is determined based on the information of the partial boundary when the to-be-controlled device is in the remotely controlled movement mode; and sending a third control message to the to-be-controlled device in response to triggering of the second mode switching control widget, such that the to-be-controlled device switches to the autonomous movement mode according to the third control message to autonomously move, and records position information of the to-be-controlled device during the autonomous movement.

16. The method according to claim 10, wherein the method further comprises:

displaying a third movement control widget through the display interface in response to triggering of an exit control widget when the to-be-controlled device is in the autonomous movement mode, wherein the exit control widget is displayed on a display interface; and sending a fifth control message to the to-be-controlled device in response to triggering of the third movement control widget, such that the to-be-controlled device moves according to the fifth control message, and records position information of the to-be-controlled device during the movement according to the fifth control message.

17. A remote terminal, comprising a memory and a controller, wherein the memory is used for storing instructions, and the controller is used for executing the instructions to implement the method according to claim 10.

18. A mower, comprising a device for determining information, the device for determining information comprising:

a processor, a memory, and a communication bus, wherein:

the communication bus is configured to implement a communication connection between the processor and the memory; and the processor is configured to execute instruction stored in the memory to implement a method for determining information, the method comprising:

collecting a to-be-processed image for a to-be-recognized region through an image collector of a to-be-controlled device, wherein the to-be-recognized region at least comprises a to-be-processed region and an obstacle region;

processing the to-be-processed image, and determining information of a partial boundary of a to-be-processed region where the to-be-controlled device is currently located; and controlling the to-be-controlled device to switch between an autonomous movement mode and a remotely controlled movement mode based on the information of the partial boundary to determine a boundary of the to-be-processed region, wherein the boundary of the to-be-processed region is used for distinguishing the to-be-processed region from the obstacle region;

wherein the controlling the to-be-controlled device to switch between the autonomous movement mode and the remotely controlled movement mode based on the information of the partial boundary to determine the boundary of the to-be-processed region comprises operations (a and (b), or (c) and d), wherein, the operation (a) includes:
sending a first instruction message to a remote terminal when a boundary of a working range of the to-be-controlled device is determined based on the information of the partial boundary when the to-be-controlled device is in the remotely controlled movement mode, such that the remote terminal displays a first mode switching control widget through a display interface according to the first instruction message;

switching to the autonomous movement mode to autonomously move when a first control message sent from the remote terminal in response to triggering of the first mode switching control widget is received, and recording position information of the to-be-controlled device during the autonomous movement; and generating the boundary of the to-be-processed region according to the recorded position information, the operation (b) includes:
sending a second instruction message to the remote terminal when the boundary of the working range of the to-be-controlled device fails to be determined according to the information of the partial boundary when the to-be-controlled device is in the autonomous movement mode, such that the remote terminal displays a first movement control widget through the display interface according to the second instruction message;

moving, when receiving a second control message sent from the remote terminal in response to triggering of the first movement control widget, according to the second control message, and recording position information of the to-be-controlled device during the movement according to the second control message; and generating the boundary of the to-be-processed region according to the recorded position information, the operation (c) includes:
switching to the autonomous movement mode to autonomously move, when a third control message sent from a remote terminal in response to triggering of a second mode switching control widget is received when the to-be-controlled device is in the remotely controlled movement mode, and recording position information of the to-be-controlled device during the autonomous movement, wherein the second mode switching control widget is displayed through a display interface after the remote terminal determines a boundary of a working range of the to-be-controlled device; and generating the boundary of the to-be-processed region according to the recorded position information, and the operation (d) includes:
moving, when a fourth control message sent from the remote terminal in response to triggering of a second movement control widget is received when the to-be-controlled device is in the autonomous movement mode, according to the fourth control message, and recording position information of the to-be-controlled device during the movement according to the fourth control message; and generating the boundary of the to-be-processed region according to the recorded position information.

* * * * *